United States Patent [19]

Shouda et al.

[11] Patent Number: 5,544,639
[45] Date of Patent: Aug. 13, 1996

[54] TEMPERATURE PREDICTING SYSTEM FOR INTERNAL COMBUSTION ENGINE AND TEMPERATURE CONTROL SYSTEM INCLUDING SAME

[75] Inventors: Hirofumi Shouda, Toyota; Yoshihiko Hirata, Kariya; Katsuhiko Kawai, Kariya; Toshio Kondo, Kariya; Hiroshi Haraguchi, Kariya, all of Japan

[73] Assignee: Nippondenso Co., Ltd., Kariya, Japan

[21] Appl. No.: 298,585

[22] Filed: Aug. 30, 1994

[30] Foreign Application Priority Data

Aug. 31, 1993 [JP] Japan .................................. 5-216671
Dec. 27, 1993 [JP] Japan .................................. 5-330871
Jul. 25, 1994 [JP] Japan .................................. 6-172604

[51] Int. Cl.⁶ .................................................. F02D 41/00
[52] U.S. Cl. ................................................... 123/676
[58] Field of Search .................................. 123/676, 678, 123/417, 492; 73/118, 200

[56] References Cited

U.S. PATENT DOCUMENTS

| 4,576,039 | 3/1986 | Muto et al. ................... | 73/118 |
| 4,866,980 | 9/1989 | Falkmann et al. ............. | 73/117.3 |
| 5,103,791 | 4/1992 | Tomisawa ..................... | 123/676 |
| 5,158,063 | 10/1992 | Hosoda et al. ................ | 123/676 |
| 5,239,965 | 8/1993 | Ninomiya ...................... | 123/676 |

FOREIGN PATENT DOCUMENTS

| 49-111092 | 10/1974 | Japan ........................... | 123/676 |
| 58-8397 | 1/1983 | Japan ........................... | 123/676 |
| 59-176450 | 10/1984 | Japan ........................... | 123/676 |
| 59-203931 | 11/1984 | Japan ........................... | 123/676 |
| 60-101241 | 6/1985 | Japan ........................... | 123/676 |
| 2223640 | 9/1990 | Japan ........................... | 123/676 |
| 422724 | 1/1992 | Japan ........................... | 123/676 |
| 440322 | 2/1992 | Japan ........................... | 123/676 |

*Primary Examiner*—Raymond A. Nelli
*Attorney, Agent, or Firm*—Cushman Darby & Cushman, L.L.P.

[57] ABSTRACT

A temperature projecting system includes a temperature sensor for monitoring a temperature of an objective portion where the temperature changes depending on an engine operating condition. The temperature projecting system projects an actual temperature of the objective portion based on the monitored temperature but free of a first-order lag of the temperature sensor. A temperature control system includes the temperature projecting system. The temperature control system derives a correction amount for a basic control amount of an actuator based on a difference between the projected actual temperature and a target temperature. The basic control amount is corrected by the correction amount to derive a corrected control amount which controls the engine operating condition and thus the temperature of the objective portion.

29 Claims, 30 Drawing Sheets

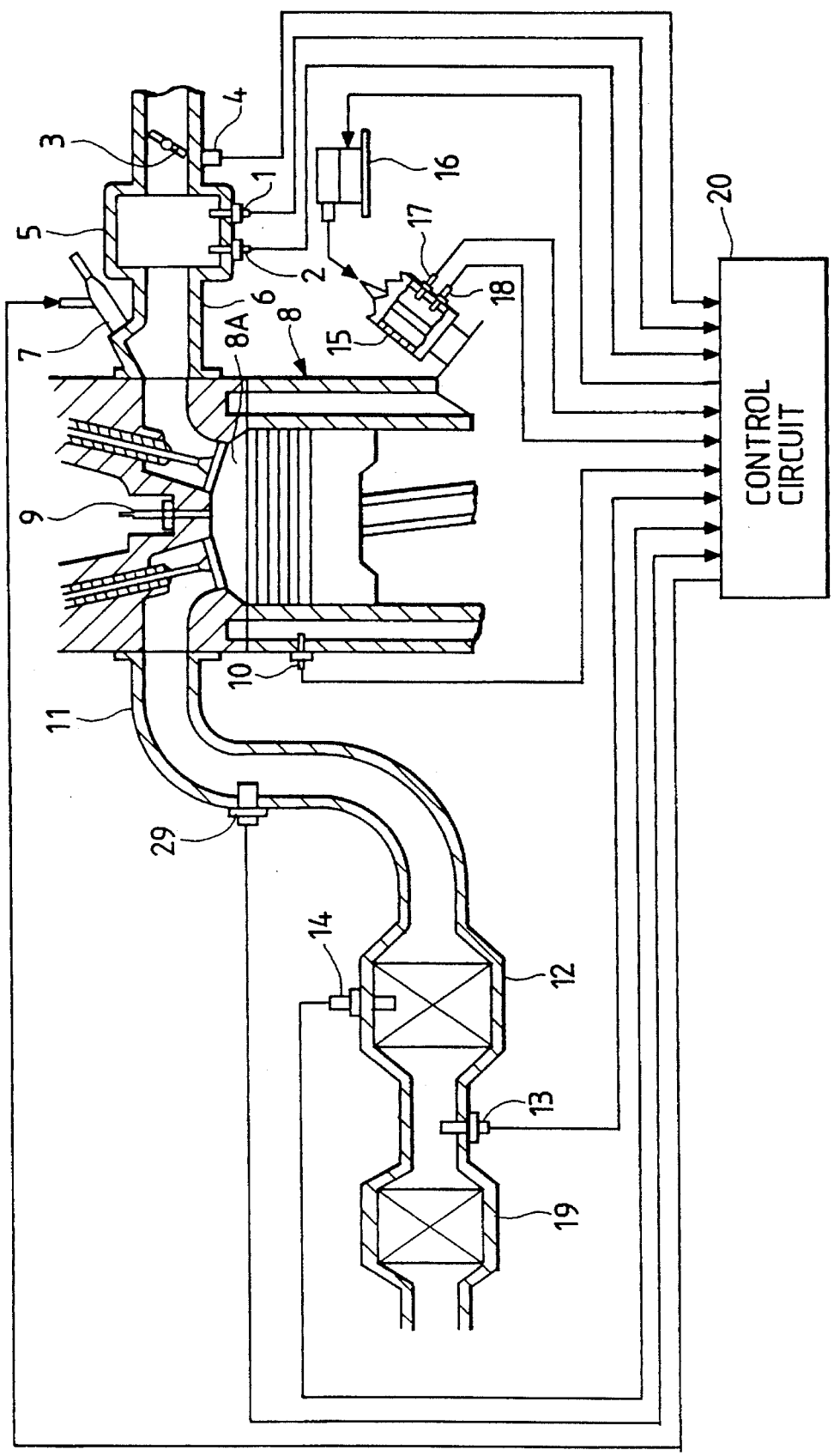

TEMPERATURE PREDICTING SYSTEM FOR INTERNAL COMBUSTION ENGINE AND TEMPERATURE CONTROL SYSTEM INCLUDING SAME

BACKGROUND OF THE INVENTION

1. Field of the Invention

The present invention relates to a temperature predicting or estimating system for an internal combustion engine, which monitors a portion of the engine where a temperature varies depending on an operating condition of the engine, e.g. a catalytic converter or catalyst and an exhaust pipe, so as to predict or estimate the temperature thereof. The present invention further relates to a temperature control system for the engine, including the foregoing temperature predicting system.

2. Description of the Prior Art

As is well known in the art, three way catalytic converters have been widely used in internal combustion engines installed on vehicles to remove harmful gas components from engine exhaust.

In general, the three way catalytic converter should be operated in a high-temperature range to effectively remove the harmful gas components. On the other hand, excessively high temperatures tend to lower the purification efficiency of the catalytic converter, and also to reduce the durability of the catalytic converter catalyst.

Under the circumstances, Japanese First (unexamined) Patent Publication No. 60-101241, for example, discloses monitoring temperature of the exhaust by an appropriate temperature sensor and maintaining the temperature within a given target range by controlling the amount of fuel supplied to the engine and one ignition timing of the engine. As appreciated, when the fuel supply is increased, an air-fuel ratio becomes richer so as to lower the exhaust gas temperature. Similarly, when the ignition timing of the engine is advanced to a greater extent, the exhaust gas temperature is lowered.

Accordingly, on a theoretical basis, it certainly appears that the exhaust gas temperature can be maintained within the given target temperature range and prevented from getting excessively high by measuring the exhaust gas temperature using the temperature sensor and by controlling the fuel supply amount to the engine and the ignition timing of the engine based on the measured temperature.

However, temperature sensors normally have non-ideal response characteristics. Particularly, the relatively low-priced temperature sensors employed in mass-produced vehicles tend to have significant response delays. This results in a large difference between a temperature of the exhaust gas measured by the temperature sensor and an actual temperature of the exhaust gas. Due to this deviation, the exhaust gas temperature can not be accurately controlled so that, for example, a temperature within the foregoing three way catalytic converter can not be controlled, either.

Although the measurement of the exhaust gas temperature has been referred to in the foregoing description, the same discussion applies with regard to measuring temperatures of other engine portions which change their temperature depending on the engine operating conditions, using the temperature sensors.

SUMMARY OF THE INVENTION

Therefore, it is an object of the present invention to provide an improved temperature projecting system for an internal combustion engine.

It is another object of the present invention to provide an improved temperature control system for an internal combustion engine.

According to one aspect of the present invention, a temperature predicting system for an internal combustion engine comprises a temperature sensor for detecting a temperature of a portion of an engine where the temperature changes depending on an operating condition of the engine; flow velocity detecting means for detecting a flow velocity at the engine portion; sensor model constant deriving means for deriving in real time a model constant of a first model reflecting a response delay of the temperature sensor, based on the flow velocity detected by the flow velocity detecting means; and temperature predicting means for predicting an actual temperature of the engine portion based on the temperature detected by the temperature sensor, using the model constant derived by the sensor model constant deriving means and a second model which is inverse to the first model.

According to another aspect of the present invention, a temperature predicting system for an internal combustion engine comprises a temperature sensor for detecting a temperature of a portion of an engine where the temperature changes depending on an operating condition of the engine; fuel cut detecting means for detecting whether fuel cut is performed or not; sensor model constant deriving means for deriving a model constant of a first model reflecting a response delay of the temperature sensor, using, as a reference value, a temperature of the engine portion which is an assumed convergent value during the fuel cut, the sensor model constant deriving means set to derive the model constant when the fuel cut detecting means detects the fuel cut; and temperature predicting means for predicting an actual temperature of the engine portion based on the temperature detected by the temperature sensor, using the model constant derived by the sensor model constant deriving means and a second model which is inverse to the first model.

According to another aspect of the present invention, a temperature control system for an internal combustion engine comprises operating condition control means for controlling an operating condition of the engine; a temperature sensor for detecting a temperature of a portion of an engine where the temperature changes depending on the operating condition of the engine; temperature predicting means for predicting an actual temperature of the engine portion based on the temperature detected by the temperature sensor, using a first model which is inverse to a second model reflecting a response delay of the temperature sensor; correction amount deriving means for performing a proportional-integral processing of a difference between the projected actual temperature and a target temperature to derive a correction amount for a control amount of the operating condition control means; control amount correcting means for correcting the control amount based on the correction amount; a controlled object model constant deriving means for deriving in real time model constants of a controlled object model based on the temperature detected by the temperature sensor and the correction amount; and the correction amount deriving means including means for using the model constants so as to form a constant of a proportional term during the proportional-integral processing.

According to another aspect of the present invention, a temperature control system for an internal combustion engine comprises an exhaust gas temperature sensor, provided in an exhaust pipe, for detecting a temperature of exhaust gas; a catalyst, provided in the exhaust pipe downstream of the exhaust gas temperature sensor, for purifying the exhaust gas; sensor model constant deriving means for deriving in real time a model constant of a first model reflecting a response delay of the exhaust gas temperature sensor; temperature predicting means for predicting an actual temperature of the exhaust gas based on the temperature detected by the exhaust gas temperature sensor, using the model constant derived by the sensor model constant deriving means and a second model which is inverse to the first model; and exhaust gas temperature control means for increasing the exhaust gas temperature when the predicted actual temperature is less than a target temperature, and for stopping increasing the exhaust gas temperature when the predicted actual temperature is equal to or greater than the target temperature.

According to another aspect of the present invention, a temperature control system for an internal combustion engine comprises an exhaust gas temperature sensor, provided in an exhaust pipe, for detecting a temperature of exhaust gas; a lean catalyst, provided in the exhaust pipe downstream of the exhaust gas temperature sensor, for purifying nitrogen oxide in the exhaust gas; sensor model constant deriving means for deriving in real time a model constant of a first model reflecting a response delay of the exhaust gas temperature sensor; temperature predicting means for predicting an actual temperature of the exhaust gas based on the temperature detected by the exhaust gas temperature sensor, using the model constant derived by the sensor model constant deriving means and a second model which is inverse to the first model; and exhaust gas temperature control means for increasing the exhaust gas temperature when the predicted actual temperature is less than a first target temperature, and for lowering the exhaust gas temperature when the predicted actual temperature is greater than a second target temperature which is set higher than the first target temperature.

According to another aspect of the present invention, a temperature control system for an internal combustion engine comprises an exhaust gas temperature sensor, provided in an exhaust pipe, for detecting a temperature of exhaust gas; an oxygen concentration sensor, provided in the exhaust pipe, for outputting a rich or lean signal depending on an oxygen concentration in the exhaust gas; a heater for warming up the oxygen concentration sensor; sensor model constant deriving means for deriving in real time a model constant of a first model reflecting a response delay of the exhaust gas temperature sensor; temperature predicting means for predicting an actual temperature of the exhaust gas based on the temperature detected by the exhaust gas temperature sensor, using the model constant derived by the sensor model constant deriving means and a second model which is inverse to the first model; and heater energization control means for energizing the heater when the predicted actual temperature is less than a target temperature, and for deenergizing the heater when the actual temperature is equal to or greater than the target temperature.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 34 is a schematic structural diagram showing a temperature control system for an internal combustion engine installed on a vehicle, according to a ninth preferred embodiment of the present invention;

DESCRIPTION OF THE PREFERRED EMBODIMENT

Now, preferred embodiments of the present invention will be described hereinbelow with reference to the accompanying drawings.

Figure 1:
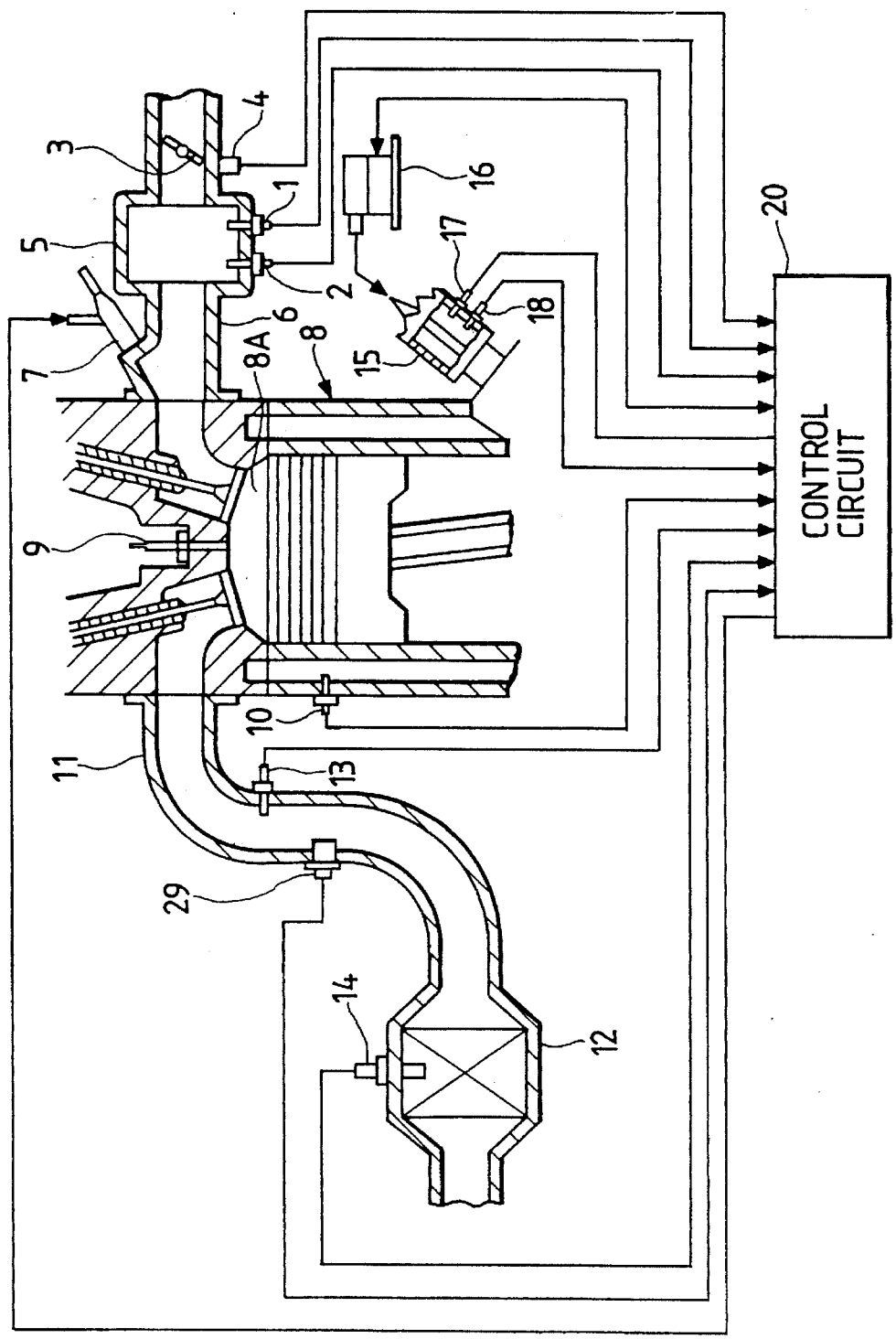
FIG. 1 is a schematic structural diagram showing a temperature control system for an internal combustion engine installed on a vehicle, according to a first preferred embodiment of the present invention.

FIG. 1 is a schematic structural diagram illustrating a temperature control system, including a temperature predicting system, for an internal combustion engine installed on a vehicle, according to a first preferred embodiment of the present invention.

In FIG. 1, a throttle valve 3 is provided in an intake pipe downstream of an air cleaner (not shown). A throttle sensor 4 is further provided for monitoring an opening degree of the throttle valve 3. Downstream of the throttle valve 3 is provided a surge tank 5 where a pressure sensor 1 is disposed for monitoring an engine vacuum, that is, an intake air pressure downstream of the throttle valve 3. In this preferred embodiment, an amount of intake air sucked by the engine is measured indirectly based on the engine vacuum monitored by the pressure sensor 1. An intake air temperature sensor 2 is further disposed at the surge tank 5 for monitoring a temperature of the intake air.

An intake manifold 6 has an upstream end coupled to the surge tank 5 and downstream ends communicating with corresponding combustion chambers 8A of engine cylinders, respectively, formed in an engine body 8. In the intake manifold 6, the intake air is mixed with fuel injected from a fuel injection valve 7 provided for each combustion chamber 8A so as to form an air-fuel mixture of a given air-fuel ratio, which is then fed to the corresponding combustion chamber 8A. The engine body 8 is further provided with a spark plug 9 for each combustion chamber 8A and a coolant temperature sensor 10 for monitoring a temperature of an engine cooling water.

The combustion chambers 8A communicate, in turn, with an exhaust pipe via an exhaust manifold 11. In the exhaust pipe, a catalytic converter 12 containing a three way catalyst is disposed for purifying the harmful gas components contained in the exhaust gas discharged from the combustion chambers 8A via the exhaust manifold 11. In the exhaust manifold 11 are provided an exhaust gas temperature sensor (hereinafter referred to as "E.G. temperature sensor") 13 for monitoring a temperature of the exhaust gas discharged through the exhaust manifold 11. An oxygen concentration sensor ($O_2$ sensor) 29 is further provided upstream of the catalytic converter for monitoring a residual oxygen concentration in the exhaust gas flowing upstream of the catalytic converter 12 so as to produce an air-fuel ratio indicative output. Further, a catalyst or catalytic converter temperature sensor (hereinafter referred to as "C.C. temperature sensor") 14 is provided at the catalytic converter 12 for monitoring a temperature of the catalyst or the catalytic converter 12.

The spark plugs 9 provided at the engine body 8 are electrically connected to a distributor 15, respectively. The distributor 15 is, in turn, connected to an igniter 16 so that a high voltage generated at the igniter 16 is distributed by the distributor 15 to the corresponding spark plug 9 at a given timing. The spark plugs 9, the distributor 15 and the igniter 16 cooperatively constitute an ignition device of the engine. In the distributor 15, an electromagnetic pick-up and a signal rotor fixed to a distributor shaft are provided to form an engine cylinder determining or discriminating sensor 17 and an engine speed sensor 18. The cylinder discriminating sensor 17 produces a cylinder discriminating signal, for example, per 180° CA (crank angle) in case of a four-cylinder engine and per 120° CA in case of a six-cylinder engine, which is outputted to a control circuit 20. On the other hand, the speed sensor 18 produces a crank angle signal, for example, per 30° CA which is outputted to the control circuit 20 for detecting an engine speed.

The control circuit 20 is formed by a microcomputer including a CPU, a RAM, a ROM, a backup RAM, input/output ports and the like in the known manner.

Figure 2:
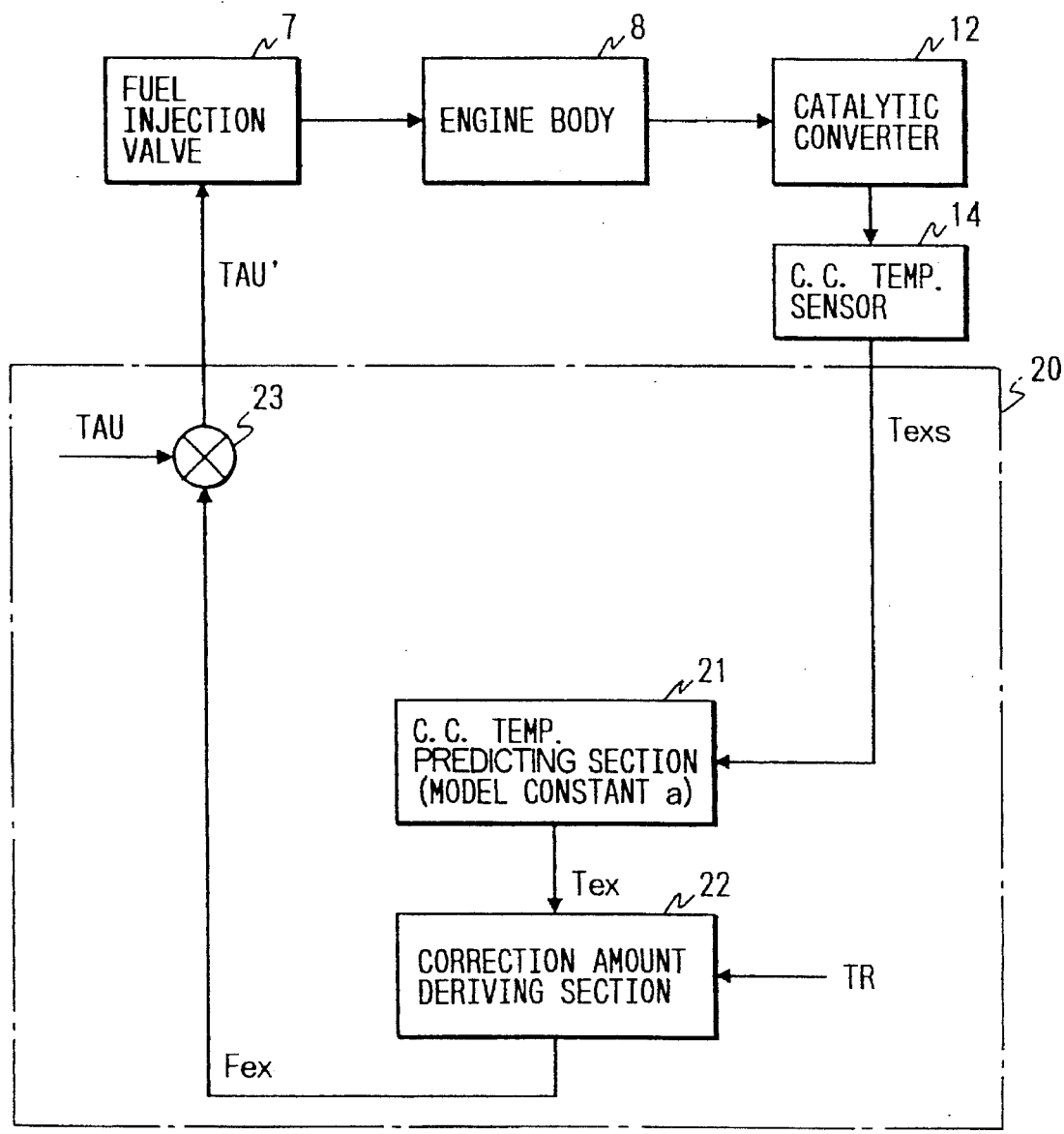
FIG. 2 is a systematic block diagram showing the temperature control system according to the first preferred embodiment, for explaining an operational relationship among associated elements forming the temperature control system.

FIG. 2 is a systematic block diagram showing the temperature control system of FIG. 1 for explaining an operational relationship among associated elements forming the temperature control system. As seen from FIG. 2, in this preferred embodiment, the control circuit 20 includes, on a functional basis, a catalyst or catalytic converter temperature predicting or estimating section (hereinafter referred to as "C.C temperature predicting section") 21, a correction amount deriving section 22 and a multiplier 23.

Hereinbelow, operations of the C.C temperature predicting section 21, the correction amount deriving section 22 and the multiplier 23 constituting the control circuit 20 will be described.

The C.C temperature predicting section 21 predicts or estimates an actual temperature Tex of the catalytic converter 12 (hereinafter referred to as "actual C.C. temperature Tex") based on a temperature Texs of the catalytic converter 12 detected by the C.C. temperature sensor 14 (hereinafter referred to as "sensor C.C. temperature Texs"). The C.C. temperature predicting section 21 projects the actual C.C. temperature Tex in anticipation or consideration of a first-order lag of a behavior of the C.C. temperature sensor 14. The specific projecting manner of the C.C. temperature predicting section 21 will be described hereinbelow.

A response delay of the C.C. temperature sensor 14 is represented by an equation (1) as follows:

$$Texs(i+1) = aTexs(i) + (1-a)Tex(i) \qquad (1)$$

where i is a variable representing the number of control times and a is a sensor model constant of the C.C. temperature sensor 14.

Figure 3A:
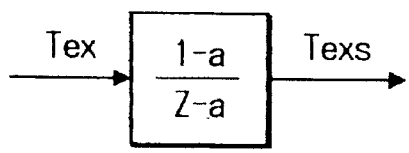
FIG. 3A is an explanatory diagram showing a digitized transfer function representative of a first-order lag of a catalytic converter temperature sensor for explaining an operation of the catalytic converter temperature sensor according to the first preferred embodiment.
Figure 3B:
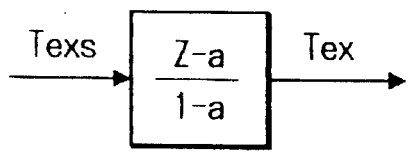
FIG. 3B is an explanatory diagram showing an inverse number of the transfer function of FIG. 3A for explaining an operation of a catalytic converter temperature predicting section in a control circuit according to the first preferred embodiment.

The equation (1) represents that the sensor C.C. temperature Texs is detected with a first-order lag $(1-a)/(Z-a)$ from the actual C.C. temperature Tex, which is graphically shown in FIG. 3A. However, in this preferred embodiment, the actual C.C. temperature Tex should be estimated from the sensor C.C. temperature Texs. Accordingly, a model inverse to the sensor model represented by the equation (1) is considered as shown in FIG. 3B. An equation (2) is derived as follows based on the equation (1) for representing this inverse model:

$$(Z-a)Texs(i) = (1-a)Tex(i) \qquad (2)$$

Accordingly, the actual C.C. temperature Tex is derived by an equation (3) as follows:

$$Tex(i) = \frac{1}{1-a}\{Texs(i+1) - aTexs(i)\} \qquad (3)$$

However, the equation (3) includes future data (i+1) which is not yet obtained. Accordingly, the equation (3) is approximated by an equation (4) as follows:

$$Tex(i) = \frac{1}{1-a}\{Texs(i) - aTexs(i-1)\} \qquad (4)$$

As appreciated from the foregoing description, when the model constant a is known, the actual C.C. temperature Tex(i) at that time can be predicted based on the current sensor C.C. temperature Texs(i) and the last sensor C.C. temperature Texs(i−1). This actual C.C. temperature Tex predicted at the C.C. temperature predicting section 21 as modeled by the equation (4) is fed to the correction amount deriving section 22. In this preferred embodiment, an appropriate value for the model constant a is derived in advance through experiments or the like and prestored in the C.C. temperature predicting section 21.

The correction value deriving section 22 derives a correction amount Fex for a basic control amount TAU of the fuel injection valve 7 based on a difference e between the foregoing predicted actual C.C. temperature Tex and a preset target temperature TR of the catalytic converter 12 (hereinafter referred to as "target C.C. temperature TR"). As appreciated, the correction amount Fex controls an operating condition of the engine. The specific correction amount deriving manner of the correction amount deriving section 22 will be described hereinbelow.

In the temperature control system of this preferred embodiment, the correction amount Fex for the basic control amount TAU of the fuel injection valve 7 is derived by controlling the difference e between the actual C.C. temperature Tex and the target C.C. temperature TR using a so-called PID (proportional, integral, differential) control.

Specifically, at the correction amount deriving section 22, when the difference e is given by:

$$e(i) = TR - Tex \qquad (5)$$

a proportional term $u_1(i)$, that is, a proportional correction value, is derived by:

$$u_1(i) = Kpe(i) \qquad (6)$$

an integral term $u_2(i)$ is derived by:

$$u_2(i) = u_2(i-1) + Kie(i) \qquad (7)$$

and a differential term $u_3(i)$ is derived by:

$$u_3(i) = Kd\{e(i) - e(i-1)\} \qquad (8)$$

In the above equations (6), (7) and (8), Kp, Ki and Kd are preset constants, respectively.

Thereafter, the correction amount deriving section 22 derives the correction amount Fex using an equation (9) as follows:

$$Fex(i)=u_1(i)+u_2(i)+u_3(i) \quad (9)$$

The correction amount Fex derived by the correction amount deriving section 22 is fed to the multiplier 23.

The multiplier 23 multiplies the basic control amount TAU of the fuel injection valve 7 by the correction amount Fex so as to derive a control amount TAU' of the fuel injection valve 7 as a corrected value of the basic control amount TAU. Specifically, the multiplier 23 derives the control amount TAU' based on an equation (10) as follows:

$$TAU'=TAU \times Fex \quad (10)$$

In the equation (10), the basic control amount TAU represents a basic fuel injection amount of the fuel injection valve 7 derived in the known manner depending on an operating condition of the engine. Accordingly, the control amount TAU' represents a fuel injection amount of the fuel injection valve 7 for controlling the actual C.C. temperature Tex to the target C.C. temperature TR.

Now, the entire operation of the temperature control system according to the first preferred embodiment will be described with reference to FIGS. 4 to 7. FIGS. 4 to 7 show processing steps to be executed by the control circuit 20 for controlling the temperature of the catalytic converter 12.

Figure 4:
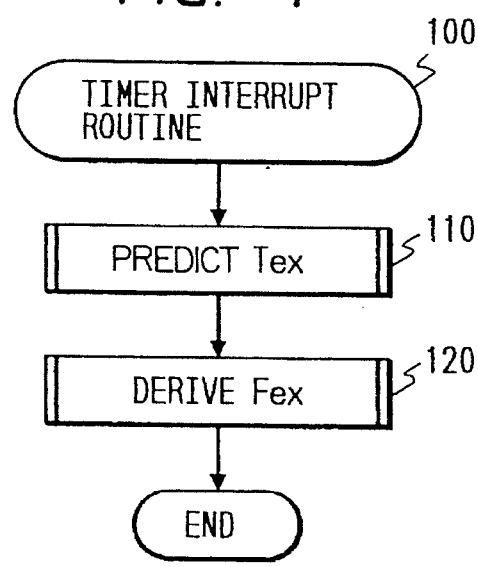
FIG. 4 is a flowchart of a timer interrupt routine to be executed by a control circuit for performing a temperature control of a catalytic converter.

FIG. 4 is a flowchart of a timer interrupt routine 100 to be executed by the control circuit 20 per, for example, 100 ms for performing the temperature control of the catalytic converter 12.

In this timer interrupt routine 100, at step 110, the control circuit 20 executes an actual C.C. temperature predicting routine via the C.C. temperature predicting section 21 for deriving the actual C.C. temperature Tex.

Figure 5:
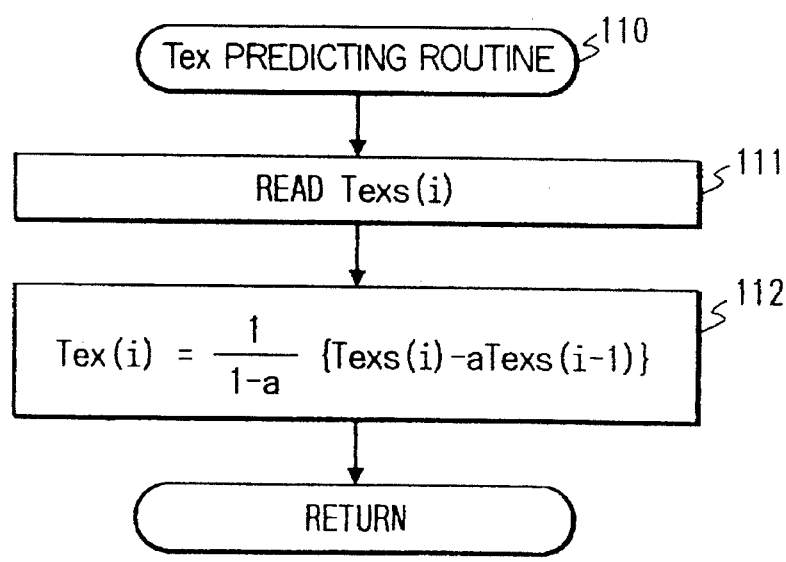
FIG. 5 is a flowchart of a subroutine representing an actual catalytic converter temperature predicting routine in the timer interrupt routine of FIG. 4.

FIG. 5 shows this actual C.C. temperature predicting routine in detail. In FIG. 5, at step 111, the control circuit 20 reads the current sensor C.C. temperature Texs(i) outputted from the C.C. temperature sensor 14. Subsequently, at step 112, the control circuit 20 derives the actual C.C. temperature Tex (i) at that time based on the foregoing equation (4), using the model constant a stored in the C.C. temperature predicting section 21 and the last sensor C.C. temperature Texs (i–1) stored in the RAM or backup RAM in the control circuit 20.

Thereafter, the routine proceeds to step 120 in FIG. 4. At step 120, the control circuit 20 executes a PID-controlled correction amount deriving routine via the correction amount deriving section 22 for deriving the correction amount Fex for the basic control amount TAU.

Figure 6:
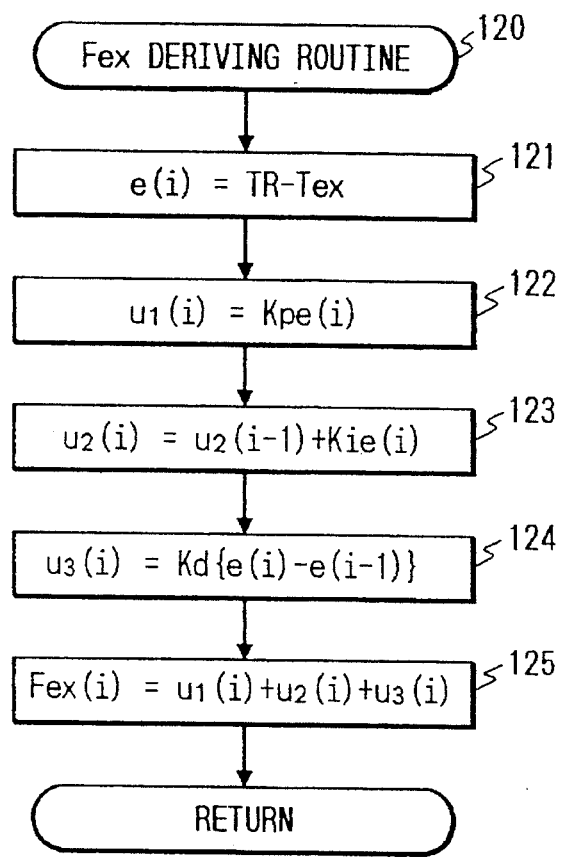
FIG. 6 is a flowchart of a subroutine representing a PID-controlled correction amount deriving routine in the timer interrupt routine of FIG. 4.

FIG. 6 shows this correction amount deriving routine in detail. In FIG. 6, at step 121, the control circuit 20 derives the difference e(i) based on the foregoing equation (5), using the target C.C. temperature TR and the actual C.C. temperature Tex predicted at step 110 in FIG. 4. Subsequently, through steps 122 to 124, the proportional, integral and differential correction values $u_1(i)$, $u_2(i)$ and $u_3(i)$ are derived, respectively, by executing the foregoing equations (6), (7) and (8) in sequence. Thereafter, at step 125, these correction values $u_1(i)$, $u_2(i)$ and $u_3(i)$ are added based on the foregoing equation (9) so as to derive the correction amount Fex(i). The correction amount Fex(i) thus derived is also stored in the RAM or backup RAM in the control circuit 20.

As appreciated, the control circuit 20 performs the foregoing actual C.C. temperature predicting routine and correction amount deriving routine in sequence every time the timer interrupt is generated, for example, per 100 ms.

Figure 7:
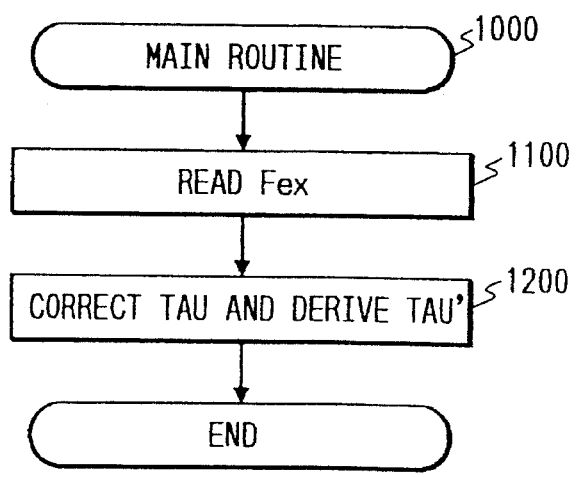
FIG. 7 is a flowchart of a main routine to be executed by the control circuit for performing the temperature control of the catalytic converter.

FIG. 7 is a flowchart of a main routine 1000 to be executed by the control circuit 20 for performing the temperature control of the catalytic converter 12.

In this main routine 1000, at step 1100, the control circuit 20 reads the correction amount Fex(i) derived and stored in the RAM or backup RAM at step 125 in FIG. 6 and feeds this correction amount Fex(i) to the multiplier 23. Subsequently, at step 1200, the control circuit 20, i.e. the multiplier 23 corrects the basic control amount TAU of the fuel injection valve 7 based on the foregoing equation (10) so as to derive the corrected control amount TAU'.

As appreciated, in the first preferred embodiment, the temperature control of the catalytic converter 12 is smoothly and effectively performed through repetition of executions of the foregoing main routine 1000.

As further appreciated, in the first preferred embodiment, the temperature predicting system may be independently constituted by the C.C. temperature sensor 14 and the C.C. temperature predicting section 21.

Now, a second preferred embodiment of the present invention will be described hereinbelow.

Figure 8:
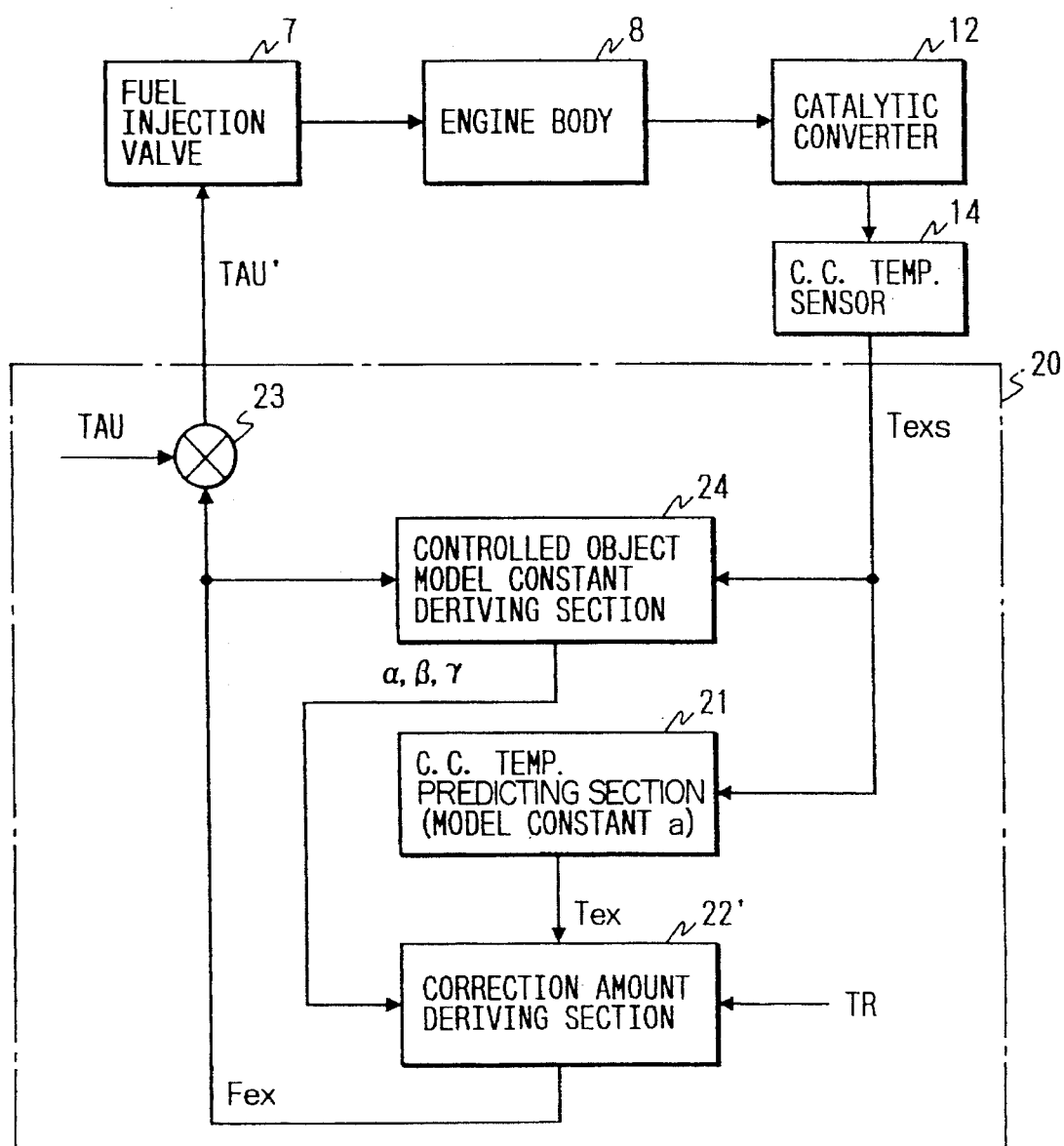
FIG. 8 is a systematic block diagram showing a temperature control system for a vehicle-installed internal combustion engine according to a second preferred embodiment of the present invention, for explaining an operational relationship among associated elements forming the temperature control system.

FIG. 8 is a systematic block diagram showing a temperature control system, including a temperature predicting system, for a vehicle-installed internal combustion engine according to the second preferred embodiment, for explaining an operational relationship among associated elements forming the temperature control system.

The second preferred embodiment differs from the first preferred embodiment only in a functional structure of the control circuit 20 as seen from FIG. 8. Accordingly, the following description will mainly refer to such a functional structure of the control circuit 20.

In FIG. 8, elements the same as or corresponding to those in FIG. 2 are assigned the same or corresponding marks or symbols so as to omit explanation thereof for avoiding redundant disclosure. FIG. 1 is also applied to the second preferred embodiment.

Referring to FIG. 8, in the second preferred embodiment, the control circuit 20 newly includes a controlled object model constant deriving section 24. The model constant driving section 24 derives a controlled object model constants α, β and γ and feeds these model constants to a correction amount deriving section 22'.

The model constant deriving section 24 derives the model constants α, β and γ of a model of a controlled object in real time, using the sensor C.C. temperature Texs monitored by the C.C. temperature sensor 14 and a correction amount Fex derived by the correction amount deriving section 22'. The specific model constant deriving manner of the model constant deriving section 24 will be described hereinbelow.

A first-order lag for the sensor C.C. temperature Texs detected by the C.C. temperature sensor 14 is represented by an equation (11) as follows:

$$Texs(i+1)=\alpha Texs(i)+\beta Fex(i-3)+\gamma \quad (11)$$

where the model constant α is an unknown constant representative of a time constant of the C.C. temperature sensor 14, the model constants β and γ are unknown constants, respectively, representative of a physical positional condition of the catalytic converter 12, various disturbances and the like, and i is a variable representing the number of control times.

Since the model constants α, β and γ in the equation (11) are unknown, respectively, these model constants are rewritten as assumed values, and the equation (11) is further separated into a known signal and an unknown signal so that an equation (12) is derived as follows:

$$Texs(i+1) = \hat{\alpha}Texs(i) + \hat{\beta}Fex(i-3) + \hat{\gamma} \quad (12)$$

$$= (Texs(i) \ Fex(i-3) \ 1) \begin{bmatrix} \hat{\alpha} \\ \hat{\beta} \\ \hat{\gamma} \end{bmatrix}$$

Thereafter, the assumed values of the unknown model constants α, β and γ are derived using the method of least squares.

Specifically, when equations (13) are given as follows:

$$Texs(i+1) = \hat{\theta}(i)W^T(i) \quad (13)$$

$$\hat{\theta}(i) = \begin{bmatrix} \hat{\alpha} \\ \hat{\beta} \\ \hat{\gamma} \end{bmatrix}$$

$$W(i) = \begin{bmatrix} Texs(i) \\ Fex(i-3) \\ 1 \end{bmatrix}$$

where θ represents a parameter vector and W represents a measured value vector,
and when an equation (14) is satisfied as follows:

$$\hat{\theta}(i) = \hat{\theta}(i-1) + \frac{\Gamma(i-1)W(i)}{1 + W^T(i)\Gamma(i-1)W(i)} \{Tex(i) - W^T(i)\hat{\theta}(i-1)\} \quad (14)$$

then, the following relation (15) is guaranteed on condition that $$i \to \infty$$

$$\begin{aligned} \hat{\alpha}(i) &\to \alpha \\ \hat{\beta}(i) &\to \beta \\ \hat{\gamma}(i) &\to \gamma \end{aligned} \quad (15)$$

Accordingly, by using the algorithm of the equation (14), the model constants α, β and γ which are unknown, can be derived. In this preferred embodiment, the equation (14) is executed in real time and the derived values are set as the required model constants α(i), β(i) and γ(i) for convenience.

In the equation (14), Γ is defined as:

$$\Gamma(i) = \Gamma(i-1) - \frac{\Gamma(i-1)W(i)W^T(i)\Gamma(i-1)}{1 + W^T(i)\Gamma(i-1)W(i)} \quad (16)$$

and represents a 3×3 symmetric matrix having an initial value defined as:

$$\Gamma(-1) = \begin{bmatrix} g_0 & 0 & 0 \\ 0 & g_0 & 0 \\ 0 & 0 & g_0 \end{bmatrix} \quad (17)$$

$$g_0 > 0$$

Referring back to FIG. 8, the correction amount deriving section 22' is arranged to derive the correction amount Fex using the model constants which are derived and updated in real time as described above.

In the foregoing first preferred embodiment, when the correction amount deriving section 22 of the control circuit 20 derives the correction amount Fex for the basic control amount TAU of the fuel injection valve 7 by performing the PID control of the difference between the actual C.C. temperature Tex and the target C.C. TR, the constants Kp, Ki and Kd used for the proportional, integral and differential terms are all fixed. However, the constant Kp of the proportional term (hereinafter referred to as "proportional constant Kp") can be replaced by the model constants derived by the model constant deriving section 24.

The specific replacing manner of the correction amount deriving section 22' will be described hereinbelow.

At first, a term of the correction amount Fex is derived based on the foregoing equation (11) as follows:

$$Fex(i-3) = \frac{Texs(i+1) - \alpha Texs(i) - \gamma}{\beta} \quad (18)$$

Subsequently, by rearranging the equation (18) using the following equation (19):

$$Texs(i+1) = Texs(i) = Texso + e(i) \quad (19)$$

we have $$\begin{aligned} Fex(i-3) &= \frac{Texso - \alpha Texso - \gamma}{\beta} + \frac{1-\alpha}{\beta}e(i) \\ &= Fexo + \frac{1-\alpha}{\beta}e(i) \end{aligned} \quad (20)$$

where Texso represents a sensor C.C. temperature Texs detected by the C.C. temperature sensor 14 when the basic control amount TAU is corrected by a correction amount Fexo.

Accordingly, the proportional constant Kp can be replaced by the model constants α and β as follows:

$$Kp = \frac{1-\alpha}{\beta} \quad (21)$$

Since the correction amount Fex is derived using these real-time model constants derived at the model constant deriving section 24, the correction amount Fex thus derived becomes more reliable data which is, for example, free of age-based variations.

Now, the entire operation of the temperature control system according to the second preferred embodiment will be described with reference to FIGS. 9 to 12. FIGS. 9 to 12 show processing steps to be executed by the control circuit 20 for controlling the temperature of the catalytic converter 12.

Figure 9:
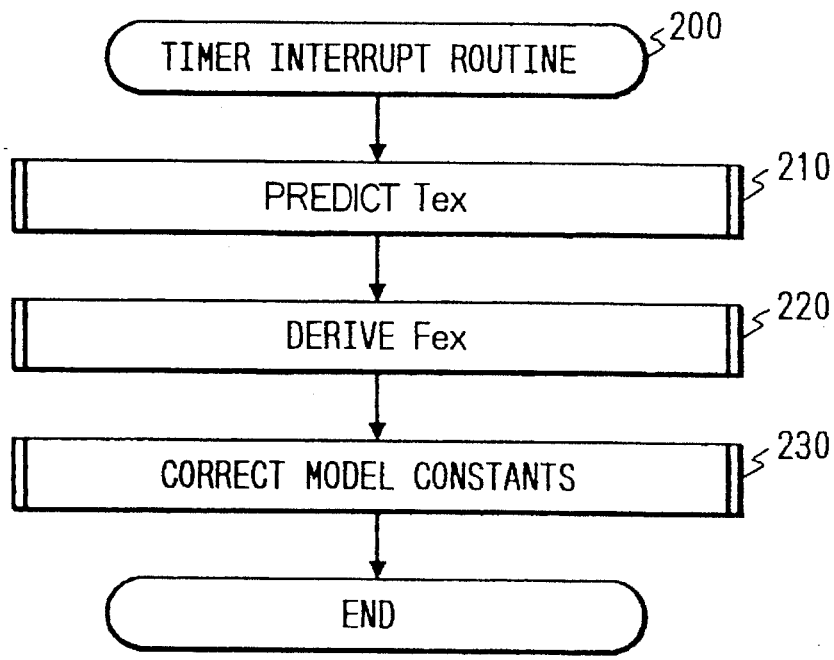
FIG. 9 is a flowchart of a timer interrupt routine to be executed by a control circuit in the second preferred embodiment for performing a temperature control of the catalytic converter.

FIG. 9 is a flowchart of a timer interrupt routine 200 to be executed by the control circuit 20 per, for example, 100 ms for performing the temperature control of the catalytic converter 12.

In this timer interrupt routine 200, at step 210, the control circuit 20 executes an actual C.C. temperature predicting routine via the C.C. temperature predicting section 21 for deriving the actual C.C. temperature Tex.

Figure 10:
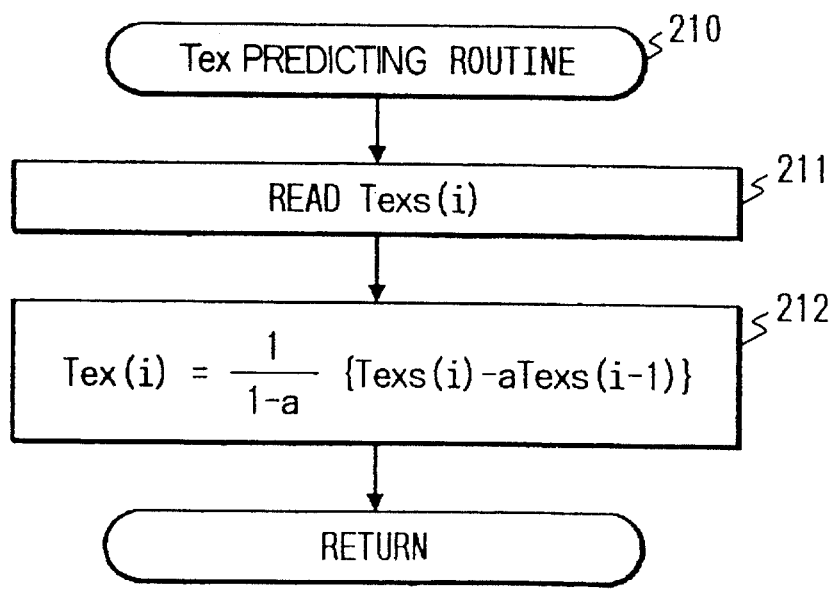
FIG. 10 is a flowchart of a subroutine representing an actual catalytic converter temperature predicting routine in the timer interrupt routine of FIG. 9.

FIG. 10 shows this actual C.C. temperature predicting routine in detail. In FIG. 10, at step 211, the control circuit 20 reads the current sensor C.C. temperature Texs(i) outputted from the C.C. temperature sensor 14. Subsequently, at step 212, the control circuit 20 derives the actual C.C. temperature Tex (i) at that time based on the foregoing equation (4), using the current sensor C.C. temperature Texs(i) read at step 211, the foregoing sensor model constant a stored in the C.C. temperature predicting section 21 and the last sensor C.C. temperature Texs (i−1) stored in the RAM or backup RAM in the control circuit 20.

Thereafter, the routine proceeds to step 220 in FIG. 9. At step 220, the control circuit 20 executes a correction amount deriving routine via the correction amount deriving section 22' for deriving the correction amount Fex for the basic control amount TAU.

Figure 11:
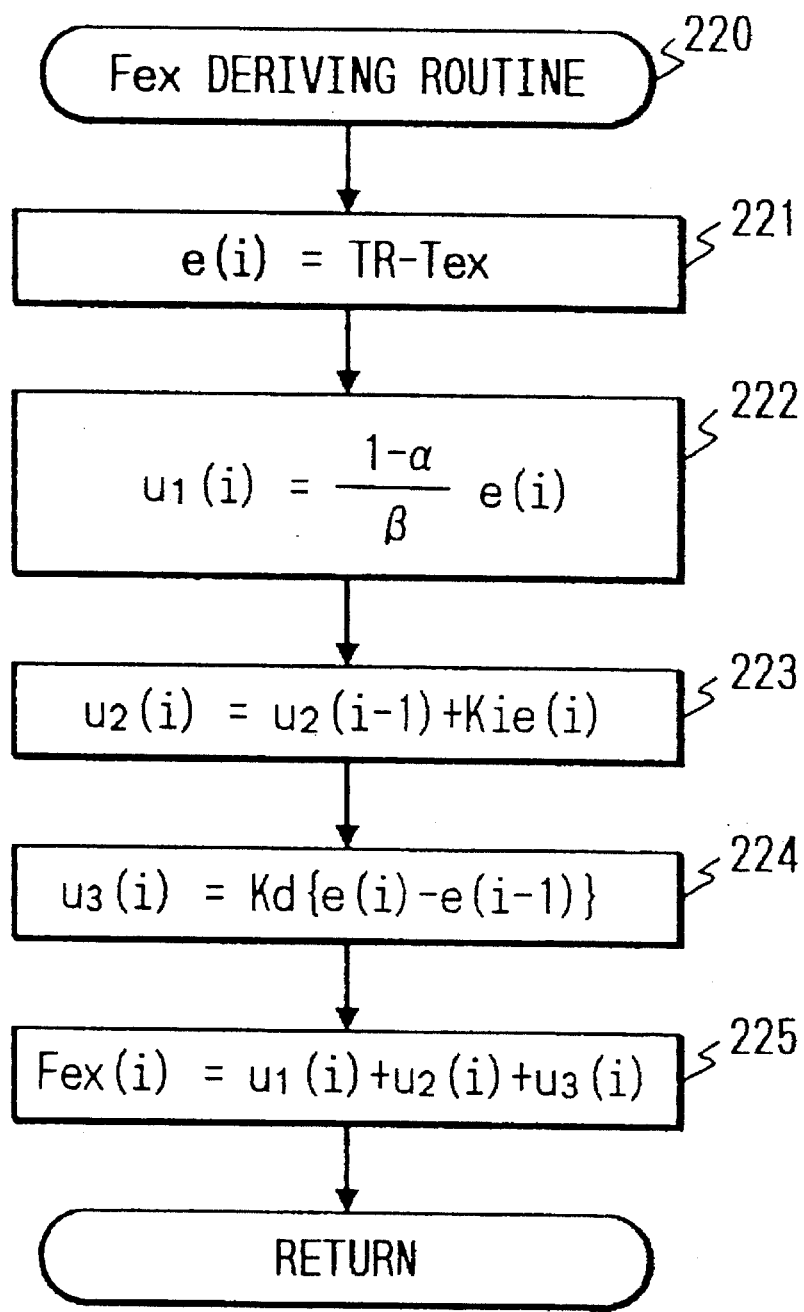
FIG. 11 is a flowchart of a subroutine representing a correction amount deriving routine in the timer interrupt routine of FIG. 9.

FIG. 11 shows this correction amount deriving routine in detail. In FIG. 11, at step 221, the control circuit 20 derives the difference e(i) based on the foregoing equation (5), using the target C.C. temperature TR and the actual C.C. temperature Tex predicted at step 210 in FIG. 9. Subsequently, at step 222, the proportional correction value $u_1(i)$ is derived based on the following equation (22), using the model constants corrected or updated in real time at the model constant deriving section 24:

$$u_1(i) = \frac{1-\alpha}{\beta} e(i) \quad (22)$$

Thereafter, through steps 223 and 224, the integral and differential correction values $u_2(i)$ and $u_3(i)$ are derived, respectively, by executing the foregoing equations (7) and (8) in sequence. Then, at step 225, these correction values $u_1(i)$, $u_2(i)$ and $u_3(i)$ are added based on the foregoing equation (9) so as to derive the correction amount Fex(i). As described above, the correction amount Fex(i) thus derived is free of, such as, the age-based variations and thus is highly accurate and reliable data. The correction amount Fex(i) is also stored in the RAM or backup RAM in the control circuit 20.

Thereafter, the routine proceeds to step 230 in FIG. 9. At step 230, the control circuit 20 executes a model constant correcting routine via the model constant deriving section 24 for correcting or updating the model constants using the correction amount Fex (to be exact, the correction amount Fex(i−3) derived three times before the current execution cycle of this timer interrupt routine and stored in the RAM or backup RAM) and the current sensor C.C. temperature Texs(i).

Figure 12:
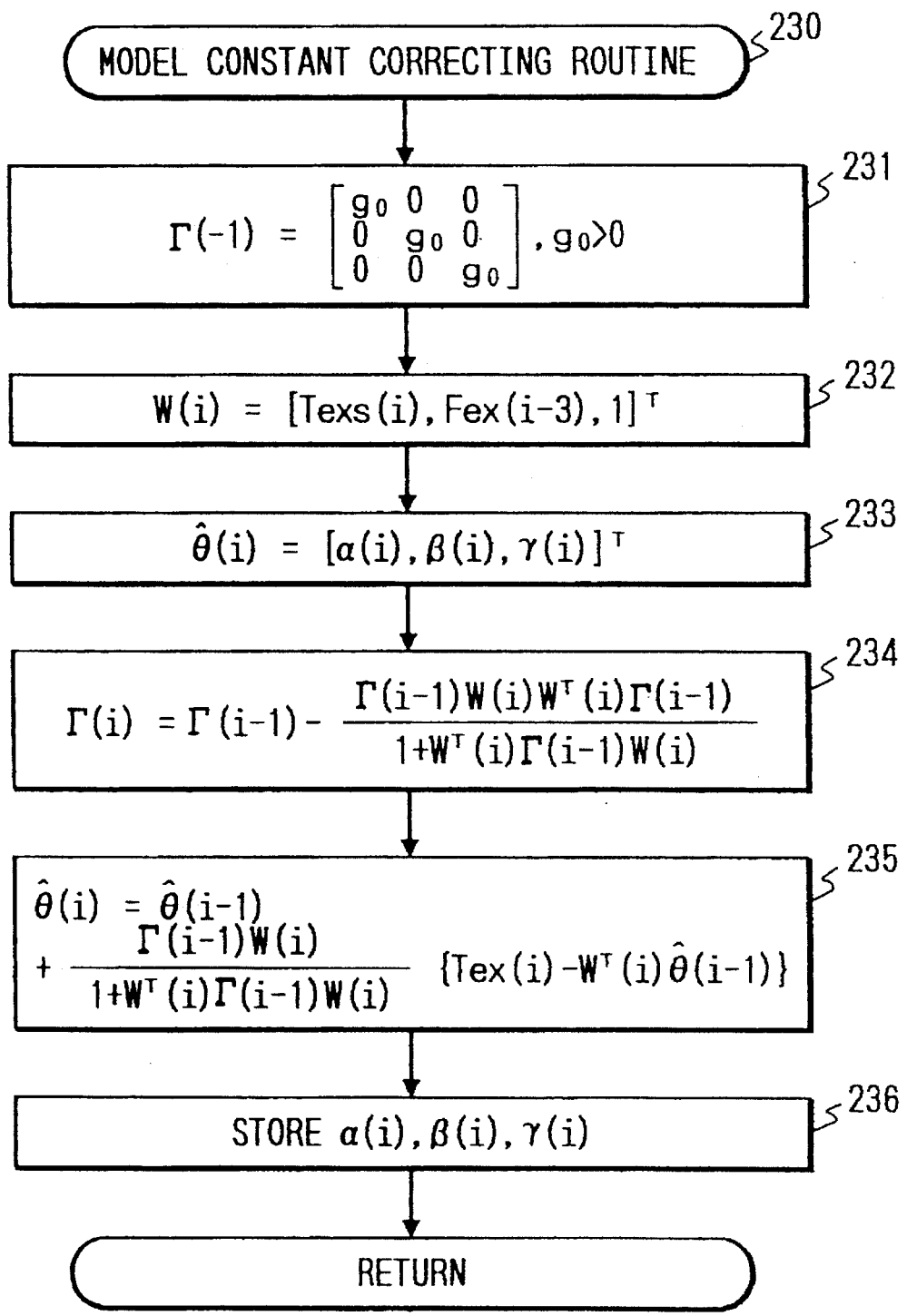
FIG. 12 is a flowchart of a subroutine representing a model constant correcting routine in the timer interrupt routine of FIG. 9.

FIG. 12 shows this model constant correcting routine in detail. In FIG. 12, at step 231, the control circuit 20 first initializes the foregoing symmetric matrix Γ as indicated by the foregoing equation (17). Thereafter, at steps 232 and 233, the measured value vector and the parameter vector are defined as shown by the foregoing equations (13), respectively. Subsequently, at step 234, the symmetric matrix Γ is defined as indicated by the foregoing equation (16). Then, at step 235, the foregoing equation (14) is executed to derive the model constants $\alpha(i)$, $\beta(i)$ and $\gamma(i)$. At subsequent step 236, the derived model constants $\alpha(i)$, $\beta(i)$ and $\gamma(i)$ are stored in the RAM or backup RAM in the control circuit 20 as corrected or updated values of the model constants $\alpha$, $\beta$ and $\gamma$.

As appreciated, the control circuit 20 in the second preferred embodiment performs the foregoing actual C.C. temperature predicting routine, correction amount deriving routine and model constant correcting routine in sequence every time the timer interrupt is generated, for example, per 100 ms.

The main routine 1000 as shown in FIG. 7 is also executed in the second preferred embodiment in the same manner as in the foregoing first preferred embodiment. Accordingly, no further detailed explanation will be made therefor.

In the second preferred embodiment, since the model constants for the model of the controlled object are derived and updated in real time so as to represent the actual operating condition of the engine more precisely, and further since the correction amount Fex is derived using these real-time model constants, individual differences of the controlled object caused by, such as, age-based variation and unevenness due to manufacturing process can be automatically absorbed.

As appreciated, in the second preferred embodiment, the temperature predicting system may be independently constituted by the C.C. temperature sensor 14 and the C.C. temperature predicting section 21.

Now, a third preferred embodiment of the present invention will be described hereinbelow.

Figure 13:
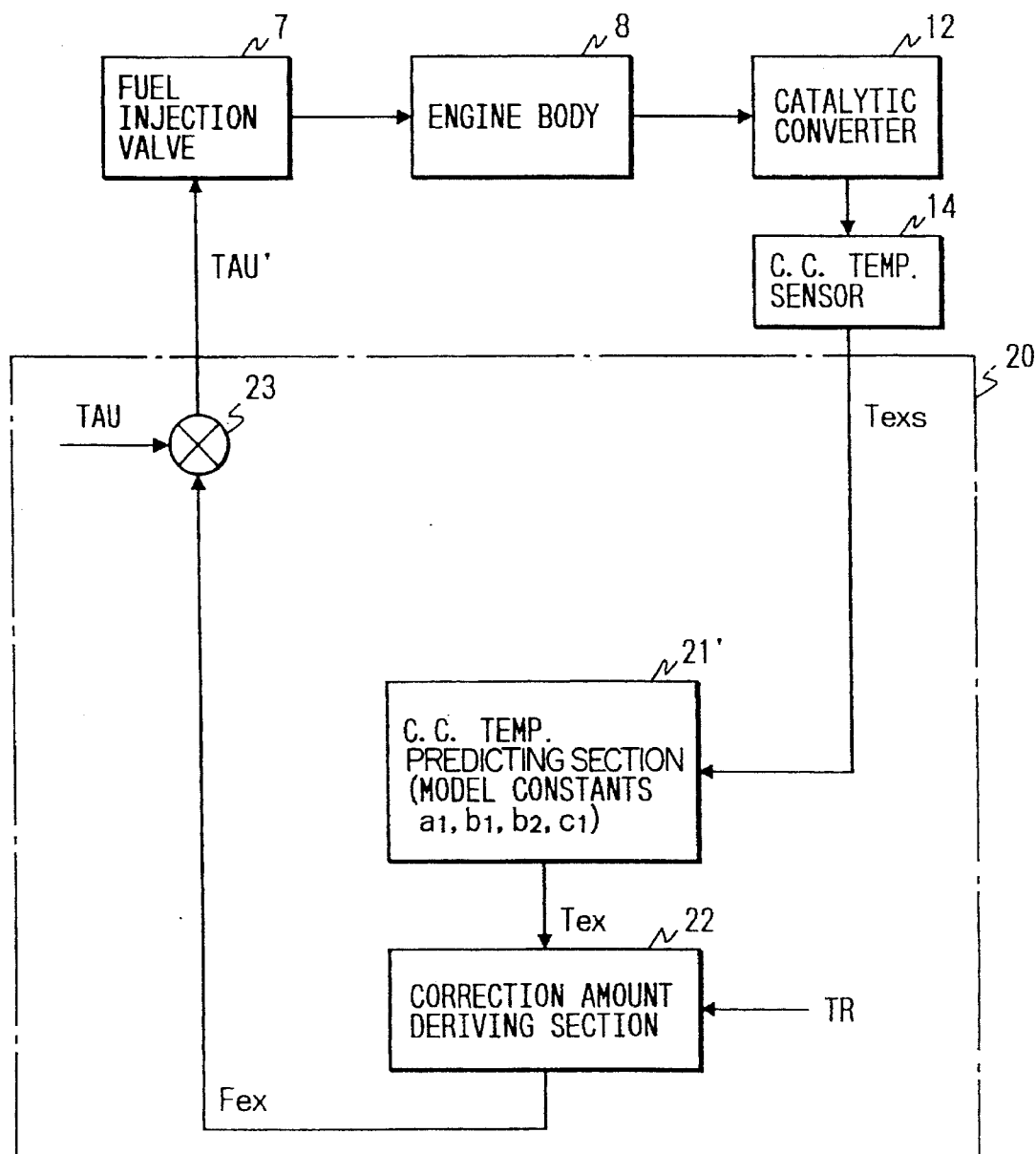
FIG. 13 is a systematic block diagram showing a temperature control system for a vehicle-installed internal combustion engine according to a third preferred embodiment of the present invention, for explaining an operational relationship among associated elements forming the temperature control system.

FIG. 13 is a systematic block diagram showing a temperature control system, including a temperature predicting system, for a vehicle-installed internal combustion engine according to the third preferred embodiment, for explaining an operational relationship among associated elements forming the temperature control system.

The third preferred embodiment differs from the first preferred embodiment only in a functional structure of the control circuit 20 as seen from FIG. 13. Accordingly, the following description will mainly refer to such a functional structure of the control circuit 20.

In FIG. 13, elements the same as or corresponding to those in FIG. 2 are assigned the same or corresponding marks or symbols so as to omit explanation thereof for avoiding redundant disclosure. FIG. 1 is also applied to the third preferred embodiment.

Referring to FIG. 13, in the third preferred embodiment, a C.C temperature projecting section 21' also projects or estimates the actual C.C. temperature Tex of the catalytic converter 12 based on the sensor C.C. temperature Texs detected by the C.C. temperature sensor 14 and in anticipation of a first-order lag of the behavior of the C.C. temperature sensor 14, like the C.C. temperature predicting section 21 in the first preferred embodiment. However, the C.C. temperature predicting section 21' in the third preferred embodiment projects the actual C.C. temperature Tex based on a sensor model of the C.C. temperature sensor 14 which is different from that of the C.C. temperature sensor 14 in the first preferred embodiment. The specific predicting manner of the C.C. temperature predicting section 21' will be described hereinbelow.

In the third preferred embodiment, a response delay of the C.C. temperature sensor 14 is represented by an equation (23) as follows:

$$Texs(i)=a_1Texs(i-1)+b_1Tex(i)+b_2Tex(i-1) \quad (23)$$

where i is a variable representing the number of control times, and $a_1$, $b_1$ and $b_2$ are model constants, respectively, of the C.C. temperature sensor 14.

Figure 14A:
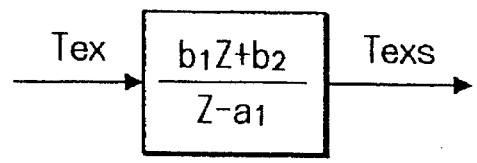
FIG. 14A is an explanatory diagram showing a digitized transfer function representative of a first-order lag of a catalytic converter temperature sensor for explaining an operation of the catalytic converter temperature sensor according to the third preferred embodiment.
Figure 14B:
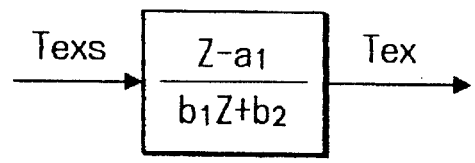
FIG. 14B is an explanatory diagram showing an inverse number of the transfer function of FIG. 14A for explaining an operation of a catalytic converter temperature predicting section in a control circuit according to the third preferred embodiment.

The equation (23) represents that the sensor C.C. temperature Texs is detected with a first-order lag $(b_1Z+b_2)/(Z-a_1)$ from the actual C.C. temperature Tex, which is graphically shown in FIG. 14A. However, in this preferred embodiment, as in the foregoing first preferred embodiment, the actual C.C. temperature Tex should be predicted from the sensor C.C. temperature Texs. Accordingly, a model inverse to the sensor model represented by the equation (23) is considered as shown in FIG. 14B. An equation (24) is derived as follows based on the equation (23) for representing this inverse model:

$$(Z-a_1)Texs(i)=(b_1Z+b_2)Tex(i) \quad (24)$$

Accordingly, the actual C.C. temperature Tex is derived by an equation (25) as follows:

$$Tex(i) = \frac{1}{b_1} \{Texs(i) - a_1Texs(i-1) - b_2Tex(i-1)\} \quad (25)$$

In this preferred embodiment, for further enhancing accuracy, a model constant $c_1$ representing a disturbance is introduced to derive an equation (26) as follows:

$$Tex(i) = \frac{1}{b_1} \{Texs(i) - a_1Texs(i-1) - b_2Tex(i-1) - c_1\} \quad (26)$$

As appreciated from the foregoing description, when the model constants $a_1$, $b_1$, $b_2$ and $c_1$ can be set to appropriate values, the actual C.C. temperature Tex(i) at that time can be predicted based on the current sensor C.C. temperature Texs(i), the last sensor C.C. temperature Texs(i−1) and the last actual C.C. temperature Tex(i−1). This actual C.C. temperature Tex predicted through the C.C. temperature projecting section 21' as modeled by the equation (26) is fed to the correction amount deriving section 22. In this preferred embodiment, as in the foregoing first preferred embodiment, appropriate values for the model constants $a_1$, $b_1$, $b_2$ and $c_1$ are derived in advance through experiments or the like and prestored in the C.C. temperature predicting section 21'.

The correction value deriving section 22 derives the correction amount Fex for the basic control amount TAU of the fuel injection valve 7 based on the difference e between the predicted actual C.C. temperature Tex and the preset target C.C. temperature TR.

The multiplier 23 multiplies the basic control amount TAU of the fuel injection valve 7 by the correction amount Fex so as to derive the control amount TAU' of the fuel injection valve 7 as a corrected value of the basic control amount TAU.

Since the correction amount deriving section 22 and the multiplier 23 in this preferred embodiment are the same as those in the first preferred embodiment, no further detailed explanation thereof will be made hereinbelow.

Now, the entire operation of the temperature control system according to the third preferred embodiment will be described hereinbelow.

In the third preferred embodiment, the control circuit 20 executes a timer interrupt routine corresponding to the timer interrupt routine 100 as shown in FIG. 4 for performing the temperature control of the catalytic converter 12. As in the first preferred embodiment, the control circuit 20 executes the timer interrupt routine per, for example, 100 ms.

Figure 15:
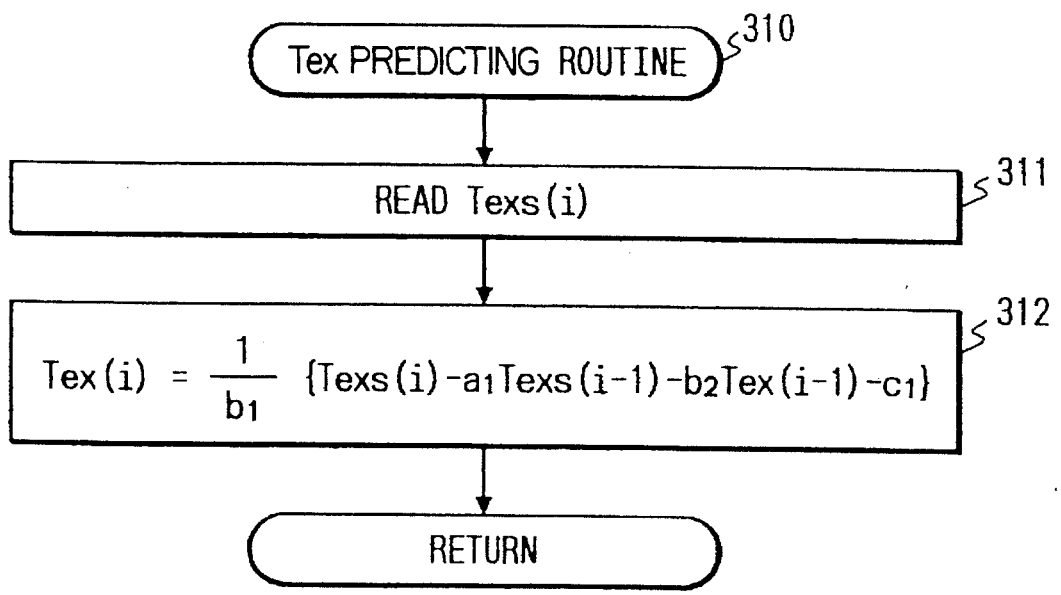
FIG. 15 is a flowchart of a subroutine representing an actual catalytic converter temperature predicting routine in a timer interrupt routine according to the third preferred embodiment.

Specifically, in the timer interrupt routine, the control circuit 20 first executes an actual C.C. temperature predicting routine via the C.C. temperature predicting section 21' for deriving the actual C.C. temperature Tex. FIG. 15 shows this actual C.C. temperature predicting routine in detail, assigning numeral 310 in the third preferred embodiment.

In FIG. 15, at step 311, the control circuit 20 reads the current sensor C.C. temperature Texs(i) outputted from the C.C. temperature sensor 14. Subsequently, at step 312, the control circuit 20 projects the actual C.C. temperature Tex (i) at that time based on the foregoing equation (26), using the current sensor C.C. temperature Texs(i) read at step 311, the model constants $a_1$, $b_1$, $b_2$ and $c_1$ stored in the C.C. temperature predicting section 21', and the last sensor C.C. temperature Texs (i−1) and the last actual C.C. temperature Tex(i−1) which are stored in the RAM or backup RAM in the control circuit 20.

Referring now back to the timer interrupt routine, the control circuit 20 executes the correction amount deriving routine via the correction amount deriving section 22 for deriving the correction amount Fex for the basic control amount TAU. Since this correction amount deriving routine just corresponds to the correction amount deriving routine 120 of FIG. 6 in the first preferred embodiment, no further detailed explanation will be made therefor.

As appreciated, the control circuit 20 in the third preferred embodiment performs the foregoing actual C.C. temperature predicting routine and correction amount deriving routine in sequence every time the timer interrupt is generated, for example, per 100 ms.

The main routine 1000 as shown in FIG. 7 is also executed in the third preferred embodiment in the same manner as in the foregoing first preferred embodiment to correct the basic control amount TAU based on the foregoing equation (10). Accordingly, no further detailed explanation will be made therefor.

As appreciated, in the third preferred embodiment, the temperature control of the catalytic converter 12 is also performed smoothly and effectively through repetition of executions of the foregoing main routine 1000. Further, in the third preferred embodiment, since the C.C. temperature sensor 14 is approximated so that its inverse model is formed as represented by the foregoing equation (26), the actual C.C. temperature Tex can be predicted more precisely.

As further appreciated, in the third preferred embodiment, the temperature projecting system may be independently constituted by the C.C. temperature sensor 14 and the C.C. temperature predicting section 21'.

Now, a fourth preferred embodiment of the present invention will be described hereinbelow.

Figure 16:
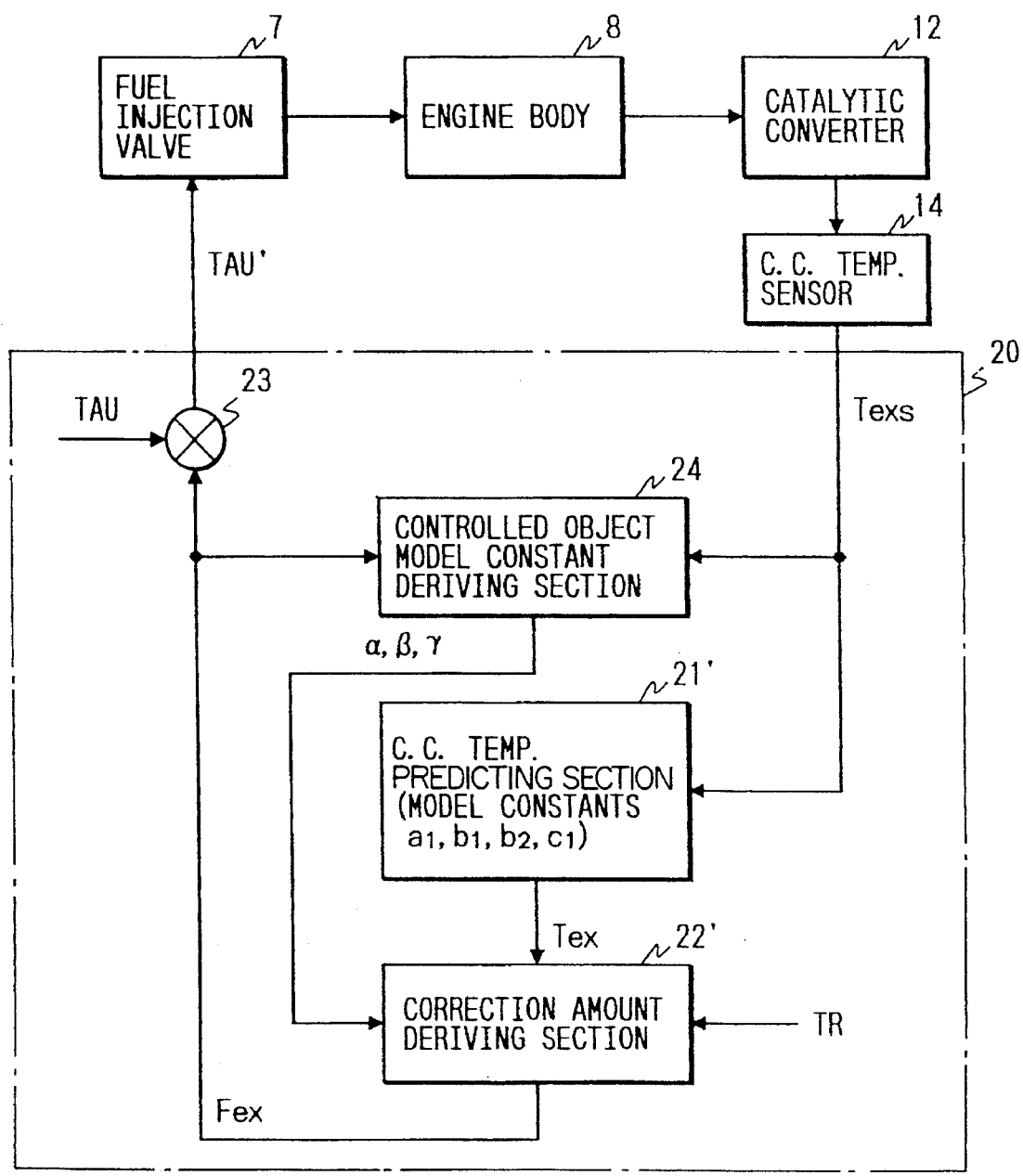
FIG. 16 is a systematic block diagram showing a temperature control system for a vehicle-installed internal combustion engine according to a fourth preferred embodiment of the present invention, for explaining an operational relationship among associated elements forming the temperature control system.

FIG. 16 is a systematic block diagram showing a temperature control system, including a temperature predicting system, for a vehicle-installed internal combustion engine according to the fourth preferred embodiment, for explaining an operational relationship among associated elements forming the temperature control system.

The fourth preferred embodiment differs from the foregoing preferred embodiments only in a functional structure of the control circuit 20 as seen from FIG. 16. Accordingly, the following description will mainly refer to such a functional structure of the control circuit 20.

As appreciated from FIG. 16, the control circuit 20 in the third preferred embodiment has a functional structure as a combination of the foregoing second and third preferred embodiments. Accordingly, in FIG. 16, elements the same as or corresponding to those in FIGS. 8 and 13 are assigned the same or corresponding marks or symbols so as to omit explanation thereof for avoiding redundant disclosure. FIG. 1 is also applied to the fourth preferred embodiment.

In the fourth preferred embodiment of FIG. 16, the actual C.C. temperature predicting section 21' is modeled as represented by the foregoing equation (26) inversely to the sensor model of the C.C. temperature sensor 14 for predicting the actual C.C. temperature Tex, as in the third preferred embodiment. The controlled object model constant deriving section 24 derives the model constants α, β and γ of the model of the controlled object in real time based on the sensor C.C. temperature Texs detected by the C.C. temperature sensor 14 and the correction amount Fex derived by the correction amount deriving section 22', as in the second preferred embodiment. Further, the correction amount deriving section 22' derives the correction amount Fex using the real-time model constants derived at the model constant deriving section 24, as in the second preferred embodiment.

Accordingly, in the fourth preferred embodiment, the control circuit 20 performs the temperature control of the catalytic converter 12 in the following manner:

(1) The control circuit 20 executes a timer interrupt routine corresponding to the timer interrupt routine 200 as shown in FIG. 9;

(2) For predicting the actual C.C. temperature Tex in the timer interrupt routine, the control circuit 20 executes an actual C.C. temperature predicting routine corresponding to the actual C.C. temperature predicting routine 310 as shown in FIG. 15;

(3) For deriving the correction amount Fex in the timer interrupt routine, the control circuit 20 executes a correction amount deriving routine corresponding to the correction amount deriving routine 220 as shown in FIG. 11;

(4) For updating the model constants of the model of the controlled object in the timer interrupt routine, the control circuit 20 executes a model constant correcting routine corresponding to the model constant correcting routine 230 as shown in FIG. 12; and (5) The control circuit 20 executes the main routine 1000 of FIG. 7 as in the foregoing preferred embodiments.

Accordingly, in the fourth preferred embodiment, the advantages realized by the foregoing second and third preferred embodiments are combined so that not only the actual C.C. temperature Tex can be predicted with high accuracy, but also the individual differences of the controlled object caused by, such as, the age-based variation and the unevenness due to manufacturing process can be effectively absorbed.

As appreciated, in the fourth preferred embodiment, the temperature projecting system may be independently constituted by the C.C. temperature sensor 14 and the C.C. temperature predicting section 21'.

In the foregoing first to fourth preferred embodiments, the behavior of the C.C. temperature sensor 14 is approximated to form the sensor model in anticipation of the first-order lag of the behavior thereof in advance, and then the model inverse to the sensor model is formed in advance so that the temperature of the catalyst or the catalytic converter, which is an engine portion to be controlled where the temperature varies depending on the operating condition of the engine, is immediately predicted using the foregoing inverse model and the model constant or constants of the sensor model which are also derived in advance through experiments or the like. In these preferred embodiments, as long as no deviation is caused in the model constant/constants, the actual C.C. temperature can be predicted reliably. On the other hand, when some deviation is caused in the model constant/constants due to, such as, age-based variation in engine condition, the actual C.C. temperature to be predicted in accordance therewith inevitably includes a corresponding error.

In view of this, a fifth preferred embodiment of the present invention will be described hereinbelow.

The fifth preferred embodiment is structured based on the following principle:

For example, during the so-called engine braking where the engine speed is relatively high and the throttle valve is fully closed or during the engine speed exceeding a preset value, the fuel cut is performed to stop the fuel injection. When the fuel cut is thus performed during the engine being operated, the exhaust gas temperature is lowered and converged to a certain constant value.

Accordingly, a temperature sensor to be used can be modeled using the foregoing temperature to be converged as a reference value. Further, by correcting or updating model constants of the sensor model every time such modeling is performed, the reliability of the predicted temperature can be ensured even when the foregoing deviation is caused in the model constants due to the age-based variation in engine operating condition.

Although the fuel cut causes both the exhaust gas temperature and the catalytic converter temperature to be converged to the certain constant value, since the catalytic converter temperature requires longer time for converging to this constant value, it is preferable here to perform the temperature control of the exhaust gas temperature.

Figure 17:
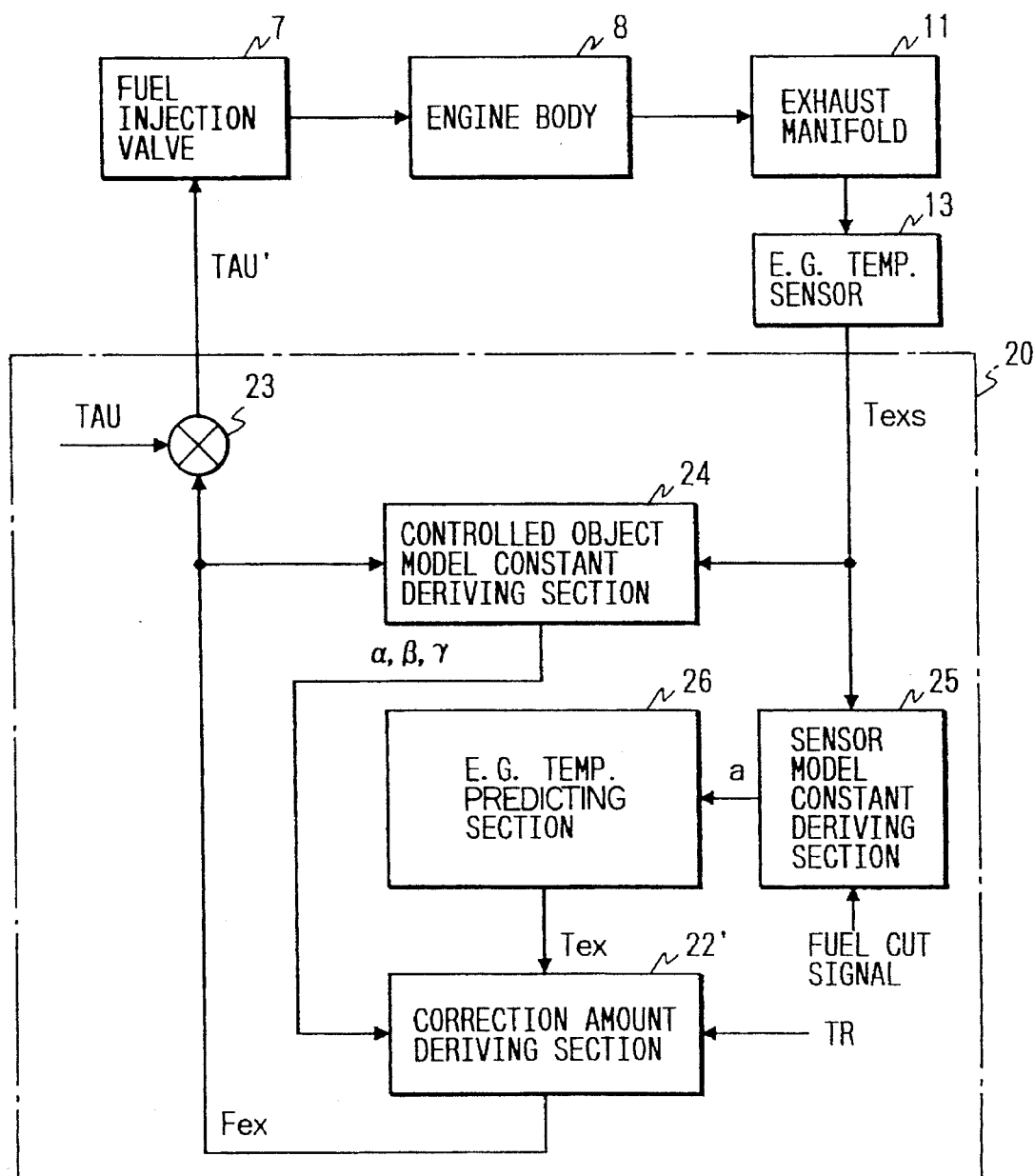
FIG. 17 is a systematic block diagram showing a temperature control system for a vehicle-installed internal combustion engine according to a fifth preferred embodiment of the present invention, for explaining an operational relationship among associated elements forming the temperature control system.

FIG. 17 is a systematic block diagram showing a temperature control system, including a temperature predicting system, for a vehicle-installed internal combustion engine according to the fifth preferred embodiment, for explaining an operational relationship among associated elements forming the temperature control system.

As seen from FIG. 17, in the fifth preferred embodiment, the exhaust gas temperature, instead of the catalytic converter temperature, is controlled using the E.G. temperature sensor 13 disposed in the exhaust manifold 11 so that a functional structure of the control circuit 20 in the fifth preferred embodiment differs from those in the foregoing preferred embodiments accordingly, which will be described hereinbelow.

In FIG. 17, elements the same as or corresponding to those in the foregoing preferred embodiments are assigned the same or corresponding marks or symbols so as to omit explanation thereof for avoiding redundant disclosure. FIG. 1 is also applied to the fifth preferred embodiment.

As shown in FIG. 17, the control circuit 20 in the fifth preferred embodiment newly includes a sensor model constant deriving section 25 for deriving a sensor model constant a. The sensor model constant a derived at the sensor model constant deriving section 25 is then fed to an exhaust gas temperature predicting section (hereinafter referred to as "E.G. temperature predicting section") 26 which predicts an actual exhaust gas temperature Tex (hereinafter referred to as "actual E.G. temperature Tex") based on the inputted model constant a.

Specifically, the sensor model constant deriving section 25 first sets a given constant temperature T in response to a fuel cut signal representing that the foregoing fuel cut is being performed. The given constant temperature T represents a pseudo value to which the exhaust gas temperature is assumed to be converged due to the execution of the fuel cut (hereinafter referred to as "convergent E.G. temperature T"), and is derived in advance through experiments or the like and prestored in the sensor model constant deriving section 25. The sensor model constant deriving section 25 further functions to model a behavior of an exhaust gas temperature Texs detected through the E.G. temperature sensor 13 (hereinafter referred to as "sensor E.G. temperature Texs"), using the foregoing given constant temperature T as a reference value. Specifically, the sensor model constant deriving section 25 forms a model approximating the behavior of the sensor E.G. temperature Texs from a time point where it is detected through the E.G. temperature sensor 13 to a time point where it reaches the convergent E.G. temperature T. Further, the sensor model constant deriving section 25 derives or updates the model constant a of the formed model every time such modeling is performed. The specific model constant deriving manner of the sensor model constant deriving section 25 will be described hereinbelow.

The behavior (a first-order lag) of the sensor E.G. temperature Texs detected through the E.G. temperature sensor 13 is modeled in a manner similar to the foregoing equation (1). Specifically, the behavior of the sensor E.G. temperature Texs is represented by the following equation (27) which, however, further includes a model constant $c_1$ representing a disturbance for further enhancing accuracy:

$$Texs(i)=aTexs(i-1)+(1-a)Tex(i1)+c_1 \qquad (27)$$

For convenience, $(1-a)$ in the equation (27) is replaced by a constant b so that the following equation (28) is derived for representing the model of the behavior of the sensor E.G. temperature Texs.

$$Texs(i)=aTexs(i-1)+bTex(i-1)+c_1 \qquad (28)$$

Hereinbelow, the model constants a, b and $c_1$ are derived based on the equation (28).

Since the model constants a, b and $c_1$ in the equation (28) are unknown, respectively, these model constants are rewritten as assumed values, and the equation (28) is further separated into a known signal and an unknown signal so that an equation (29) is derived as follows:

$$Texs(i+1) = \hat{a}Texs(i) + \hat{b}Tex(i) + \hat{c}_1 \qquad (29)$$

$$= (Texs(i) \; Tex(i) \; 1) \begin{bmatrix} \hat{a} \\ \hat{b} \\ \hat{c}_1 \end{bmatrix}$$

Thereafter, the assumed values of the unknown model constants a, b and $c_1$ are derived using the method of least squares.

Specifically, when equations (30) are given as follows:

$$Texs(i+1) = \hat{\theta}(i)W^T(i) \qquad (30)$$

$$\hat{\theta}(i) = \begin{bmatrix} \hat{a} \\ \hat{b} \\ \hat{c}_1 \end{bmatrix}$$

$$W(i) = \begin{bmatrix} Texs(i) \\ Tex(i) \\ 1 \end{bmatrix}$$

where $\theta$ represents a parameter vector and W represents a measured value vector,
and when Tex(i) is replaced by the foregoing convergent E.G. temperature T to derive an equation (31) as follows:

$$W(i) = \begin{bmatrix} Texs(i) \\ T \\ 1 \end{bmatrix} \qquad (31)$$

and further, when an equation (32) is satisfied as follows:

$$\hat{\theta}(i) = \hat{\theta}(i-1) + \frac{\Gamma(i-1)W(i)}{1 + W^T(i)\Gamma(i-1)W(i)} \{Tex(i) - W^T(i)\hat{\theta}(i-1)\} \qquad (32)$$

then, the following relation (33) is guaranteed on condition that $$i \to \infty$$

$$\begin{aligned} \hat{a} &\to a \\ \hat{b} &\to b \\ \hat{c}_1 &\to c_1 \end{aligned} \qquad (33)$$

Accordingly, by using the algorithm of the equation (32), the model constants a, b and $c_1$ which are unknown, can be derived. Accordingly, in this preferred embodiment, the equation (32) is executed in real time and the derived values are set as the required model constants a(i), b(i) and $c_1(i)$ for convenience.

In the equation (32), F is defined as:

$$\Gamma(i) = \Gamma(i-1) - \frac{\Gamma(i-1)W(i)W^T(i)\Gamma(i-1)}{1 + W^T(i)\Gamma(i-1)W(i)} \qquad (34)$$

and represents a 3×3 symmetric matrix having an initial value defined as:

$$\Gamma(-1) = \begin{bmatrix} g_0 & 0 & 0 \\ 0 & g_0 & 0 \\ 0 & 0 & g_0 \end{bmatrix} \qquad (35)$$

$$g_0 > 0$$

Referring back to FIG. 17, the E.G. temperature predicting section 26 predicts the actual E.G. temperature Tex using the constant a among the sensor model constants thus derived and updated, that is, in anticipation or consideration of the first-order lag of the E.G. temperature sensor 13 itself. Since this Tex predicting manner corresponds to the Tex predicting manner described with reference to the foregoing equations (1) to (4), no further detailed explanation will be made therefor.

Since the correction amount deriving section 22', the multiplier 23 and the controlled object model constant deriving section 24 in the fifth preferred embodiment shown in FIG. 17 are the same as those in the second preferred embodiment shown in FIG. 8, no further explanation will be made therefor.

Figure 18:
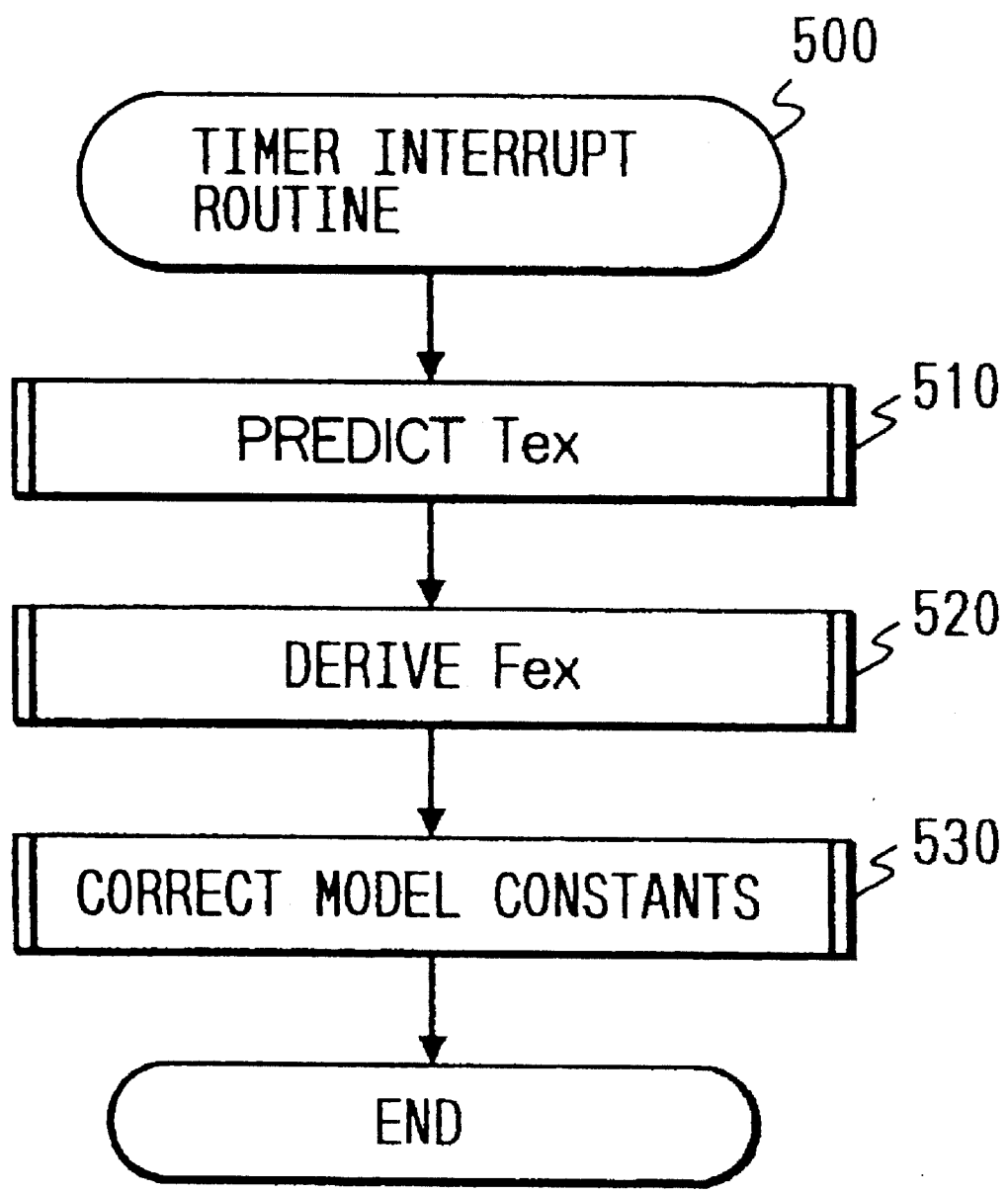
FIG. 18 is a flowchart of a timer interrupt routine to be executed by a control circuit in the fifth preferred embodiment for performing an exhaust gas temperature control.
Figure 19:
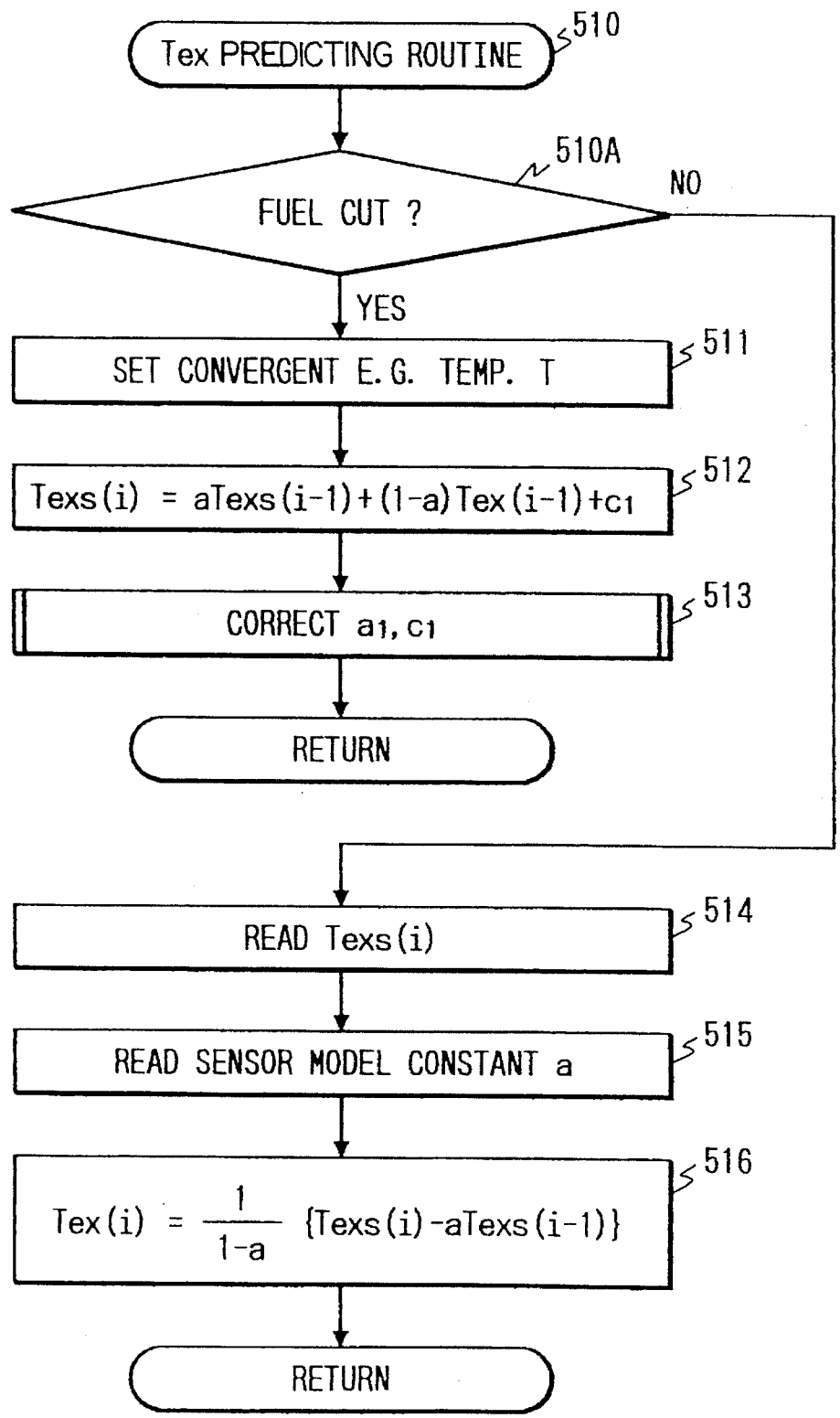
FIG. 19 is a flowchart of a subroutine representing an actual exhaust gas temperature predicting routine in the timer interrupt routine of FIG. 18.
Figure 20:
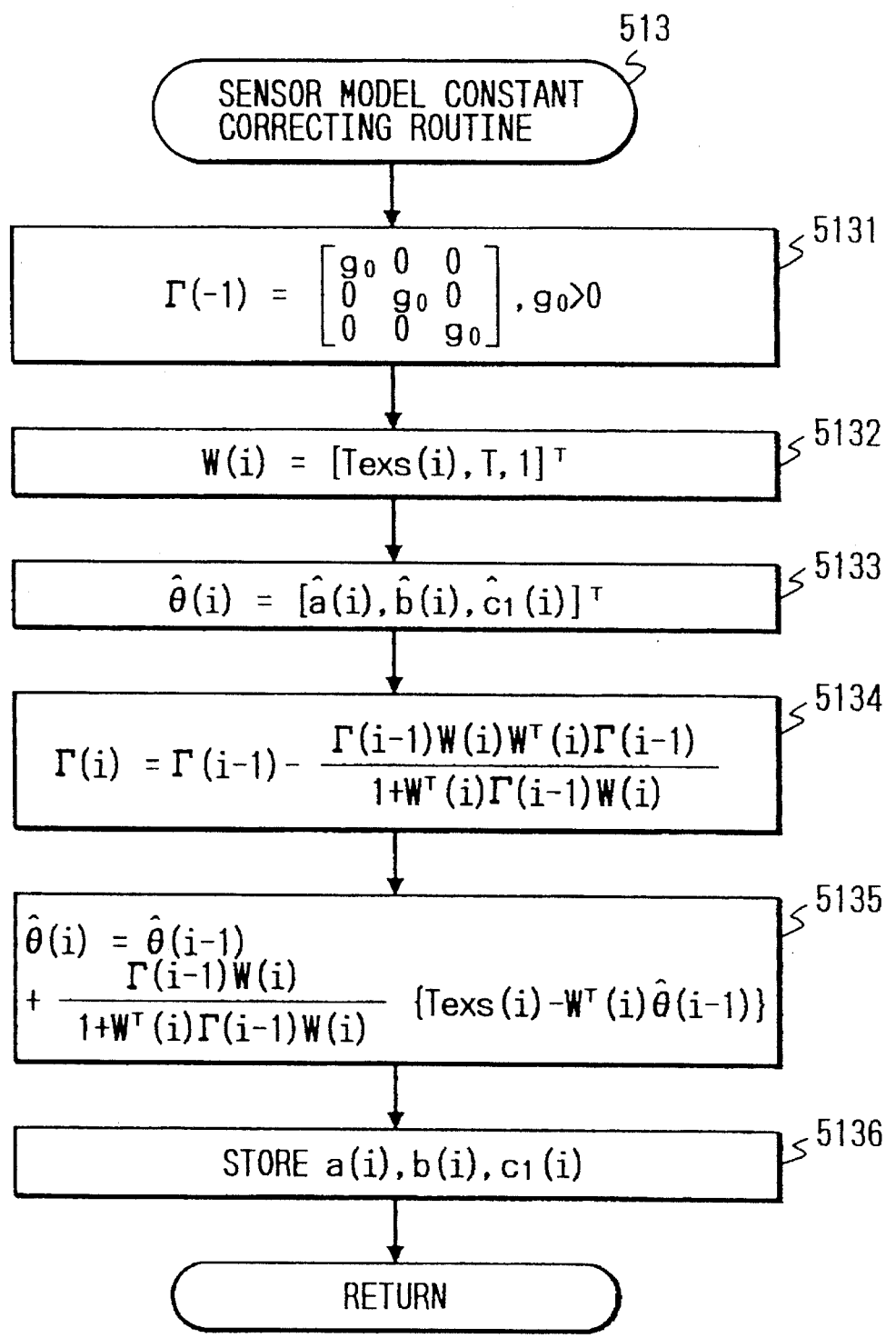
FIG. 20 is a flowchart of a subroutine representing a sensor model constant correcting routine in the timer interrupt routine of FIG. 18.

Now, the entire operation of the temperature control system according to the fifth preferred embodiment will be described with reference to FIGS. 18 to 20. FIGS. 18 to 20 show processing steps to be executed by the control circuit 20 for controlling the exhaust gas temperature.

FIG. 18 is a flowchart of a timer interrupt routine 500 to be executed by the control circuit 20 per, for example, 100 ms for performing the exhaust gas temperature control.

In this timer interrupt routine 500, at step 510, the control circuit 20 executes an actual E.G. temperature predicting routine via the sensor model constant deriving section 25 and the E.G. temperature predicting section 26 for deriving the actual E.G. temperature Tex.

FIG. 19 shows this actual E.G. temperature predicting routine in detail. In FIG. 19, at step 510A, the control circuit 20 first judges whether the fuel cut is performed, based on presence or absence of the fuel cut signal. If answer at step 510A is positive, that is, the fuel cut is being performed, the routine proceeds to step 511 where the foregoing convergent E.G. temperature T is set. Subsequently, at step 512, the control circuit 20 performs the modeling as represented by the foregoing equation (27) or (28). Thereafter, at step 513, the control circuit 20 executes a sensor model constant correcting routine for correcting the sensor model constants.

FIG. 20 shows this sensor model constant correcting routine in detail. In FIG. 20, at step 5131, the control circuit 20 first initializes the foregoing symmetric matrix Γ as indicated by the foregoing equation (35). Thereafter, at steps 5132 and 5133, the measured value vector and the parameter vector are defined as shown by the foregoing equations (30) and (31). Subsequently, at step 5134, the symmetric matrix is defined as indicated by the foregoing equation (34). Then, at step 5135, the foregoing equation (32) is executed to derive the model constants a(i), b(i) and $c_1(i)$. At subsequent step 5136, the derived model constants a(i), b(i) and $c_1(i)$ are stored in the RAM or backup RAM in the control circuit 20 as corrected or updated values of the model constants a, b and $c_1$.

On the other hand, when answer at step 510A in FIG. 19 is negative, that is, no fuel cut is being performed, the routine proceeds to step 514 where the control circuit 20 reads the current sensor E.G. temperature Texs(i) outputted from the E.G. temperature sensor 13. Subsequently, at step 515, the sensor model constant a stored in the RAM or backup RAM at step 5136 in FIG. 20 is read out. Thereafter, at step 516, the control circuit 20 derives the actual E.G. temperature Tex (i) at that time based on the foregoing equation (4), using the current sensor E.G. temperature Texs(i) read at step 514, the sensor model constant a read at step 515 and the last sensor E.G. temperature Texs (i−1) stored in the RAM or backup RAM in the control circuit 20.

Thereafter, the routine proceeds to step 520 in FIG. 18. At step 520, the control circuit 20 executes a correction amount deriving routine for deriving the correction amount Fex for the basic control amount TAU. Subsequently, at step 530, the control circuit 20 executes a controlled object model constant correcting routine for updating the controlled object model constants α, β and γ. Since the correction amount deriving routine executed at step 520 and the controlled object model constant correcting routine executed at step 530 are substantially the same as those in the second preferred embodiment shown in FIGS. 11 and 12, respectively, no further detailed explanation will be made therefor.

The main routine 1000 in FIG. 7 is also applied to the fifth preferred embodiment. Accordingly, the basic control amount TAU is corrected by the correction amount Fex derived at step 520 in FIG. 18 to derive the corrected control amount TAU' via the multiplier 23.

As appreciated from the foregoing description, in the fifth preferred embodiment, the sensor model constant for predicting the exhaust gas temperature is updated every time the fuel cut is performed, in addition to the fact that the controlled object model constants for the model of the controlled object are updated in real time so as to represent the actual operating condition of the engine more precisely and that the correction amount Fex is derived using these real-time controlled object model constants. Accordingly, individual differences of not only the controlled object but also the temperature sensor, caused by, such as, age-based variation and unevenness due to manufacturing process can be effectively absorbed. As a result, the reliable temperature projection and thus the precise and quick temperature control can be realized.

As further appreciated, in the fifth preferred embodiment, the temperature predicting system may be independently constituted by the E.G. temperature sensor 13, the sensor model constant deriving section 25 and the E.G. temperature predicting section 26.

Now, a sixth preferred embodiment of the present invention will be described hereinbelow. The sixth preferred embodiment is structured based on the same principle as that of the fifth preferred embodiment.

Figure 21:
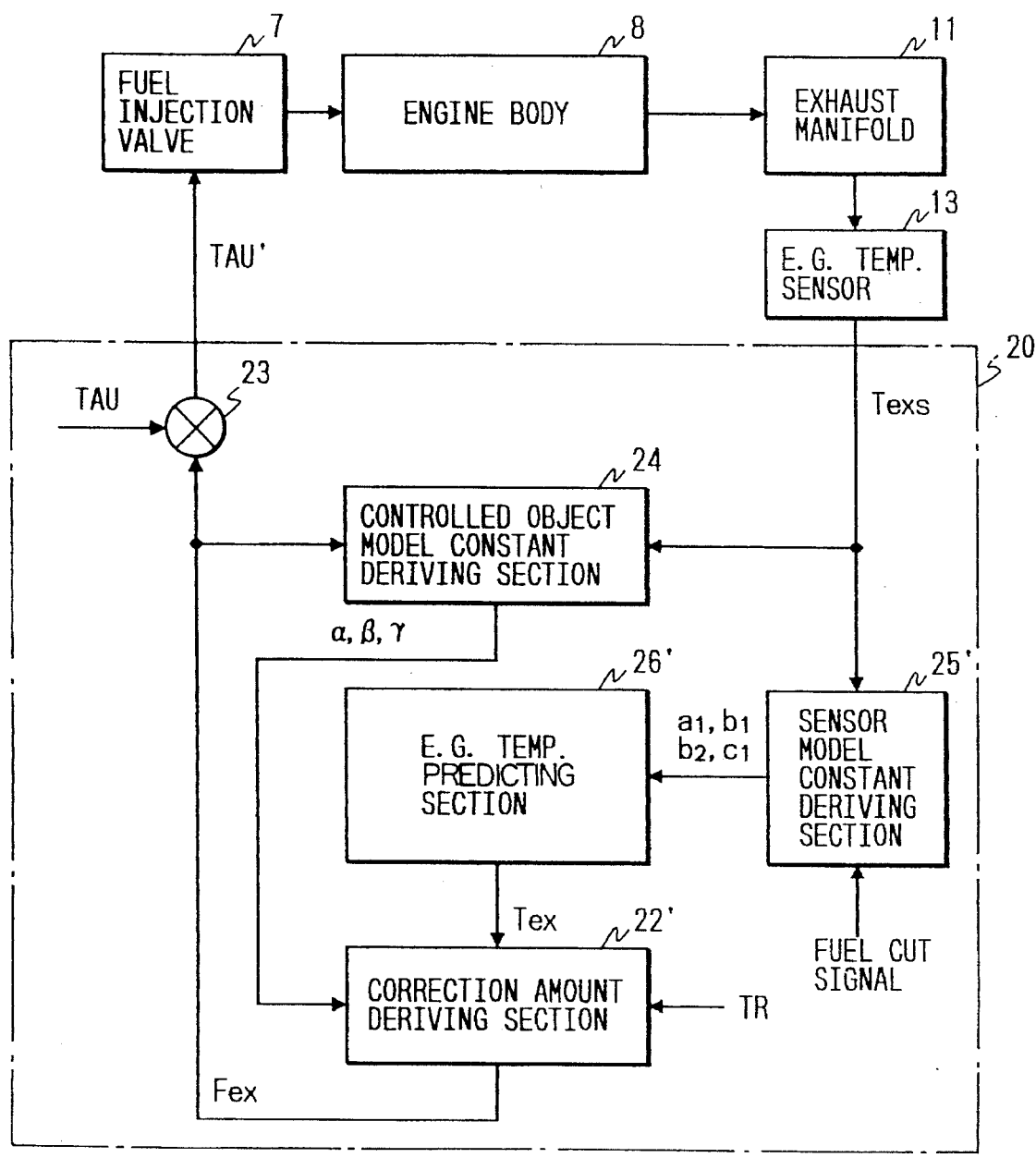
FIG. 21 is a systematic block diagram showing a temperature control system, including a temperature predicting system, for a vehicle-installed internal combustion engine according to a sixth preferred embodiment of the present invention, for explaining an operational relationship among associated elements forming the temperature control system.

FIG. 21 is a systematic block diagram showing a temperature control system, including a temperature predicting system, for a vehicle-installed internal combustion engine according to the sixth preferred embodiment, for explaining an operational relationship among associated elements forming the temperature control system.

As seen from FIG. 21, in the sixth preferred embodiment, the exhaust gas temperature is controlled using the E.G. temperature sensor 13 disposed in the exhaust manifold 11 as in the fifth preferred embodiment. Hereinbelow, a functional structure of the control circuit 20 which differs from those in the foregoing preferred embodiments will be described.

In FIG. 21, elements the same as or corresponding to those in the foregoing preferred embodiments are assigned the same or corresponding marks or symbols so as to omit explanation thereof for avoiding redundant disclosure. FIG. 1 is also applied to the sixth preferred embodiment.

As shown in FIG. 21, the control circuit 20 in the sixth preferred embodiment includes a sensor model constant deriving section 25', instead of the sensor model constant deriving section 25 in the fifth preferred embodiment, for deriving sensor model constants $a_1$, $b_1$, $b_2$ and $c_1$. The sensor model constants $a_1$, $b_1$, $b_2$ and $c_1$ derived at the sensor model constant deriving section 25' are then fed to an E.G. temperature predicting section 26', instead of the E.G. temperature predicting section 26 in the fifth preferred embodiment, which predicts an actual E.G. temperature Tex based on the inputted sensor model constants $a_1$, $b_1$, $b_2$ and $c_1$.

The sensor model constant deriving section 25' performs modeling of the E.G. temperature sensor 13 and updates the sensor model constants in response to presence of the fuel cut signal, like the sensor model constant deriving section 25 in the fifth preferred embodiment. The specific model constant deriving manner of the sensor model constant deriving section 25 will be described hereinbelow.

The sensor model constant deriving section 25' performs the modeling of the E.G. temperature sensor 13 based on the foregoing equation (23) and derives the model constants thereof. However, for further enhancing accuracy, a disturbance $c_1$ is introduced into the equation (23) so that the following equation (36) is derived:

$$Texs(i) = a_1 Texs(i-1) + b_1 Tex(i) + b_2 Tex(i) + c_1 \qquad (36)$$

Hereinbelow, the model constants $a_1$, $b_1$, $b_2$ and $c_1$ are derived based on the equation (36).

Since the model constants $a_1$, $b_1$, $b_2$ and $c_1$ in the equation (36) are unknown, respectively, these model constants are rewritten as assumed values, and the equation (36) is further separated into a known signal and an unknown signal so that an equation (37) is derived as follows:

$$Texs(i+1) = \hat{a}_1 Texs(i) + \hat{b}_1 Tex(i) + \hat{b}_2 Tex(i) + \hat{c}_1 \qquad (37)$$

$$= (Texs(i)\ Tex(i+1)\ Tex(i)\ 1) \begin{bmatrix} \hat{a}_1 \\ \hat{b}_1 \\ \hat{b}_2 \\ \hat{c}_1 \end{bmatrix}$$

Thereafter, the assumed values of the unknown model constants $a_1$, $b_1$, $b_2$ and $c_1$ are derived using the method of least squares.

Specifically, when equations (38) are given as follows:

$$Texs(i+1) = \hat{\theta}(i) W^T(i) \qquad (38)$$

$$\hat{\theta}(i) = \begin{bmatrix} \hat{a}_1 \\ \hat{b}_1 \\ \hat{b}_2 \\ \hat{c}_1 \end{bmatrix}$$

$$W(i) = \begin{bmatrix} Texs(i) \\ Tex(i+1) \\ Tex(i) \\ 1 \end{bmatrix}$$

where $\theta$ represents a parameter vector and W represents a measured value vector, and when Tex(i+1) and Tex(i) are replaced by the foregoing convergent E.G. temperature T to derive an equation (39) as follows:

$$W(i) = \begin{bmatrix} Texs(i) \\ T \\ T \\ 1 \end{bmatrix} \qquad (39)$$

and further, when an equation (40) is satisfied as follows:

$$\hat{\theta}(i) = \hat{\theta}(i-1) + \frac{\Gamma(i-1)W(i)}{1 + W^T(i)\Gamma(i-1)W(i)} \{Tex(i) - W^T(i)\hat{\theta}(i-1)\} \qquad (40)$$

then, the following relation (41) is guaranteed on condition that $$i \to \infty$$

$$\hat{a}_1 \to a_1 \qquad (41)$$
$$\hat{b}_1 \to b_1$$
$$\hat{b}_2 \to b_2$$
$$\hat{c}_1 \to c_1$$

Accordingly, by using the algorithm of the equation (40), the model constants $a_1$, $b_1$, $b_2$ and $c_1$ which are unknown, can be derived. Accordingly, in this preferred embodiment, the equation (40) is executed in real time and the derived values are set as the required model constants $a_1(i)$, $b_1(i)$, $b_2(i)$ and $c_1(i)$ for convenience.

In the equation (40), $\Gamma$ is defined as:

$$\Gamma(i) = \Gamma(i-1) - \frac{\Gamma(i-1)W(i)W^T(i)\Gamma(i-1)}{1 + W^T(i)\Gamma(i-1)W(i)} \quad (42)$$

and represents a 4×4 symmetric matrix having an initial value defined as:

$$\Gamma(-1) = \begin{bmatrix} g_0 & 0 & 0 & 0 \\ 0 & g_0 & 0 & 0 \\ 0 & 0 & g_0 & 0 \\ 0 & 0 & 0 & g_0 \end{bmatrix} \quad (43)$$

$g_0 > 0$

Referring back to FIG. 21, the E.G. temperature predicting section 26' predicts the actual E.G. temperature Tex using the sensor model constants $a_1$, $b_1$, $b_2$ and $c_1$ thus derived and updated, that is, in anticipation or consideration of the first-order lag of the E.G. temperature sensor 13 itself. Since this Tex predicting manner corresponds to the Tex predicting manner described with reference to the foregoing equations (23) to (26), no further detailed explanation will be made therefor.

Since the correction amount deriving section 22', the multiplier 23 and the controlled object model constant deriving section 24 in the sixth preferred embodiment shown in FIG. 21 are the same as those in the second preferred embodiment shown in FIG. 8, no further detailed explanation will be made therefor.

Figure 22:
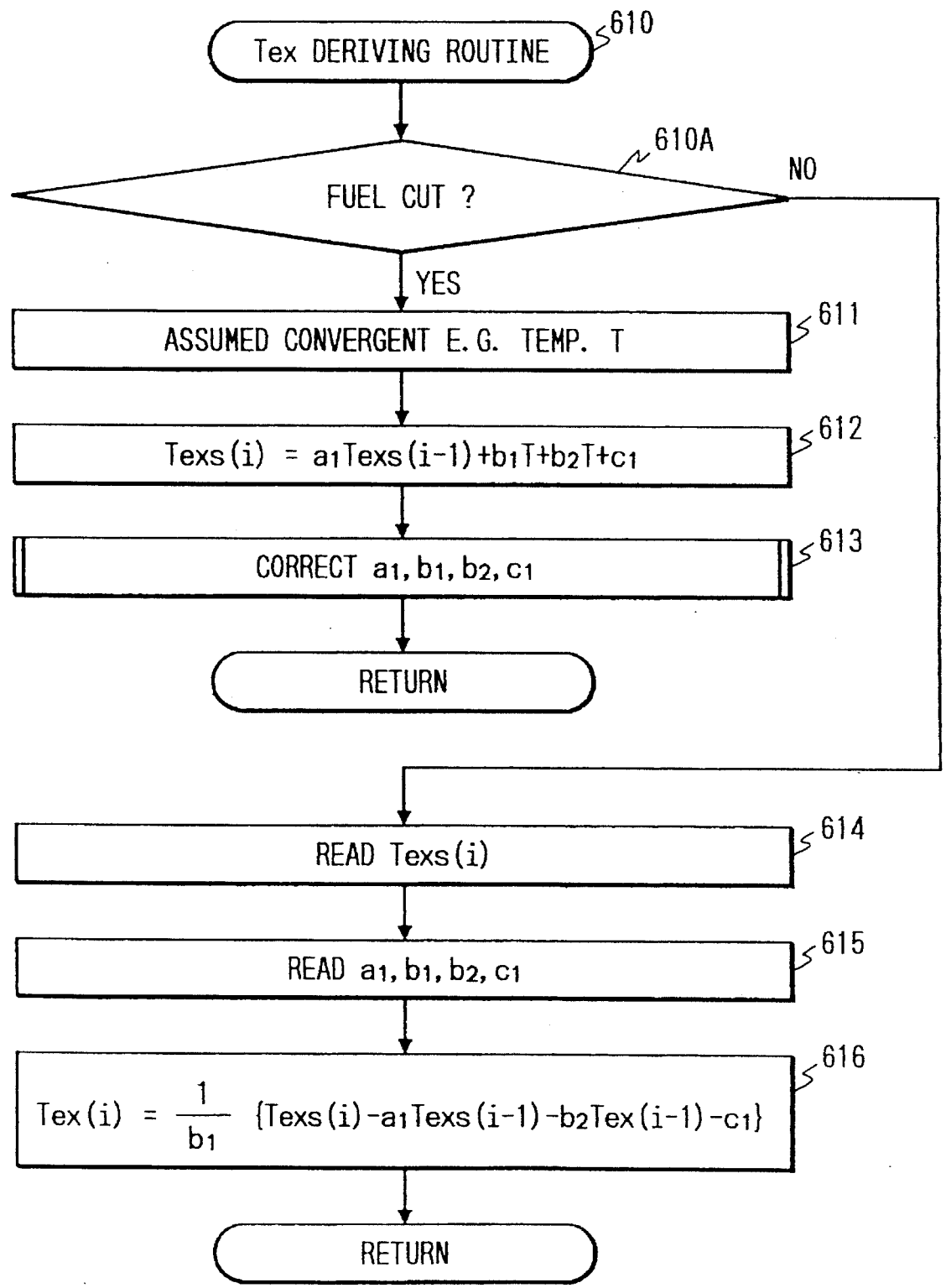
FIG. 22 is a flowchart of a subroutine representing an actual exhaust gas temperature predicting routine according to the sixth preferred embodiment.
Figure 23:
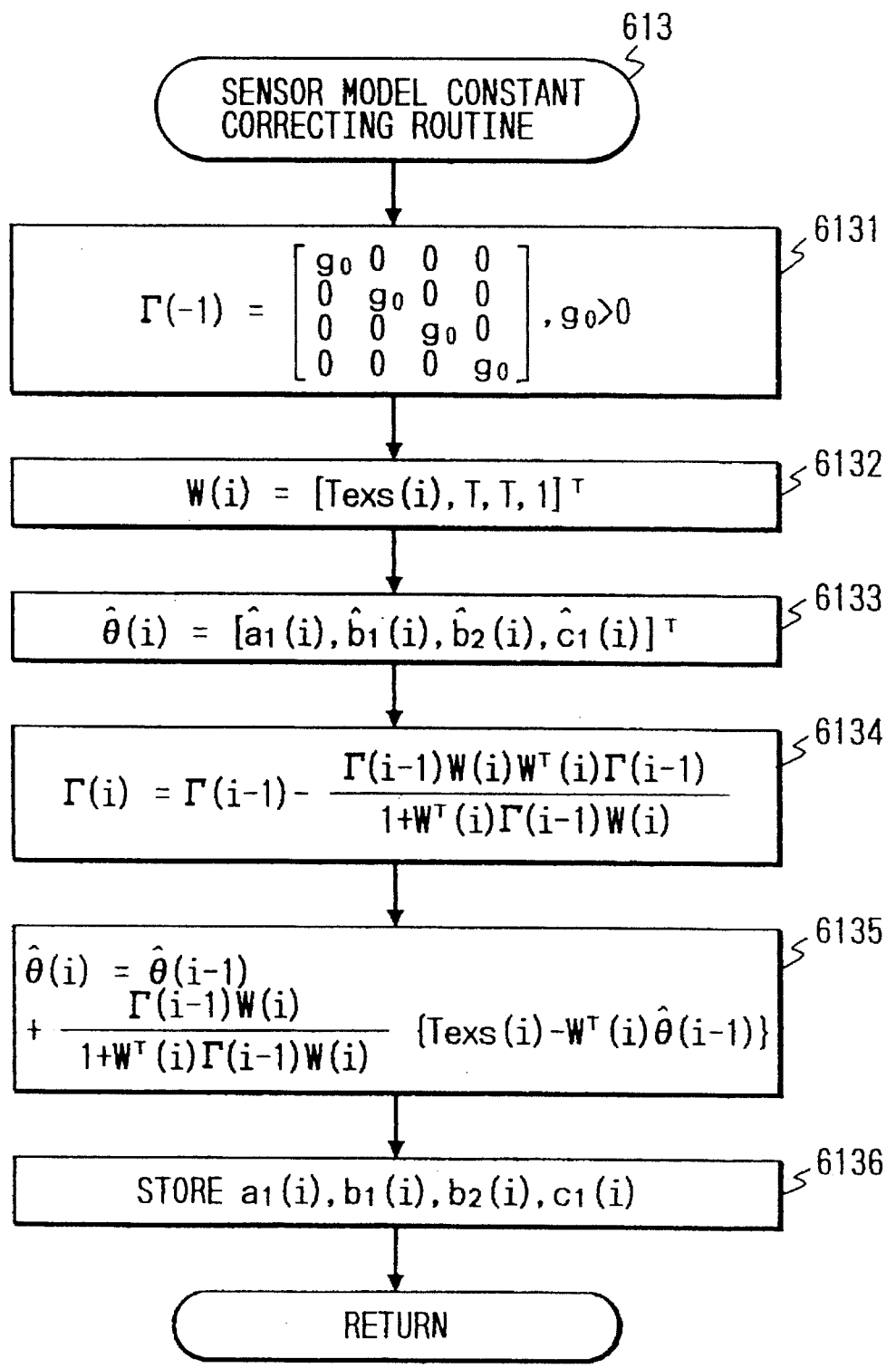
FIG. 23 is a flowchart of a subroutine representing a sensor model constant correcting routine according to the sixth preferred embodiment.

FIGS. 22 and 23 show an actual E.G. temperature predicting routine and a sensor model constant correcting routine, respectively, to be executed by the control circuit 20 for controlling the exhaust gas temperature in the sixth preferred embodiment. Since the other routines to be executed by the control circuit 20 are the same as those in the foregoing fifth preferred embodiment, the routines shown in FIGS. 22 and 23 will be described hereinbelow.

In FIG. 22, at step 610A, the control circuit 20 first judges whether the fuel cut is performed, based on presence or absence of the fuel cut signal. If answer at step 610A is positive, that is, the fuel cut is being performed, the routine proceeds to step 611 where the foregoing convergent E.G. temperature T is set. Subsequently, at step 612, the control circuit 20 performs the modeling as represented by the foregoing equation (36). Thereafter, at step 613, the control circuit 20 executes the sensor model constant correcting routine for correcting the sensor model constants.

FIG. 23 shows this sensor model constant correcting routine in detail. In FIG. 23, at step 6131, the control circuit 20 first initializes the foregoing symmetric matrix $\Gamma$ as indicated by the foregoing equation (43). Thereafter, at steps 6132 and 6133, the measured value vector and the parameter vector are defined as shown by the foregoing equations (38) and (39). Subsequently, at step 6134, the symmetric matrix $\Gamma$ is defined as indicated by the foregoing equation (42). Then, at step 6135, the foregoing equation (40) is executed to derive the model constants $a_1(i)$, $b_1(i)$, $b_2(i)$ and $c_1(i)$. At subsequent step 6136, the derived model constants $a_1(i)$, $b_1(i)$, $b_2(i)$ and $c_1(i)$ are stored in the RAM or backup RAM in the control circuit 20 as corrected or updated values of the model constants $a_1$, $b_1$, $b_2$ and $c_1$.

On the other hand, when answer at step 610A in FIG. 22 is negative, that is, no fuel cut is being performed, the routine proceeds to step 614 where the control circuit 20 reads the current sensor E.G. temperature Texs(i) outputted from the E.G. temperature sensor 13. Subsequently, at step 615, the sensor model constants $a_1$, $b_1$, $b_2$ and $c_1$ stored in the RAM or backup RAM at step 6136 in FIG. 23 are read out. Thereafter, at step 616, the control circuit 20 derives the actual E.G. temperature Tex (i) at that time based on the foregoing equation (26), using the current sensor E.G. temperature Texs(i) read at step 614, the sensor model constants $a_1$, $b_1$, $b_2$ and $c_1$ read at step 615, and the last sensor E.G. temperature Texs (i-1) and the last actual E.G. temperature Tex(i-1) stored in the RAM or backup RAM in the control circuit 20.

As appreciated from the foregoing description, in the sixth preferred embodiment, the exhaust gas temperature is predicted by establishing the sensor model which is more accurate than that in the fifth preferred embodiment. Accordingly, the exhaust gas temperature is predicted with higher accuracy.

As further appreciated, in the sixth preferred embodiment, the temperature predicting system may be independently constituted by the E.G. temperature sensor 13, the sensor model constant deriving section 25' and the E.G. temperature predicting section 26'.

In the foregoing fifth and sixth preferred embodiments, the sensor model constants are updated at the time of the fuel cut, and further, the controlled object model constants are updated in real time for deriving the correction amount Fex. However, the former arrangement that the sensor model constants are updated at the time of the fuel cut may also be applied to the foregoing first or third preferred embodiment where the controlled object model constants are not used.

Further, in the fifth and sixth preferred embodiments, it may be arranged to control the catalytic converter temperature instead of the exhaust gas temperature.

Now, a seventh preferred embodiment of the present invention will be described hereinbelow.

Figure 24:
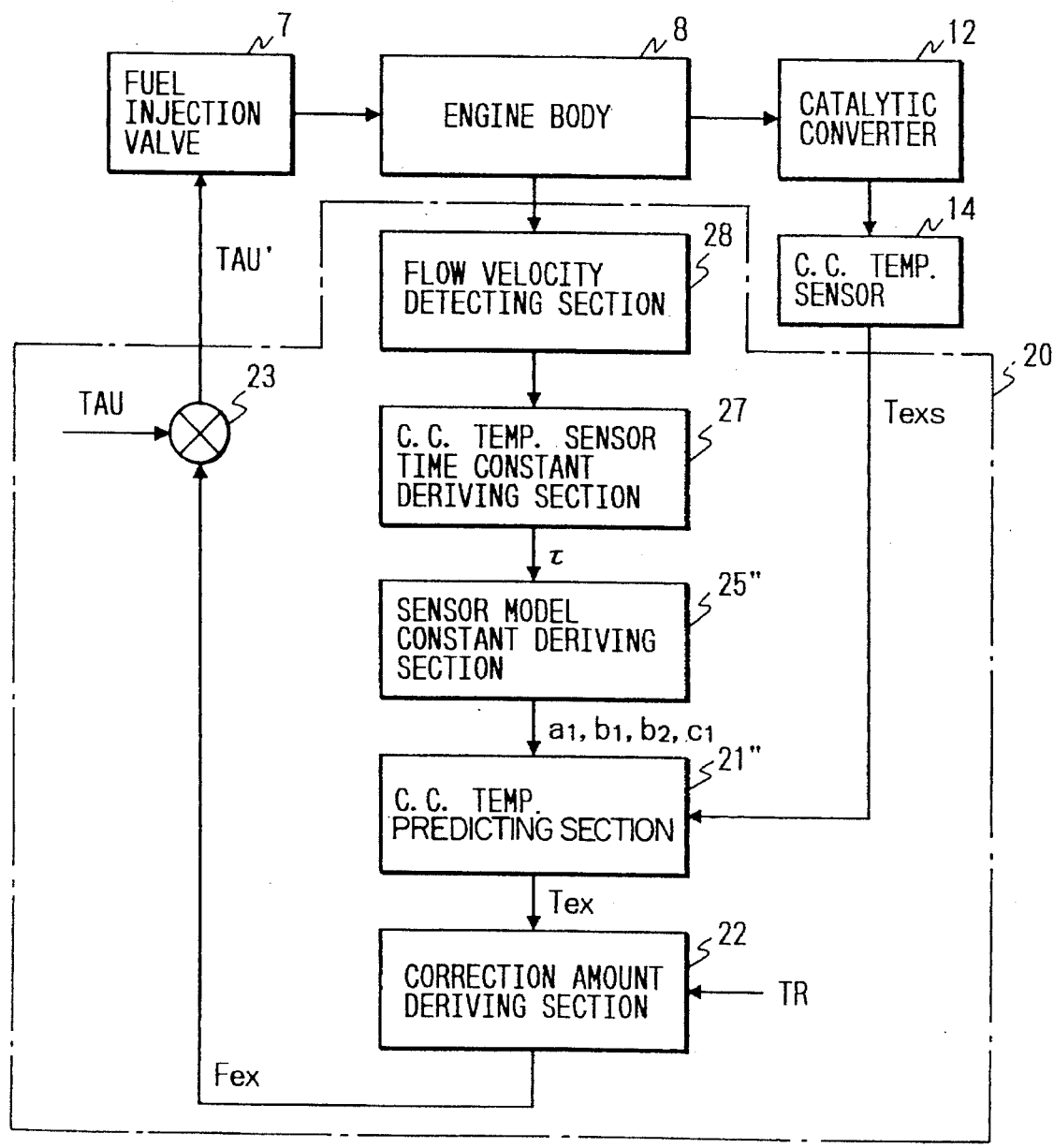
FIG. 24 is a systematic block diagram showing a temperature control system, including a temperature predicting system, for a vehicle-installed internal combustion engine according to a seventh preferred embodiment of the present invention, for explaining an operational relationship among associated elements forming the temperature control system.

FIG. 24 is a systematic block diagram showing a temperature control system, including a temperature predicting system, for a vehicle-installed internal combustion engine according to the seventh preferred embodiment, for explaining an operational relationship among associated elements forming the temperature control system.

In FIG. 24; elements the same as or corresponding to those in FIG. 13 are assigned the same or corresponding marks or symbols so as to omit explanation thereof for avoiding redundant disclosure. FIG. 1 is also applied to the seventh preferred embodiment.

In FIG. 24, a flow velocity detecting section 28 detects a flow velocity of the exhaust gas, and a C.C. temperature sensor time constant deriving section 27 derives a time constant $\tau$ of the C.C. temperature sensor 14 depending on the flow velocity detected at the flow velocity detecting section 28. Hereinbelow, the specific deriving manner of the sensor time constant $\tau$ will be described.

In general, when measuring a temperature of a fluid, the sensor time constant $\tau$ is determined by a density $\rho$, a specific heat c and a radius r of a sensor element and a heat transfer coefficient h between the sensor element and the fluid, and is represented by the following equation (44):

$$\tau = \frac{\rho c r}{2h} \quad (44)$$

On the other hand, the heat transfer coefficient h differs depending on a representative dimension of the temperature sensor, a kind of the fluid, a flow velocity $\mu$ of the fluid and the like.

Accordingly, when kinds of the temperature sensor and the fluid are determined, the heat transfer coefficient h of the temperature sensor is represented by the following equation (45):

$$h = \chi + \psi \sqrt{\mu} \quad (45)$$

where $\chi$ and $\Psi$ are unknown constants which depend on an element and a diameter of the sensor, a kind of the fluid and the like.

Accordingly, when measuring the C.C. temperature, the sensor time constant $\tau$ varies depending on a flow velocity $\mu$ of the exhaust gas in the catalyst or catalytic converter 12. This means that, by detecting the gas flow velocity $\mu$ in the catalytic converter 12 in real time and deriving the time constant $\tau$ of the C.C. temperature sensor depending on the detected gas flow velocity $\mu$, the sensor time constant $\tau$ can be derived accurately under any engine operating condition.

In this regard, when, for example, the gas flow velocity $\mu$ in the catalytic converter 12 is derived based on the engine operating condition data monitored by the engine speed sensor 18 and the pressure sensor 1, the sensor time constant $\tau$ is represented by an equation (46) as follows:

$$\tau = \frac{1}{C_1 + C_2 \sqrt{Ne \times Pm}} \quad (46)$$

where $C_1$ and $C_2$ are unknown constants, respectively, which depend on an element of the sensor, a kind of the fluid, the heat transfer coefficient and the like, and where optimum values of $C_1$ and $C_2$ can be derived in advance through experiments or the like.

In this preferred embodiment, the gas flow velocity $\mu$ in the catalytic converter is derived based on the engine operating condition data detected by the engine speed sensor 18 and the pressure sensor 1. However, when an airflow meter is provided, the gas flow velocity $\mu$ in the catalytic converter can also be derived based on data monitored by the airflow meter. Further, it may be arranged to derive a certain value which corresponds to the gas flow velocity $\mu$ in the catalytic converter.

In FIG. 24, a sensor model constant deriving section 25" derives model constants of a model of the C.C. temperature sensor 14 based on the time constant $\tau$ of the C.C. temperature sensor 14 derived through the time constant deriving section 27.

In the seventh preferred embodiment, a response delay for the sensor C.C. temperature Texs detected by the C.C. temperature sensor 14 is represented by an equation (47) as follows:

$$Texs(i+1) = a_1 Texs(i) + b_1 Tex(i+1) + b_2 Tex(i) + c_1 \quad (47)$$

where i is a variable representing the number of control times, and $a_1$, $b_1$, $b_2$ and $c_1$ are model constants, respectively, of the C.C. temperature sensor 14.

The equation (47) represents that the sensor C.C. temperature Texs is detected with a first-order lag $(b_1 Z + b_2)/(Z - a_1)$ from the actual C.C. temperature Tex, which is graphically shown in FIG. 14A. However, in this preferred embodiment, as in the foregoing preferred embodiments, the actual C.C. temperature Tex should be predicted from the sensor C.C. temperature Texs. Accordingly, a model inverse to the sensor model represented by the equation (47) is considered as shown in FIG. 14B. An equation (48) is derived as follows based on the equation (47) for representing this inverse model:

$$(Z - a_1) Texs(i) = (b_1 Z + b_2) Tex(i) \quad (48)$$

Accordingly, the actual C.C. temperature Tex is derived by an equation (49) as follows:

$$Tex(i+1) = \frac{1}{b_1} \{Texs(i+1) - a_1 Texs(i) - b_2 Tex(i) - c_1\} \quad (49)$$

However, the equation (49) includes future data (i+1) which can not be used. Accordingly, the equation (49) is approximated by an equation (50) as follows:

$$Tex(i) = \frac{1}{b_1} \{Texs(i) - a_1 Texs(i-1) - b_2 Tex(i-1) - c_1\} \quad (50)$$

As appreciated from the foregoing description, when the model constants $a_1$, $b_1$, $b_2$ and $c_1$ are given, the actual C.C. temperature Tex(i) at that time can be predicted based on the current sensor C.C. temperature Texs(i), the last sensor C.C. temperature Texs(i−1) and the last actual C.C. temperature Tex(i−1).

However, the model constants $a_1$, $b_1$, $b_2$ and $c_1$ are the unknown constants which depend on the time constant $\tau$ of the C.C. temperature sensor 14.

The deriving manner of the model constant $a_1$ will be described hereinbelow as an example.

When a sampling period T of the sensor C.C. temperature Texs(i) is given, an equation (51) is derived as follows:

$$a_1 = \exp\left(-\frac{T}{\tau}\right) \quad (51)$$

Accordingly, the unknown model constant $a_1$ can be derived in real time, using the sensor time constant $\tau$ derived from the foregoing equation (46).

As appreciated, the other unknown model constants $b_1$, $b_2$ and $c_1$ can also be similarly derived in real time, using the sensor time constant $\tau$ derived from the foregoing equation (46).

Referring back to FIG. 24, a C.C. temperature predicting section 21" predicts the actual C.C. temperature Tex based on the foregoing equation (50), using the sensor C.C. temperature Texs detected by the C.C. temperature sensor 14 and the model constants a1, b1, b2 and c1 derived through the sensor model constant deriving section 25".

Since the correction amount deriving section 22 and the multiplier 23 are the same as those in the first and third preferred embodiments, no further detailed explanation will be made therefor.

Figure 25:
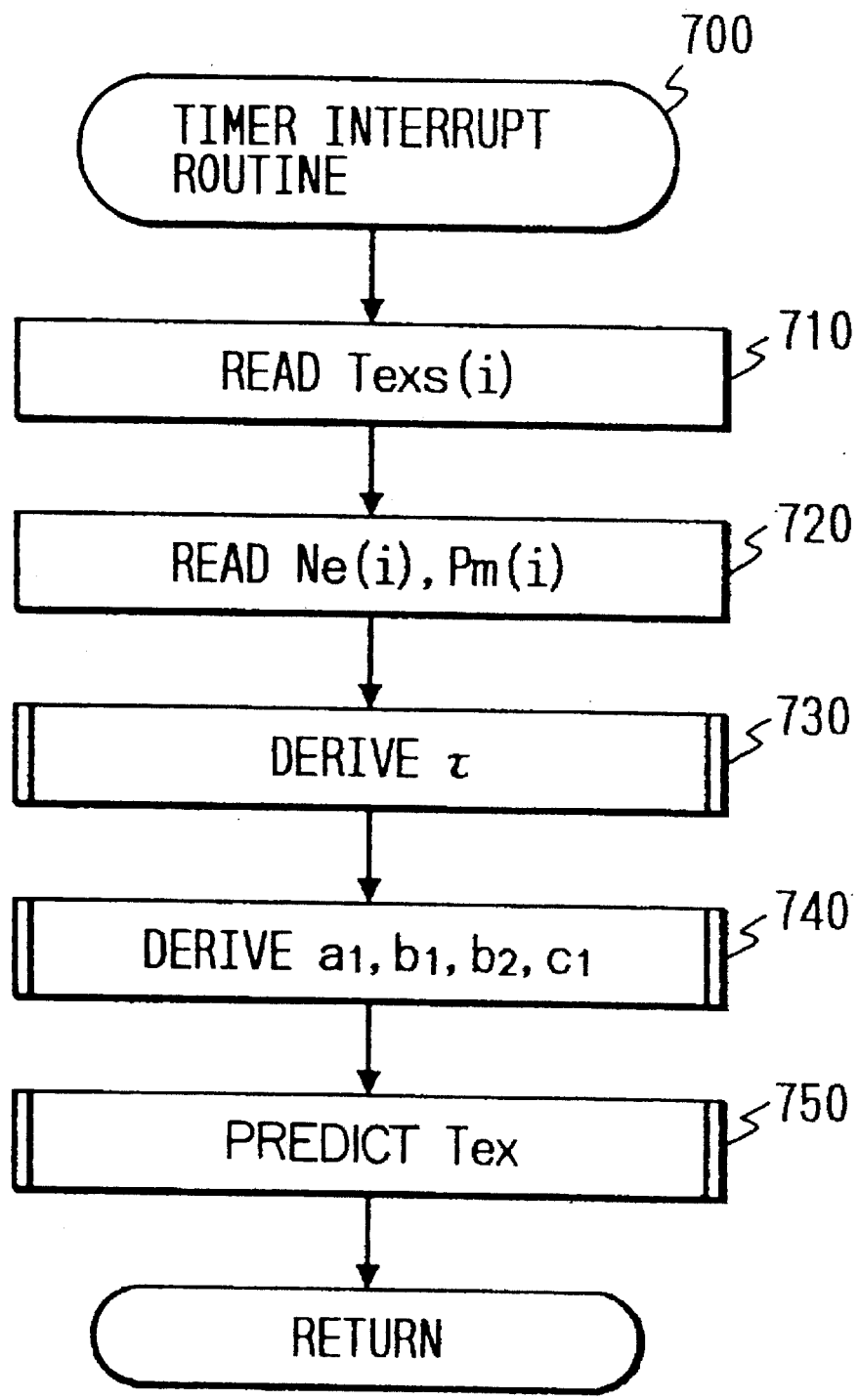
FIG. 25 is a flowchart of a timer interrupt routine to be executed by a control circuit in the seventh preferred embodiment for performing a temperature control of the catalytic converter.

FIG. 25 is a flowchart of a timer interrupt routine 700 to be executed by the control circuit 20 per, for example, 120 ms for deriving or projecting the temperature of the catalytic converter 12 according to the seventh preferred embodiment.

In this timer interrupt routine 700, at step 710, the control circuit 20 reads the current sensor C.C. temperature Texs(i) outputted from the C.C. temperature sensor 14. Subsequently, at step 720, the control circuit 20 reads the current engine speed data Ne(i) outputted from the engine speed sensor 18 and the current intake pressure data Pm(i) outputted from the pressure sensor 1 for detecting the current engine operating condition.

Thereafter, the routine proceeds to step 730 where the control circuit executes a sensor time constant deriving routine for deriving the time constant $\tau$ of the C.C. temperature sensor 14.

Figure 26:
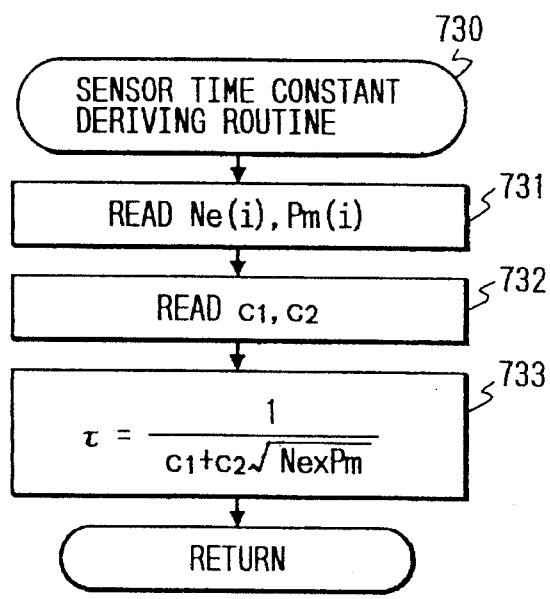
FIG. 26 is a flowchart of a subroutine representing a sensor time constant deriving routine in the timer interrupt routine of FIG. 25.

FIG. 26 shows this sensor time constant deriving routine in detail. In FIG. 26, at step 731, the control circuit 20 reads the engine speed data Ne(i) and the intake pressure data Pm(i) read at step 720 and temporally stored in the RAM or the like, into the time constant deriving section 27. Subsequently, at step 732, the control circuit 20 reads the foregoing constants C1 and C2 derived in advance through experiments or the like as described above and prestored in the backup RAM or ROM or the like, into the time constant deriving section 27. Thereafter, at step 733, the control circuit 20 derives, through the time constant deriving section 27, the time constant τ of the C.C. temperature sensor 14 based on the foregoing equation (46), using Ne(i), Pm(i) read at step 731 and $C_1$, $C_2$ read at step 732.

Thereafter, the routine proceeds to step 740 in FIG. 25. At step 740, the control circuit 20 executes a model constant deriving routine for deriving the model constants $a_1$, $b_1$, $b_2$ and $c_1$ based on the sensor time constant τ derived at step 730.

Figure 27:
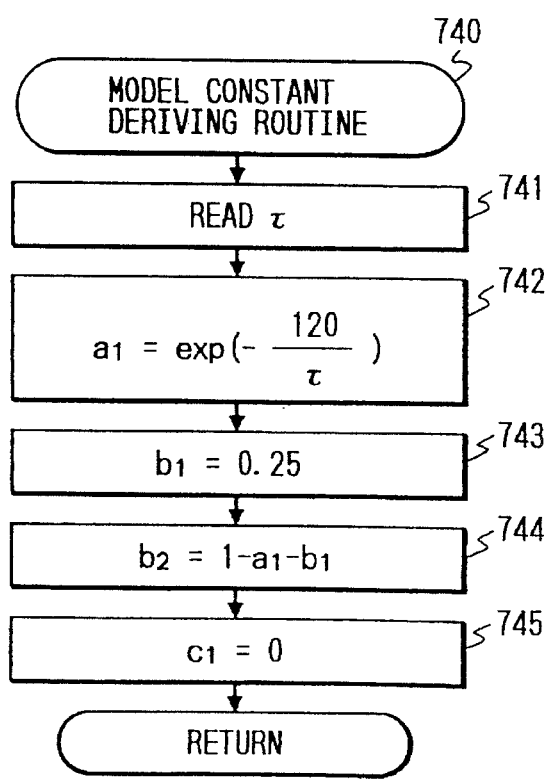
FIG. 27 is a flowchart of a subroutine representing a sensor model constant deriving routine in the timer interrupt routine of FIG. 25.

FIG. 27 shows this model constant deriving routine in detail. In FIG. 27, at step 741, the control circuit 20 reads the sensor time constant τ derived at step 730 into the sensor model constant deriving section 25". Subsequently, at step 742, the control circuit 20 derives the model constant $a_1$ based on, for example, the foregoing equation (51), using the sensor time constant τ read at step 741 and the foregoing preset temperature sampling period T. In the example of FIG. 27, the temperature sampling period T is set to 120ms. Further, in the example of FIG. 27, the model constants $b_1$ and $c_1$ are set to fixed values, respectively, which are derived through experiments or the like to be optimum, and the model constant $b_2$ is derived using the model constants $a_1$ and $b_1$. However, it may also be arranged to derive the model constants b1, b2 and c1 based on a real-time calculation using the sensor time constant τ like the model constant $a_1$.

Thereafter, the routine proceeds to step 750 in FIG. 25. At step 750, the control circuit 20 executes an actual C.C. temperature predicting routine for deriving or predicting the actual C.C. temperature Tex at that time.

Figure 28:
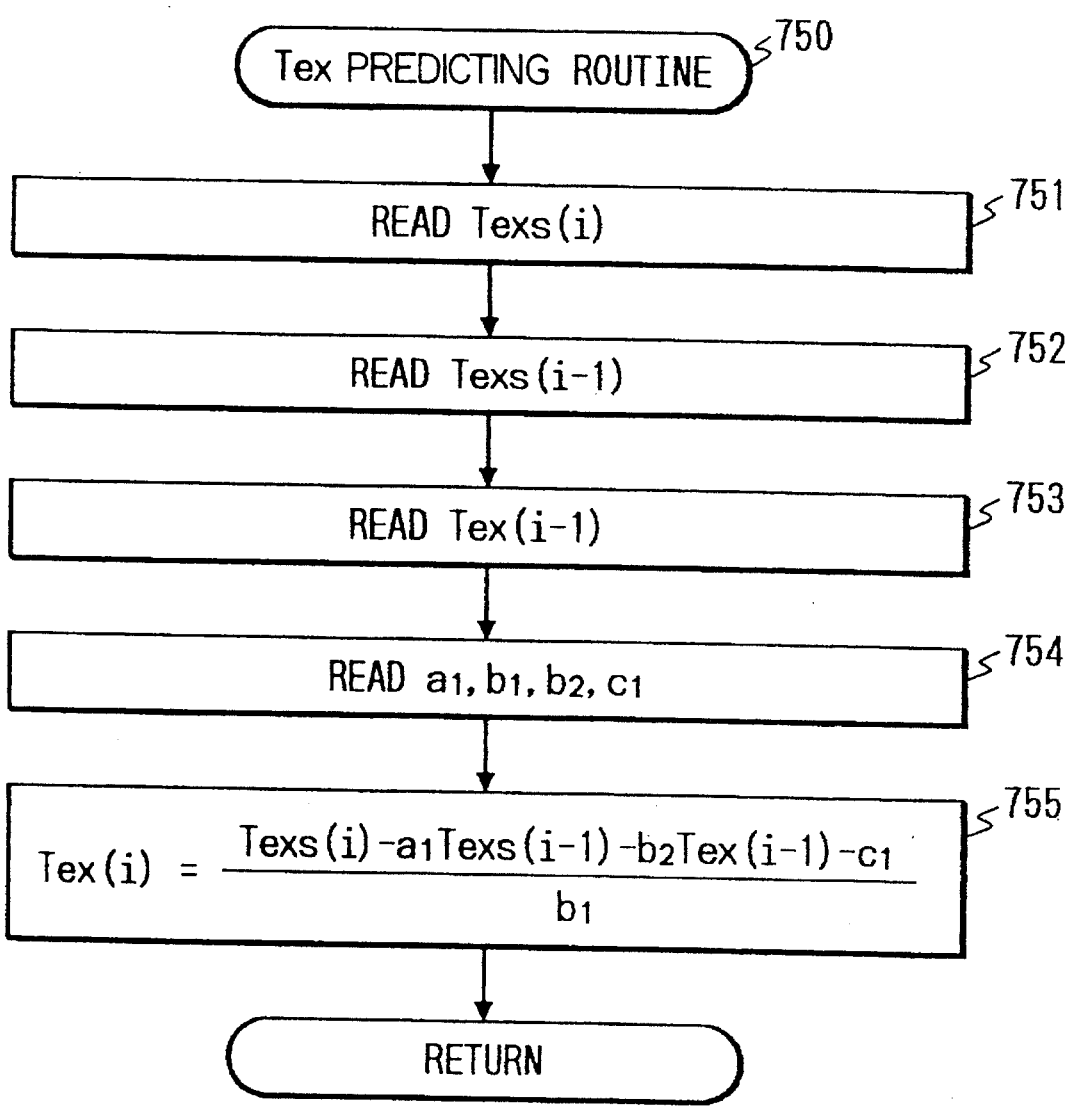
FIG. 28 is a flowchart of a subroutine representing an actual catalytic converter temperature predicting routine in the timer interrupt routine of FIG. 25.

FIG. 28 shows this actual C.C. temperature predicting routine in detail. In FIG. 28, at step 751, the control circuit 20 reads out the current sensor C.C. temperature Texs(i) read at step 710 in FIG. 25 and stored in the RAM or backup RAM. Subsequently, at step 752, the control circuit 20 reads out the last sensor C.C. temperature Texs(i−1) stored in the RAM or backup RAM. Then, at step 753, the control circuit 20 reads out the last actual C.C. temperature Tex(i−1) stored in the RAM or backup RAM. Further, at step 754, the control circuit 20 reads out the model constants $a_1$, $b_1$, $b_2$ and $c_1$ derived at step 740. Thereafter, at step 755, the control circuit 20, through the C.C. temperature predicting section 21", derives the actual C.C. temperature Tex(i) at that time based on the foregoing equation (50), using the read values Texs(i), Texs(i−1), Tex(i−1) and $a_1$, $b_1$, $b_2$, $c_1$.

Although not shown in FIG. 25, the control circuit 20 then executes, through the correction amount deriving section 22, a correction amount deriving routine as identified in FIG. 6 for deriving the correction amount Fex for the basic control amount TAU, using the actual C.C. temperature Tex(i) derived at step 750 in FIG. 25.

Thereafter, the main routine as identified in FIG. 7 is executed as in the foregoing preferred embodiments for correcting the basic control amount TAU with the correction amount Fex to derive the corrected control amount TAU', using the foregoing equation (10).

As appreciated from the foregoing description, in the seventh preferred embodiment, the modeling as represented by the foregoing equation (50) is performed relative to the C.C. temperature sensor 14, and the model constants therefor are derived in real time depending on the gas flow velocity at that time. Accordingly, the catalytic converter temperature can be predicted reliably under any engine operating condition, thus leading to the temperature control of the catalytic converter with higher accuracy.

As further appreciated, in the seventh preferred embodiment, the temperature predicting system may be independently constituted by the C.C. temperature sensor 14, the flow velocity detecting section 28, the C.C. temperature sensor time constant deriving section 27, the sensor model constant deriving section 25" and the C.C. temperature predicting section 21".

In the seventh preferred embodiment, the catalytic converter temperature is an object to be controlled. However, the exhaust gas temperature may be an object to be controlled as in the foregoing fifth or sixth preferred embodiment.

Further, the modeling of the C.C. temperature sensor 14 is not limited to that represented by the foregoing equation (47) but is arbitrary. For example, the foregoing equation (1) may be applied in the seventh preferred embodiment.

Further, a combination of the seventh preferred embodiment with the fifth or sixth preferred embodiment may be possible. Specifically, in the combined system, while the fuel cut is performed, the model constants of the temperature sensor are derived using the foregoing assumed convergent temperature as a reference value, and while otherwise, the model constants are derived in real time based on the monitored fluid velocity.

Now, an eighth preferred embodiment of the present invention will be described hereinbelow. In the eighth preferred embodiment, a rapid warming-up control of the catalyst or catalytic converter 12 (hereinafter referred to as "C.C. rapid warming-up control") is performed using an exhaust gas temperature (hereinafter referred to as "E.G. temperature") predicted in the foregoing fifth or sixth preferred embodiment.

In this preferred embodiment, during the cold starting of the engine or while the catalytic converter is below a given activating temperature at which the catalytic converter can purify the exhaust gas harmful components to a sufficient level, a catalytic converter temperature (hereinafter referred to as "C.C. temperature") is increased as rapidly as possible to the foregoing activating temperature by means of the C.C. rapid warming-up control, such as, an ignition timing retard control or an engine speed-up control, for reducing emission of the exhaust gas harmful components. Further, in order to prevent heat deterioration of associated parts in the exhaust system, such as, the catalytic converter due to the E.G. temperature or the C.C. temperature being excessively or abnormally increased, the C.C. rapid warming-up control is stopped when the predicted E.G. or C.C. temperature becomes equal to or greater than a given temperature.

Figure 29:
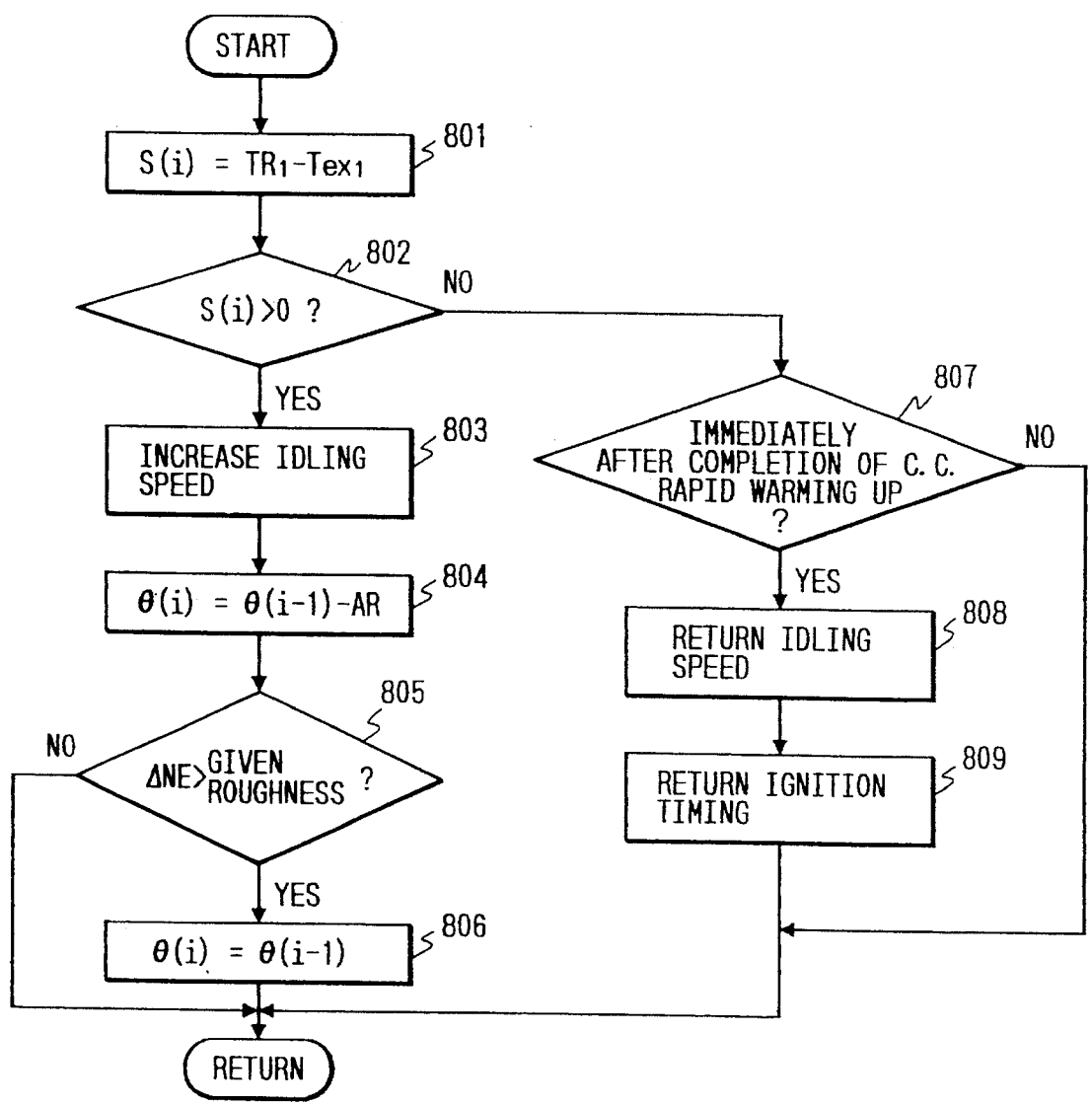
FIG. 29 is a flowchart of a routine to be executed by the control circuit for performing a catalytic converter rapid warming-up control according to an eighth preferred embodiment of the present invention.

FIG. 29 is a flowchart Of a routine to be executed by the control circuit 20 for performing the foregoing C.C. rapid warming-up control. This routine is executed per, for example, 100 ms.

In FIG. 29, at step 801, a deviation S(i) between a target E.G. temperature $TR_1$ and an actual E.G. temperature $Tex_1$ predicted in the fifth or sixth preferred embodiment, is derived. The target E.G. temperature TR1 represents an E.G. temperature at which the catalytic converter 12 reaches the foregoing given activating temperature. Subsequently, step 802 determines whether the deviation S(i) is greater than 0 (zero). When the deviation S(i) is equal to or less than 0, the routine proceeds to step 807 which determines whether it is immediately after the completion of the C.C. rapid warming-up operation, that is, whether the idling engine speed and the ignition timing controlled under the C.C. rapid warming-up operation have been returned to values before the C.C. rapid warming-up operation or corresponding to the current engine operating condition. When answer at step 807 is positive, that is, the idling engine speed and the ignition timing have not been returned to such values, they are returned to the respective values at steps 808 and 809 and this routine is terminated. On the other hand, when answer at step 807 is negative, the routine is terminated bypassing steps 808 and 809.

Referring back to step 802, when the deviation S(i) is greater than 0, the routine proceeds to step 803 where the idling engine speed is increased to a given value, for example, 1,200 rpm. Subsequently, at steps 804 and 805, the ignition timing θ is retarded per given retarding unit angle or magnitude AR until a variation ΔNE of the engine speed exceeds a given magnitude of fluctuation or roughness. When answer at step 805 is positive, that is, when the engine speed variation ΔNE exceeds the given roughness, the routine proceeds to step 806 where the ignition timing retard control is stopped and the ignition timing immediately before the engine speed variation ΔNE has exceeded the given roughness at step 805 is held. Thereafter, the routine is terminated.

Figure 30:
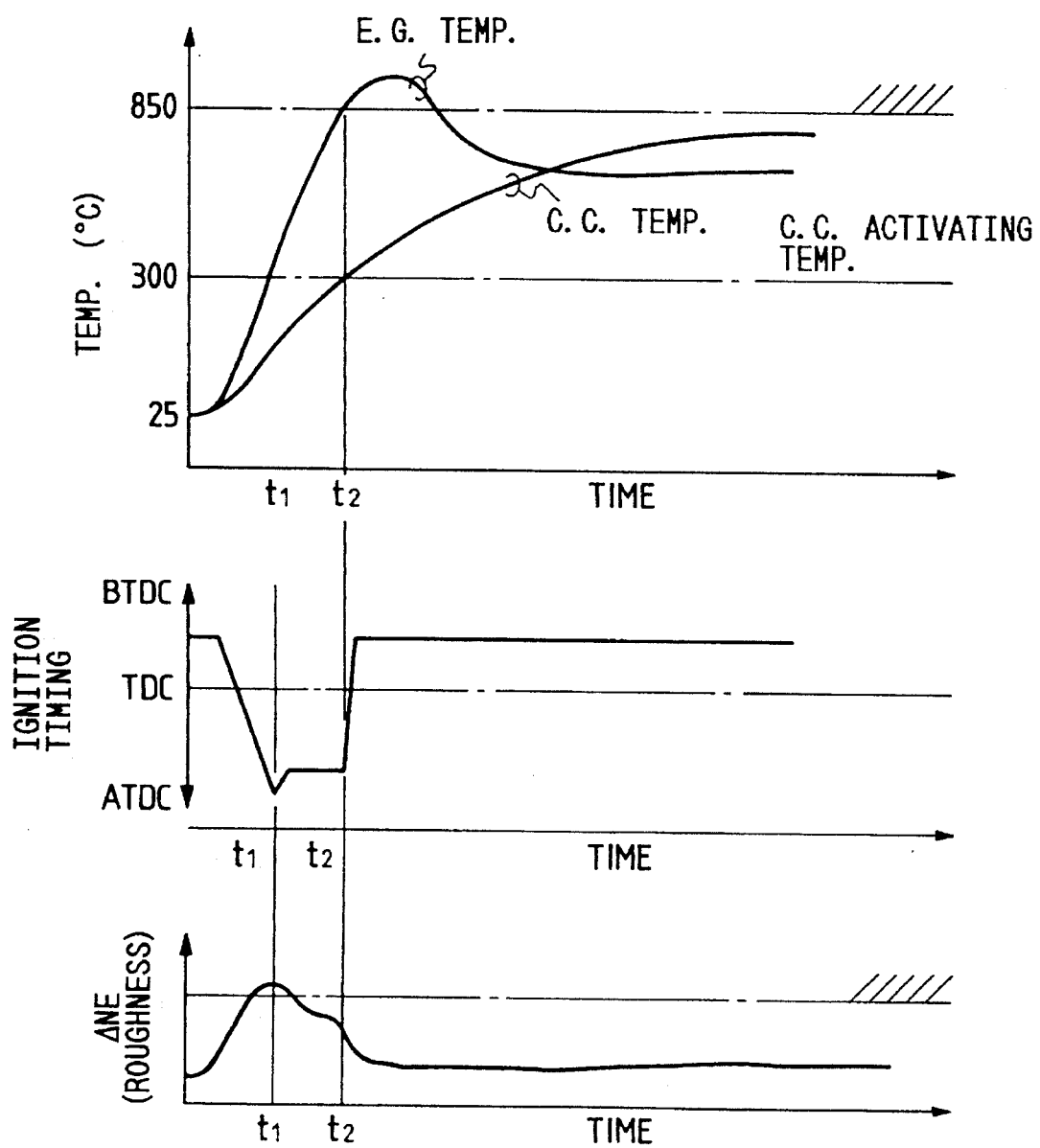
FIG. 30 is a time chart showing a relationship among an exhaust gas temperature, a catalytic converter temperature, an ignition timing and an engine speed roughness when the catalytic converter rapid warming-up control is performed.

FIG. 30 is a time chart showing a relationship among the E.G. temperature, the C.C. temperature, the ignition timing and the engine speed roughness ΔNE. The following description will be made with reference to this time chart.

When the predicted E.G. or C.C. temperature is smaller than the given value for example, at the time of the cold start-up of the engine, the C.C. rapid warming-up control is performed. Specifically, the idling engine speed is increased to 1,200 rpm (not shown), and the ignition timing is retarded until the engine speed variation ΔNE reaches the given roughness at time point $t_1$. When the engine speed variation ΔNE exceeds the given roughness, the ignition timing is held fixed to a value immediately before ΔNE has exceeded the given roughness. Further, when the predicted E.G. temperature $Tex_1$ becomes equal to or greater than the target E.G. temperature $TR_1$, for example, 850° C. in this preferred embodiment, the idling engine speed up is stopped and further the ignition timing is advanced.

By executing the foregoing routine, the C.C. temperature can be increased to its activating temperature for a shorter time while the E.G. or C.C. temperature can be prevented from excessively increasing to cause the heat deterioration of the associated parts in the exhaust system, such as, the catalytic converter.

Figure 31:
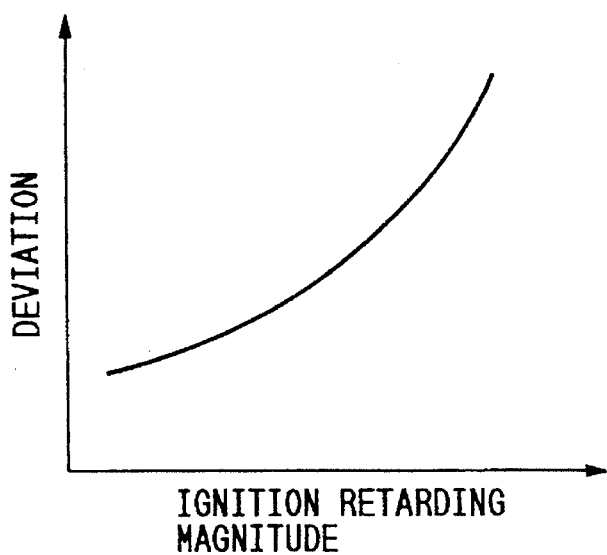
FIG. 31 is a characteristic map to be used in the catalytic converter rapid warming-up control.

In the foregoing eighth preferred embodiment, it may be arranged that the ignition retarding magnitude during the C.C. rapid warming-up operation is set to a smaller value as the deviation S(i) is smaller, and vice versa, as shown in FIG. 31. By this arrangement, when the deviation is large, the ignition retarding magnitude is immediately increased so as to rapidly increase the E.G. temperature.

Figure 32:
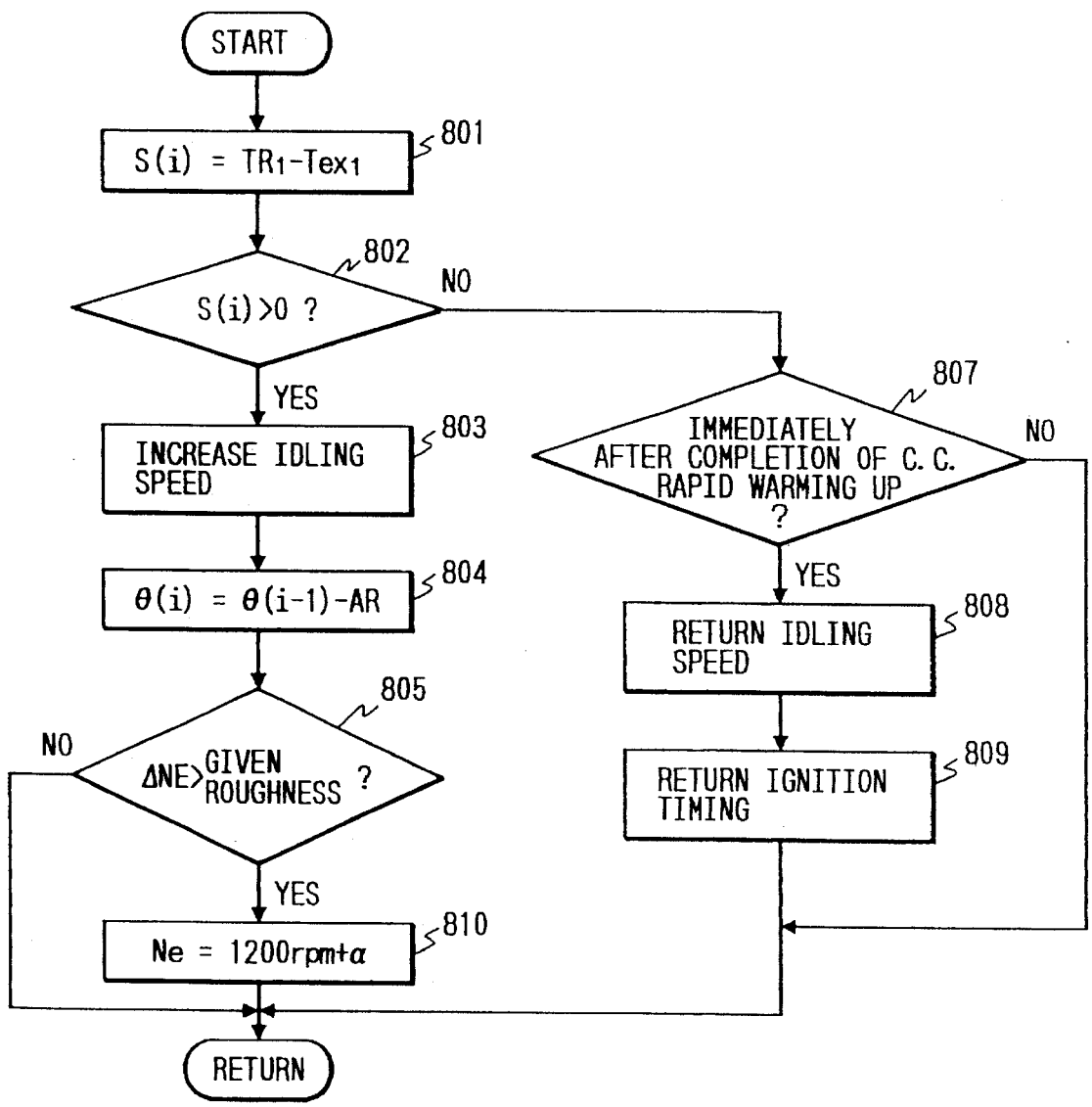
FIG. 32 is a flowchart of a routine to be executed by the control circuit for performing a catalytic converter rapid warming-up control according to a modification of the eighth preferred embodiment.

FIG. 32 shows a modification of the eighth preferred embodiment.

In the eighth preferred embodiment, as shown in FIG. 29, the ignition timing θ is retarded until the given roughness of the engine speed is reached. On the other hand, in FIG. 32, when the given roughness of the engine speed is reached at step 805, the idling engine speed Ne is increased by a given unit value a at step 810. Accordingly, in FIG. 32, step 806 in FIG. 29 is replaced by step 810. The other steps in FIG. 32 are the same as those in FIG. 29.

In the modification shown in FIG. 32, the given unit value a may be set to a larger value as the deviation S(i) is larger. By this arrangement, the catalytic converter 12 can be warmed up more rapidly.

Now, a ninth preferred embodiment of the present invention will be described hereinbelow.

In the ninth preferred embodiment, a temperature control of a lean NOx catalyst or catalytic converter is performed using the E.G. temperature predicted in the fifth or sixth preferred embodiment.

Figure 33:
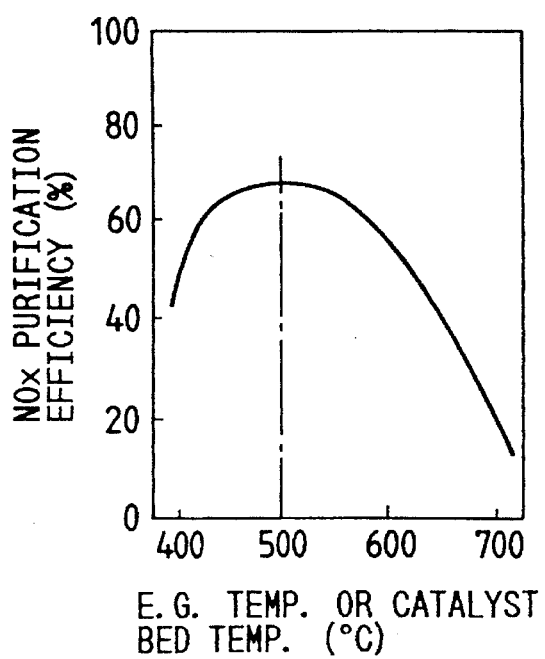
FIG. 33 is a graph showing a NOx (nitrogen oxide) purification characteristic of a lean NOx catalyst to be used in a ninth preferred embodiment of the present invention.

In the lean-burn system where the lean burn is performed, a zeolite-based lean NOx catalyst carrying transition metal or noble metal is provided in the exhaust system for purifying NOx (nitrogen oxide) discharged in a lean air-fuel ratio range. On the other hand, as shown in FIG. 33, a purification efficiency of the lean NOx catalyst differs depending on a temperature of the exhaust gas flowing through the catalyst or a catalyst bed temperature, and becomes maximum when such a temperature is around 500° C. The purification efficiency is significantly lowered in the other temperature range.

Accordingly, in the ninth preferred embodiment, the E.G. temperature or the catalyst bed temperature is controlled for constantly holding the purification efficiency of the lean NOx catalyst to be high.

FIG. 34 is a schematic structural diagram showing the temperature control system for the vehicular engine according to the ninth preferred embodiment.

In FIG. 34, a catalytic converter 19 containing the lean NOx catalyst is provided downstream of the three way catalytic converter 12. The E.G. temperature sensor 13 is provided between the catalytic converters 12 and 19, that is, downstream of the three way catalytic converter 12 and Upstream of the lean NOx catalytic converter 19. The other structure in FIG. 34 is the same as that in FIG. 1.

The temperature of the exhaust gas flowing into the catalytic converter 19 is detected by the E.G. temperature sensor 13. The actual E.G. temperature Tex is predicted based on the detected E.G. temperature Texs by means of the process as described in the foregoing fifth or sixth preferred embodiment. The E.G. temperature is controlled to be within a target temperature range based on the predicted E.G. temperature Tex.

Figure 35:
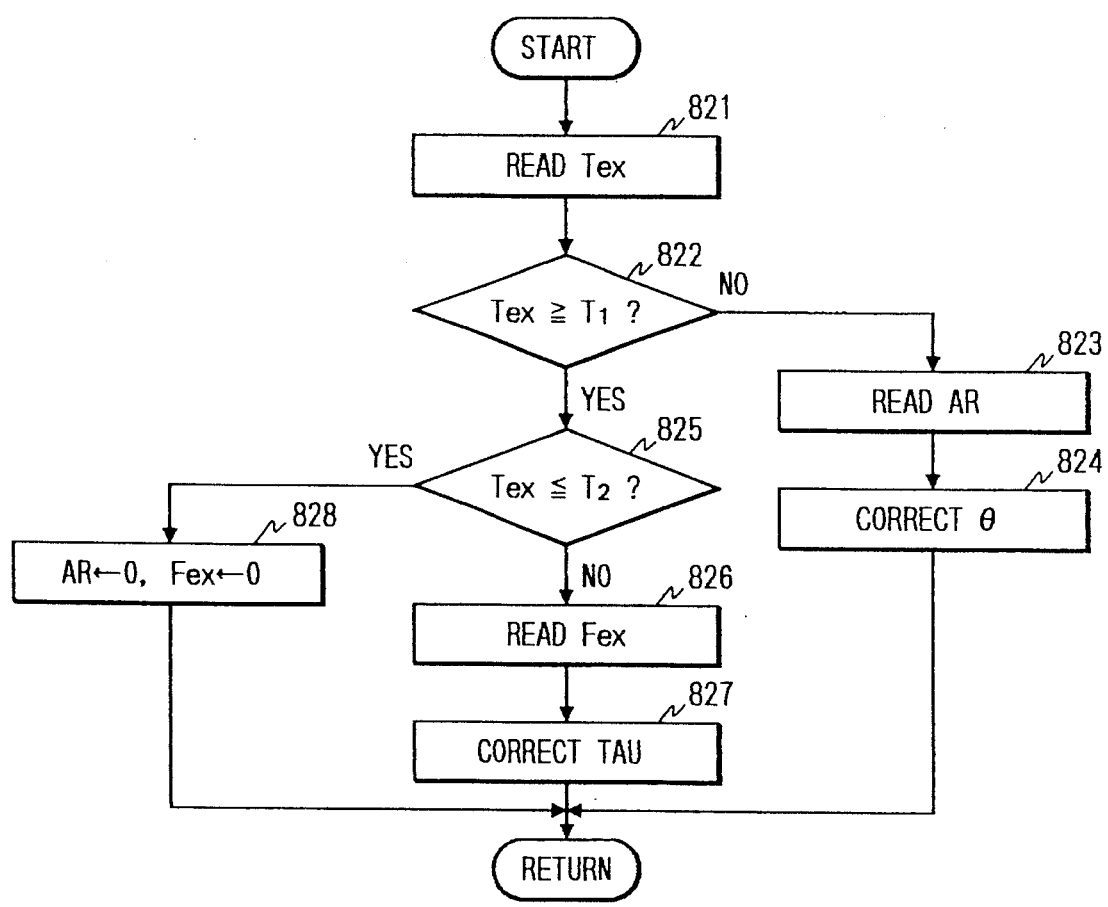
FIG. 35 is a flowchart of a routine to be executed by the control circuit for performing a temperature control of a lean NOx catalyst according to the ninth preferred embodiment.

FIG. 35 is flowchart of a routine to be executed by the control circuit for performing the temperature control of the lean NOx catalyst. This routine is executed per, for example, 100 ms.

In FIG. 35, at step 821, the actual E.G. temperature Tex predicted in the process as described in the fifth or sixth preferred embodiment is read out. Subsequently, step 822 determines whether Tex≧$T_1$. $T_1$ represents a lower limit value of the target temperature range. When Tex<$T_1$, the routine proceeds to step 823 where the given ignition retarding unit magnitude AR is read out, and further to step 824 where the ignition timing θ is retarded by AR for increasing the E.G. temperature which is now lower than the target temperature range. Then, this routine is terminated.

On the other hand, when Tex≧$T_1$ at step 822, the routine proceeds to step 825 which determines whether Tex≦$T_2$. $T_2$ represents an upper limit value of the target temperature range. When Tex≦$T_2$, the routine proceeds to step 828 where the retarding magnitude AR and a correction amount Fex for a basic control amount (basic fuel injection amount) TAU of the fuel injection valve 7 are reset. Then, this routine is terminated.

On the other hand, when Tex>$T_2$ at step 825, the routine proceeds to step 826 where the correction amount Fex is read out. As appreciated, the correction amount Fex can be derived in the manner as described in the fifth or sixth preferred embodiment. Subsequently, at step 827, the basic control amount TAU is corrected based on Fex so as to increase the fuel injection amount of the fuel injection valve 7. By increasing the fuel injection amount, the E.G. temperature which is now higher than the target temperature range is lowered. Thereafter, this routine is terminated.

Since the sensor E.G. temperature Texs detected by the E.G. temperature sensor 13 includes a response delay, it was difficult to control the E.G. temperature within the target temperature range based on the sensor E.G. temperature Texs. However, in this preferred embodiment, since the actual E.G. temperature Tex predicted in the process as described in the fifth or sixth preferred embodiment is used, the E.G. temperature can be easily controlled within the target temperature range. Accordingly, the high purification efficiency of the lean NOx catalytic converter 19 can be held constantly so that the deterioration of NOx emission is effectively prevented.

In the ninth preferred embodiment, steps 822 to 824 may be omitted when there is only a low possibility or no possibility that the actual E.G. temperature Tex becomes lower than the lower limit value $T_1$ under the normal engine operating condition.

Further, in the ninth preferred embodiment, instead of controlling the E.G. temperature, the actual catalyst bed temperature may be predicted in the process as described in any one of the first to fourth and seventh preferred embodiments, and controlled.

Now, a tenth preferred embodiment of the present invention will be described hereinbelow.

In the tenth preferred embodiment, a heater energization control for rapidly warming up oxygen concentration detecting means, for example, the $O_2$ sensor 29 in this preferred embodiment, is performed using the actual E.G. temperature predicted in the process as described in the foregoing fifth or sixth preferred embodiment.

In the exhaust system of the internal combustion engine, the $O_2$ sensor 29 (FIG. 1) is provided for monitoring an oxygen concentration in the exhaust gas. Based on the oxygen concentration detected by the $O_2$ sensor 29, the feedback control is performed for the fuel control system or the ignition timing control system for controlling a fuel injection amount, a fuel injection timing or an ignition timing so as to improve composition of the exhaust gas. This effectively enhances the purification efficiency of the catalytic converter 12. The $O_2$ sensor 29 uses a zirconia element or the like so as to measure a generated electromotive force or electrical resistance for measuring the oxygen concentration in the exhaust gas. However, a certain high temperature is necessary for activating the $O_2$ sensor 29. Without such activation, the $O_2$ sensor 29 does not output a signal which precisely corresponds to the oxygen concentration.

In this regard, the $O_2$ sensor 29 in this preferred embodiment is provided with a heater in the form of a resistance line embedded in the element of the $O_2$ sensor 29. Accordingly, by energizing the heater, the $O_2$ sensor 29 is heated so that the rapid warming up of the $O_2$ sensor 29 is achieved.

However, since the electric power is supplied to the heater of the $O_2$ sensor 29 for increasing an element temperature thereof, an additional load is applied to an alternator and thus to the engine to deteriorate the fuel consumption. Further, when the E.G. temperature is increased, the temperature of the $O_2$ sensor 29 is also increased to make it unnecessary to energize the heater.

In view of this, in the tenth preferred embodiment, the energization of the heater of the $O_2$ sensor 29 is controlled based on the E.G. temperature for effectively performing the rapid warming up of the $O_2$ sensor 29 without wasting the unnecessary electric power.

Figure 36:
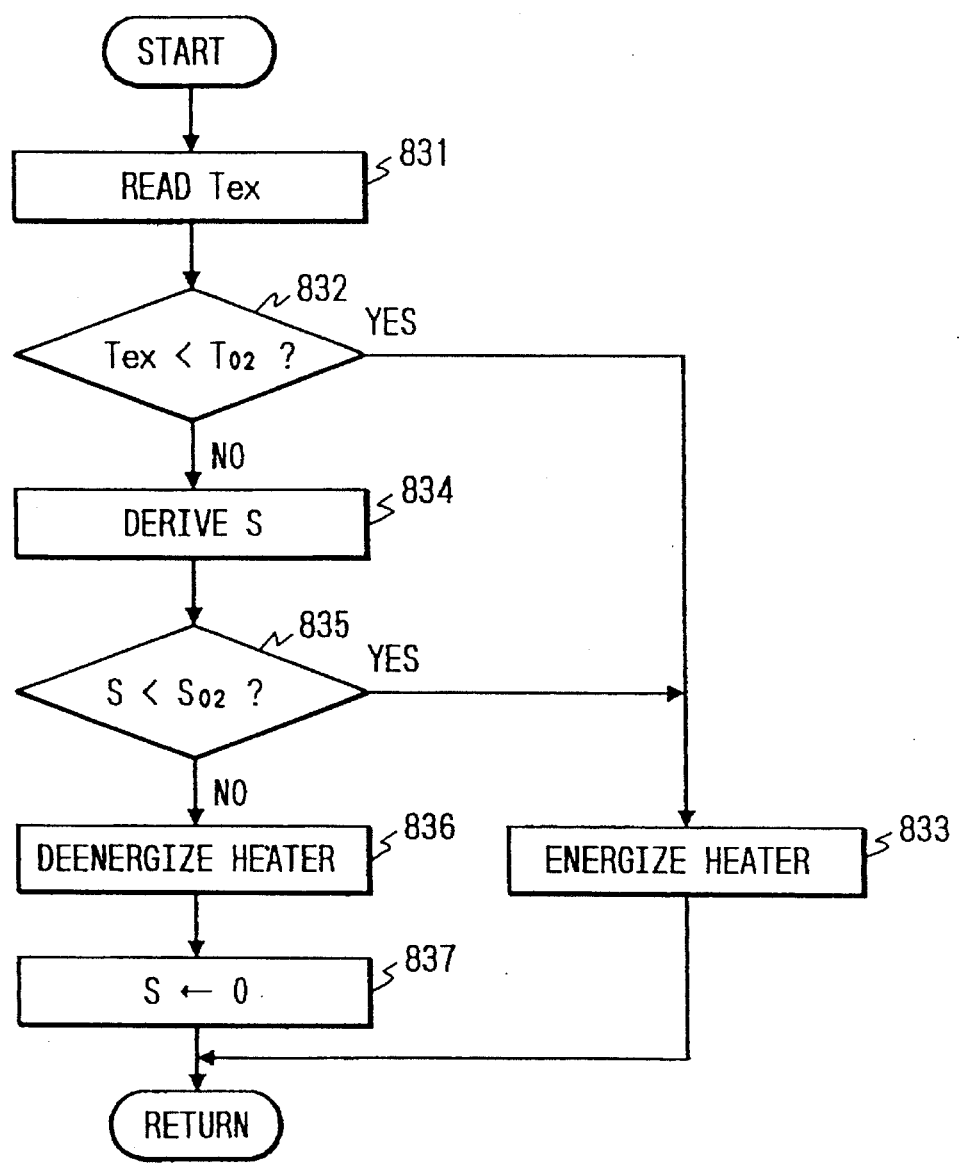
FIG. 36 is a flowchart of a routine to be executed by the control circuit for controlling energization of a heater of an $O_2$ sensor according to a tenth preferred embodiment of the present invention.

FIG. 36 is a flowchart of a routine to be executed by the control circuit for controlling the energization of the heater of the $O_2$ sensor 29. This routine is executed per, for example, 100ms.

In FIG. 36, at step 831, the actual E.G. temperature Tex predicted in the process as described in the fifth or sixth preferred embodiment is read out. Subsequently, step 832 determines whether Tex<$T_{O2}$. $T_{O2}$ represents an activating temperature of the $O_2$ sensor 29. When Tex<$T_{O2}$, the routine proceeds to step 833 where the heater is energized to heat the $O_2$ sensor 29. Then, this routine is terminated.

On the other hand, when Tex≧$T_{O2}$ at step 832, the routine proceeds to step 834 where an accumulated or integrated value S of the actual E.G. temperatures Tex is derived. Subsequently, step 835 determines whether S<$S_{O2}$. $S_{O2}$ represents a preset value. When S<$S_{O2}$, the routine proceeds to step 833 to energize the heater. On the other hand, when S≧$S_{O2}$, it is determined that the O2 sensor 29 is sufficiently increased in temperature for outputting a reliable signal. Accordingly, the routine proceeds to step 836 which deenergizes the heater. As appreciated, the number of Tex to be accumulated at step 834 is determined so as to make the decision at step 835 reliable. The routine then proceeds to step 837 where the accumulated value S is cleared, and is thereafter terminated.

Figure 37:
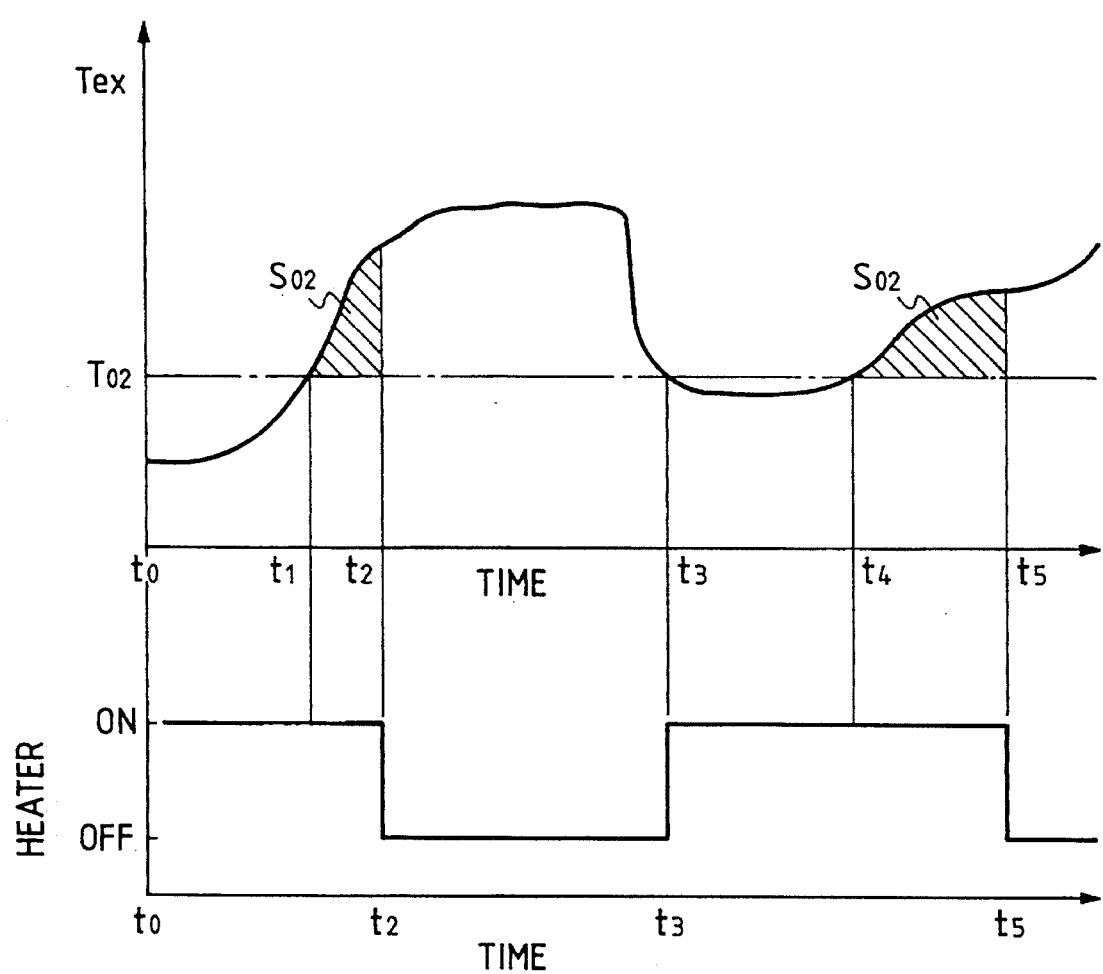
FIG. 37 is a time chart showing a relationship between an actual exhaust gas temperature and an electrical condition of the heater.

FIG. 37 is a time chart showing a relationship between the actual E.G. temperature Tex and the electrical condition of the heater. In FIG. 37, $T_{O2}$ represents the activating temperature of the $O_2$ sensor 29 as described above. Accordingly, since the $O_2$ sensor 29 is not activated below $T_{O2}$, the heater is energized to heat the $O_2$ sensor 29 during Tex<$T_{O2}$ (time point $t_0$ to time point $t_1$). On the other hand, when the E.G. temperature Tex is increased to be equal to or greater than $T_{O2}$, the given number of Tex is integrated to derive the value S. When the value S becomes equal to or greater than the given value $S_{O2}$, the heater is deenergized (time point $t_2$). Accordingly, when the integrated value S reaches the given value $S_{O2}$, it is determined that the O2 sensor 29 is sufficienfiy activated by means of the heater and the exhaust gas to output a reliable signal corresponding to the oxygen concentration in the exhaust gas.

Further, when Tex becomes lower than TO2 during, for example, engine idling or deceleration, the heater starts to be energized again (time point t3) by determining that the temperature of the O2 sensor 29 becomes lower than the activating temperature. These controls are repeatedly performed.

In the tenth preferred embodiment, since the actual E.G. temperature predicted in real time is used, the heater energization control can be performed at a precise timing. Accordingly, the O2 sensor can be rapidly warmed up while the overheating thereof can be effectively prevented. As a result, the electrical load applied to the engine can be minimized so that the deterioration of the fuel consumption can also be suppressed.

It is to be understood that this invention is not to be limited to the preferred embodiments and modifications described above, and that various changes and modifications may be made without departing from the spirit and scope of the invention as defined in the appended claims.

For example, the present invention is not limited to the C.C. temperature sensor and the E.G. temperature sensor, but may cover all sensors for use in temperature measurement, such as, a water temperature sensor, an oil temperature sensor and an intake air temperature sensor. Further, those sensors, such as, a hot wire airflow meter, which varies their outputs depending on a fluid flow velocity or a fluid flow rate may also be covered. Still further, since the aforementioned temperature predicting system predicts the actual temperature free of the response delay of the sensor, those sensors having response delays, such as, an oxygen concentration sensor ($O_2$ sensor), an air-fuel ratio sensor (A/F sensor) and a lean mixture sensor, and those sensors which generate delays for noise elimination, such as, an intake pressure sensor, an acceleration sensor and a combustion pressure sensor, may also be covered.

Further, although the correction values are derived with regard to all of the proportional, integral and differential terms and the correction amount Fex is derived as a sum of the correction values, the correction amount which is sufficiently accurate on a practical basis can be derived, particularly, without the differential term. Further, it is not necessarily required to use the PID or PI control for deriving the correction amount. Other methods may be used as long as they can derive the correction amount relative to the basic control amount TAU based on the difference between the predicted actual temperature and the target temperature.

Further, for controlling the C.C. or E.G. temperature, an exhaust gas recirculation rate controlled in the EGR (exhaust gas recirculation system) may be used instead of or along with the fuel injection amount, the engine speed, the ignition timing and the like.

Further, the sensor is not necessarily provided exactly at the engine portion so as to obtain the direct temperature data thereat. Specifically, the temperature data associated with the engine portion is enough to predict the actual temperature thereof reliably. Still further, the temperature to be controlled is not limited to the C.C. or E.G. temperature. As long as temperatures vary depending on the engine operating condition, the present invention may be applied to project and control those temperatures reliably.

What is claimed is:

1. A temperature predicting system for an internal combustion engine, comprising:

a temperature sensor for detecting a temperature of a portion of said engine where the temperature changes depending on an operating condition of the engine;

flow velocity detecting means for detecting a flow velocity of a fluid flowing at said portion; and a microcomputer having a predicting section for predicting an actual temperature of said portion based on an actual temperature model which is an inverse of a sensor temperature model, said sensor temperature model being formed in a manner to reflect a response delay of said temperature sensor by using at least a current temperature value and a last temperature value detected by said temperature sensor, and said actual temperature, and a sensor model constant deriving section for deriving in real time a model constant of said sensor temperature model, based on the flow velocity detected by said flow velocity detecting means.

2. The temperature predicting system as set forth in claim 1, wherein said microcomputer predicting section predicts said actual temperature based on the following equation:

$$Tex(i)=1/1-a\{Texs(i)-aTexs(i-1)\}$$

where Tex(i) represents a current value of said actual temperature, Texs(i) represents said current temperature value detected by said temperature sensor, Texs(i-1) represents said last temperature value detected by said temperature sensor, and a represents said model constant.

3. The temperature predicting system as set forth in claim 1, wherein said microcomputer sensor model constant deriving section derives further model constants of said sensor temperature model, and wherein said microcomputer predicting section predicts said actual temperature based on the following equation:

$$Tex(i)=1/b_1\{Texs(i)-a_1Texs(i-1)-b_2Tex(i-1)-c_1\}$$

where Tex(i) represents a current value of said actual temperature, Tex(i-1) represents a last value of said actual temperature, Texs(i) represents said current temperature value detected by said temperature sensor, Texs(i-1) represents said last temperature value detected by said temperature sensor, $a_1$ represents said model constant, and $b_1$, $b_2$ and $c_1$ represent said further model constants.

4. A temperature projecting system for an internal combustion engine, comprising:

a temperature sensor for detecting a temperature of a portion of said engine where the temperature changes depending on an operating condition of the engine;

fuel cut detecting means for detecting whether fuel cut is performed or not;

a microcomputer having a predicting section for predicting an actual temperature of said portion based on an actual temperature model which is an inverse of a sensor temperature model, said sensor temperature model being formed in a manner to reflect a response delay of said temperature sensor by using at least a current temperature value and a last temperature value detected by said temperature sensor, and said actual temperature, and a sensor model constant deriving section for deriving in real time a model constant of said sensor temperature model, using, as a reference value, an assumed temperature of said portion to which the temperature of said portion is assumed to converge during said fuel cut, said sensor model constant deriving section being set to derive said model constant when said fuel cut detecting means detects said fuel cut.

5. The temperature predicting system as set forth in claim 4, wherein said microcomputer predicting section predicts said actual temperature based on the following equation:

$$Tex(i)=1/1-a\{Texs(i)-aTexs(i-1)\}$$

where Tex(i) represents a current value of said actual temperature, Texs(i) represents said current temperature value detected by said temperature sensor, Texs(i-1) represents said last temperature value detected by said temperature sensor, and a represents said model constant.

6. The temperature projecting system as set forth in claim 4, wherein said microcomputer sensor model constant deriving section derives further model constants of said sensor temperature model, and wherein said microcomputer predicting section predicts said actual temperature based on the following equation:

$$Tex(i)=1b_1\{Texs(i)-a_1Texs(i-1)-b_2Tex(i-1)-c\}$$

where Tex(i) represents a current value of said actual temperature, Tex(i-1) represents a last value of said actual temperature, Texs(i) represents said current temperature value detected by said temperature sensor, Texs(i-1) represents said last temperature value detected by said temperature sensor, $a_1$ represents said model constant, and $b_1$, $b_2$ and $c_1$ represent said further model constants.

7. A temperature control system for an internal combustion engine, comprising:

operating condition control means for controlling an operating condition of the engine;

a temperature sensor for detecting a temperature of a portion of said engine where the temperature changes depending on the operating condition of the engine; and a microcomputer having a predicting section for predicting an actual temperature of said portion based on an actual temperature model which is an inverse of a sensor temperature model, said sensor temperature model being formed in a manner to reflect a response delay of said temperature sensor by using at least a current temperature value and a last temperature value detected by said temperature sensor, and said actual temperature, a correction amount deriving section for performing proportional-integral processing of a difference between said predicted actual temperature and a target temperature to derive a correction amount for a control amount used by said operating condition control means, a control amount correcting section for correcting said control amount based on said correction amount, and a controlled object model constant deriving section for deriving in real time model constants of a controlled object model based on said temperature detected by said temperature sensor and said correction amount, wherein said correction amount deriving section uses said model constants to form a proportional term constant for performing said proportional-integral processing.

8. The temperature control system as set forth in claim 7, further comprising flow velocity detecting means for detecting a fluid flow velocity of a fluid flowing at said portion, said microcomputer further including a sensor model constant deriving section for deriving in real time a model constant of said sensor temperature model based on said fluid flow velocity detected by said flow velocity detecting means, and wherein said microcomputer predicting section predicts said actual temperature based on said current temperature value and said last temperature value detected by said temperature sensor, using said model constant derived by said sensor model constant deriving means and said actual temperature model which is inverse to said sensor temperature model.

9. The temperature control system as set forth in claim 7, further comprising fuel cut detecting means for detecting whether fuel cut is performed or not, said microcomputer further including a sensor model constant deriving section for deriving in real time a model constant of said sensor temperature model, using, as a reference value, an assumed temperature of said portion to which the temperature of said portion is assumed to converge during said fuel cut, said sensor model constant deriving section being set to derive said model constant when said fuel cut detecting means detects said fuel cut, and wherein said microcomputer predicting section predicts said actual temperature based on said current temperature value and said last temperature value detected by said temperature sensor, using said model constant derived by said sensor model constant deriving section and said actual temperature model which is inverse to said sensor temperature model.

10. The temperature control system as set forth in claim 9, wherein said microcomputer predicting section predicts said actual temperature based on the following equation:

$$Tex(i)=1/1-a\{Texs(i)-aTexs(i-1)\}$$

where $Tex(i)$ represents a current value of said actual temperature, $Texs(i)$ represents said current temperature value detected by said temperature sensor, $Texs(i-1)$ represents said last temperature value detected by said temperature sensor, and $a$ represents said model constant.

11. The temperature prejecting system as set forth in claim 9, wherein said microcomputer sensor model constant deriving section derives further model constants of said sensor temperature model, and wherein said microcomputer predicting section predicts said actual temperature based on the following equation:

$$Tex(i)=1/b_1\{Texs(i)-a_1 Texs(i-1)-b_2 Tex(i-1)-c_1\}$$

where $Tex(i)$ represents a current value of said actual temperature, $Tex(i-1)$ represents a last value of said actual temperature, $Texs(i)$ represents said current temperature value detected by said temperature sensor, $Texs(i-1)$ represents said last temperature value detected by said temperature sensor, $a_1$ represents said model constant, and $b_1$, $b_2$ and $c_1$ represent said further model constants.

12. The temperature control system as set forth in claim 7, wherein said operating condition control means includes fuel injection amount control means for controlling a fuel injection amount.

13. A temperature control system for an internal combustion engine, comprising:

a catalyst, provided in an exhaust pipe for purifying an exhaust gas;

catalyst temperature detecting means for detecting a temperature of said catalyst;

a microcomputer having a sensor model constant deriving section for deriving in real time a model constant of a sensor temperature model formed in a manner to reflect a response delay of said catalyst temperature detecting means by using at least a current temperature value and a last temperature value detected by said catalyst temperature detecting means, and an actual temperature, and a predicting section for predicting said actual temperature of said catalyst based on said current temperature value and said last temperature value detected by said catalyst temperature detecting means, using said model constant derived by said sensor model constant deriving section and an actual temperature model which is inverse to said sensor temperature model; and exhaust gas temperature control means for performing a control to increase a temperature of said exhaust gas when said predicted actual catalyst temperature is less than a target temperature, representing that said catalyst is non-activated, and for stopping said control of said exhaust gas temperature when said predicted actual catalyst temperature is equal to or greater than said target temperature, representing that said catalyst is activated.

14. The temperature control system as set forth in claim 13, wherein said exhaust gas temperature control means includes means for increasing said exhaust gas temperature by retarding an ignition timing.

15. The temperature control system as set forth in claim 13, wherein said exhaust gas temperature control means includes means for increasing said exhaust gas temperature by increasing an idling speed of the engine.

16. The temperature control system as set forth in claim 13, further comprising fuel cut detecting means for detecting whether fuel cut is performed or not, and wherein said microcomputer sensor model constant deriving section derives in real time said model constant of said sensor temperature model, using, as a reference value, an assumed temperature of said catalyst to which the temperature of said catalyst is assumed to converge during said fuel cut, said sensor model constant deriving section being set to derive said model constant when said fuel cut detecting means detects said fuel cut.

17. The temperature control system as set forth in claim 13, wherein said microcomputer sensor model constant deriving section derives further model constants of said sensor temperature model, and wherein said microcomputer predicting section predicts said actual temperature based on the following equation:

$$Tex(i)=1/b_1\{Texs(i)-a_1Texs(i-1)-b_2Tex(i-1)-c_1\}$$

where $Tex(i)$ represents a current value of said actual temperature, $Tex(i-1)$ represents a last value of said actual temperature, $Texs(i)$ represents said current temperature value detected by said catalyst temperature detecting means, $Texs(i-1)$ represents said last temperature value detected by said catalyst temperature detecting means, $a_1$ represents said model constant, and $b_1$, $b_2$ and $c_1$ represent said further model constants.

18. A temperature control system for an internal combustion engine, comprising:

a catalyst, provided in an exhaust pipe, for purifying an exhaust gas;

catalyst temperature detecting means for detecting a temperature of said catalyst;

a microcomputer having a sensor model constant deriving section for deriving in real time a model constant of a sensor temperature model formed in a manner to reflect a response delay of said catalyst temperature detecting means by using at least a current temperature value and a last temperature value detected by said catalyst temperature detecting means, and an actual temperature, and a predicting section for predicting said actual temperature of said catalyst based on said current temperature value and said last temperature value detected by said catalyst temperature detecting means, using said model constant derived by said sensor model constant deriving section and an actual temperature model which is inverse to said sensor temperature model; and exhaust gas temperature control means for performing a first control to increase a temperature of said exhaust gas when said predicted actual catalyst temperature is less than a first target temperature representing that said catalyst is non-activated, and for performing a second control to lower said exhaust gas temperature when said predicted actual catalyst temperature is greater than a second target temperature which is set higher than said first target temperature.

19. The temperature control system as set forth in claim 18, wherein said exhaust gas temperature control means includes means for increasing said exhaust gas temperature by retarding an ignition timing, and for lowering said exhaust gas temperature by increasing a fuel injection amount.

20. The temperature control system as set forth in claim 18, further comprising fuel cut detecting means for detecting whether fuel cut is performed or not, and wherein said microcomputer sensor model constant deriving section derives in real time said model constant of said sensor temperature model, using, as a reference value, an assumed temperature of said catalyst to which the temperature of said catalyst is assumed to converge during said fuel cut, said sensor model constant deriving section being set to derive said model constant when said fuel cut detecting means detects said fuel cut.

21. The temperature control system as set forth in claim 18, wherein said microcomputer sensor model constant deriving section derives further model constants of said sensor temperature model, and wherein said microcomputer predicting section predicts said actual temperature based on the following equation:

$$Tex(i)=1/b_1\{Texs(i)-a_1Texs(i-1)-b_2Tex(i-1)-c_1\}$$

where $Tex(i)$ represents a current value of said actual temperature, $Tex(i-1)$ represents a last value of said actual temperature, $Texs(i)$ represents said current temperature value detected by said catalyst temperature detecting means, $Texs(i-1)$ represents said last temperature value detected by said catalyst temperature detecting means, $a_1$ represents said model constant, and $b_1$, $b_2$ and $c_1$ represent said further model constants.

22. A temperature control system for an internal combustion engine, comprising:

an exhaust gas temperature sensor, provided in an exhaust pipe, for detecting a temperature of exhaust gas;

an oxygen concentration sensor, provided in said exhaust pipe, for outputting a rich or lean signal depending on an oxygen concentration in said exhaust gas;

a heater for warming up said oxygen concentration sensor;

a microcomputer having a sensor model constant deriving section for deriving in real time a model constant of a sensor temperature model formed in a manner to reflect a response delay of said exhaust gas temperature sensor by using at least a current temperature value and a last temperature value detected by said exhaust gas temperature sensor, and an actual temperature, and a predicting section for predicting said actual temperature of said exhaust gas based on said current temperature value and said last temperature value detected by said exhaust gas temperature sensor, using said model constant derived by said sensor model constant deriving section and an actual temperature model which is inverse to said sensor temperature model; and heater energization control means for energizing said heater when said predicted actual temperature is less than a target temperature, and for deenergizing said heater when said actual temperature is equal to or greater than said target temperature.

23. The temperature control system as set forth in claim 22, wherein said heater energization control means deenergizes said heater when an accumulated value of said predicted actual temperatures is equal to or greater than a preset value and energizes said heater when said accumulated value is less than said preset value.

24. The temperature control system as set forth in claim 22, further comprising fuel cut detecting means for detecting whether fuel cut is performed or not, and wherein said microcomputer sensor model constant deriving section derives in real time said model constant of said sensor temperature model, using, as a reference value, an assumed temperature of said exhaust gas to which the temperature of said exhaust gas is assumed to converge during said fuel cut, said sensor model constant deriving section being set to derive said model constant when said fuel cut detecting means detects said fuel cut.

25. The temperature control system as set forth in claim 22, wherein said microcomputer sensor model constant deriving section derives further model constants of said sensor temperature model, and wherein said microcomputer predicting section predicts said actual temperature based on the following equation:

$$Tex(i)=1/b_1\{Texs(i)-a_1Texs(i-1)-b_2Tex(i-1)-c_1\}$$

where Tex(i) represents a current value of said actual temperature, Tex(i–1) represents a last value of said actual temperature, Texs(i) represents said current temperature value detected by said exhaust gas temperature sensor, Texs(i–1) represents said last temperature value detected by said exhaust gas temperature sensor, $a_1$ represents said model constant, and $b_1$, $b_2$ and $c_1$ represent said further model constants.

26. The temperature control system as set forth in claim 13, wherein said catalyst temperature detecting means is an exhaust gas temperature sensor for detecting the exhaust gas temperature and wherein said predicting section predicts said actual catalyst temperature based on the exhaust gas temperature detected by said exhaust gas temperature sensor.

27. The temperature control system as set forth in claim 13, wherein said catalyst temperature detecting means is a catalyst temperature sensor for detecting the temperature of said catalyst.

28. The temperature control system as set forth in claim 18, wherein said catalyst temperature detecting means is an exhaust gas temperature sensor for detecting the exhaust gas temperature and wherein said predicting section predicts said actual catalyst temperature based on the exhaust gas temperature detected by said exhaust gas temperature sensor.

29. The temperature control system as set forth in claim 18, wherein said catalyst temperature detecting means is a catalyst temperature sensor for detecting the temperature of said catalyst.

* * * * *